US011254502B2

(12) United States Patent
Conrad et al.

(10) Patent No.: US 11,254,502 B2
(45) Date of Patent: Feb. 22, 2022

(54) STORAGE AND RETRIEVAL SYSTEM

(71) Applicant: Symbotic LLC, Wilmington, MA (US)

(72) Inventors: Juergen D. Conrad, York, PA (US);
Robert Hsiung, Cambridge, MA (US);
Kirill K. Pankratov, Acton, MA (US);
Robert Sullivan, Wilmington, MA (US); Larry M. Sweet, Atlanta, GA (US)

(73) Assignee: Symbotic LLC, Wilmington, MA (US)

( * ) Notice: Subject to any disclaimer, the term of this patent is extended or adjusted under 35 U.S.C. 154(b) by 0 days.

(21) Appl. No.: 17/108,265

(22) Filed: Dec. 1, 2020

(65) Prior Publication Data

US 2021/0147146 A1 May 20, 2021

Related U.S. Application Data

(63) Continuation of application No. 16/222,283, filed on Dec. 17, 2018, now Pat. No. 10,850,921, which is a
(Continued)

(51) Int. Cl.
*B65G 1/04* (2006.01)
*B65G 1/137* (2006.01)

(52) U.S. Cl.
CPC ......... *B65G 1/0492* (2013.01); *B65G 1/0485* (2013.01); *B65G 1/0435* (2013.01); *B65G 1/1376* (2013.01)

(58) Field of Classification Search
CPC ...... B65G 1/00; B65G 1/0492; B65G 1/0435; B65G 1/0485; B65G 1/1376
(Continued)

(56) References Cited

U.S. PATENT DOCUMENTS

| 2,945,604 | A | 7/1960 | Kroll et al. |
| 2,996,621 | A | 8/1961 | Barret, Jr. |

(Continued)

FOREIGN PATENT DOCUMENTS

| AT | 506221 | 7/2009 |
| CA | 1252430 | 4/1989 |

(Continued)

OTHER PUBLICATIONS

International Search Report, International Application No. PCT/US2016/013877, dated May 20, 2016.
(Continued)

*Primary Examiner* — James R Bidwell
(74) *Attorney, Agent, or Firm* — Perman & Green, LLP

(57) ABSTRACT

An automated storage and retrieval system including at least one autonomous transport vehicle, a transfer deck that defines a transport surface for the vehicle, at least one reciprocating lift, a first and second pickface interface station connected to the deck and spaced apart from each other, each station forming a pickface transfer interfacing between the vehicle on the deck and the lift at each station so that a pickface is transferred between the lift and the vehicle at each station, wherein the vehicle is configured to pick a first pickface at the first station, traverse the deck and buffer the first pickface, or at least a portion thereof, at the second station so that the second station has multiple pickfaces buffered on a common support in an order sequence of pickfaces according to a predetermined case out order sequence of mixed case pickfaces.

18 Claims, 41 Drawing Sheets

Related U.S. Application Data continuation of application No. 15/848,809, filed on Dec. 20, 2017, now Pat. No. 10,155,623, which is a continuation of application No. 14/997,920, filed on Jan. 18, 2016, now Pat. No. 9,856,083.

(60) Provisional application No. 62/104,520, filed on Jan. 16, 2015.

(58) Field of Classification Search
USPC ....... 414/277, 279, 281, 282, 283, 284, 285; 700/216; 901/1
See application file for complete search history.

(56) References Cited

U.S. PATENT DOCUMENTS

| | | |
|---|---|---|
| 3,455,468 A | 7/1969 | Saul |
| 3,554,390 A | 1/1971 | Saul |
| 3,677,421 A | 7/1972 | Kintner et al. |
| 3,737,056 A | 6/1973 | Hathcock, Jr. |
| 3,802,580 A | 4/1974 | Castaldi |
| 3,970,840 A | 7/1976 | De Bruine |
| 4,001,139 A | 1/1977 | Long |
| 4,406,570 A | 9/1983 | Duncan et al. |
| 4,428,708 A | 1/1984 | Burt |
| 4,492,504 A | 1/1985 | Hainsworth |
| 4,595,329 A | 6/1986 | Marques |
| 4,678,390 A | 7/1987 | Bonneton et al. |
| 4,679,149 A | 7/1987 | Merz |
| 4,692,876 A | 9/1987 | Tenma et al. |
| 4,716,530 A | 12/1987 | Ogawa et al. |
| 4,786,229 A | 11/1988 | Henderson |
| 4,811,229 A | 3/1989 | Wilson |
| 4,936,738 A | 6/1990 | Brennan et al. |
| 5,134,353 A | 7/1992 | Kita et al. |
| 5,134,940 A | 8/1992 | Fujita et al. |
| 5,135,344 A | 8/1992 | Kita et al. |
| 5,179,329 A | 1/1993 | Nishikawa et al. |
| 5,273,392 A | 12/1993 | Bernard, II et al. |
| 5,333,982 A | 8/1994 | Tanizawa et al. |
| 5,370,492 A | 12/1994 | Gleyze et al. |
| 5,379,229 A | 1/1995 | Parson et al. |
| 5,380,139 A | 1/1995 | Pohjonen et al. |
| 5,403,147 A | 4/1995 | Tanaka |
| 5,425,612 A | 6/1995 | Ebstein |
| 5,472,309 A | 12/1995 | Bernard, II et al. |
| 5,525,884 A | 6/1996 | Sugiura et al. |
| 5,529,165 A | 6/1996 | Shupert |
| 5,601,395 A | 2/1997 | Lichti, Sr. et al. |
| 5,718,551 A | 2/1998 | Ebstein |
| 5,764,014 A | 6/1998 | Jakeway et al. |
| 5,801,506 A | 9/1998 | Netzler |
| 5,833,431 A | 11/1998 | Rosse, III et al. |
| 5,839,872 A | 11/1998 | Goto et al. |
| 5,908,283 A | 6/1999 | Huang et al. |
| 5,988,306 A | 11/1999 | Ooishi |
| 6,036,427 A | 3/2000 | Kita et al. |
| 6,061,607 A | 5/2000 | Bradley et al. |
| 6,102,603 A | 8/2000 | Yagi et al. |
| 6,272,406 B2 | 8/2001 | Alofs et al. |
| 6,325,586 B1 | 12/2001 | Loy |
| 6,341,269 B1 | 1/2002 | Burrows |
| 6,345,217 B1 | 2/2002 | Zeitler et al. |
| 6,721,638 B2 | 4/2004 | Zeitler |
| 6,748,292 B2 | 6/2004 | Mountz |
| 6,923,612 B2 | 8/2005 | Hansl |
| 6,929,440 B1 | 8/2005 | Grond |
| 6,950,722 B2 | 9/2005 | Mountz |
| 7,008,164 B2 | 3/2006 | Rokkaku |
| 7,025,191 B2 | 4/2006 | Lichti et al. |
| 7,266,422 B1 | 9/2007 | Demotte et al. |
| 7,329,081 B2 | 2/2008 | Baker et al. |
| 7,402,018 B2 | 7/2008 | Mountz et al. |
| 7,495,561 B2 | 2/2009 | Bodin et al. |
| 7,931,431 B2 | 4/2011 | Benedict et al. |
| 8,425,173 B2 | 4/2013 | Lert et al. |
| 8,480,347 B2 | 7/2013 | Schafer |
| 8,594,835 B2 | 11/2013 | Lert et al. |
| 8,596,952 B2 | 12/2013 | Wolkerstorfer |
| 8,740,542 B2 | 6/2014 | Wolkerstorfer |
| 8,790,061 B2 | 7/2014 | Yamashita |
| 8,894,344 B2 | 11/2014 | Merry et al. |
| 8,954,188 B2 | 2/2015 | Sullivan et al. |
| 8,956,099 B2 | 2/2015 | Olszak et al. |
| 8,974,168 B2 | 3/2015 | Yamashita |
| 9,008,884 B2 | 4/2015 | Toebes et al. |
| 9,037,286 B2 | 5/2015 | Lert |
| 9,315,323 B2 | 4/2016 | Schubilske |
| 9,321,591 B2 | 4/2016 | Lert et al. |
| 9,409,728 B2 | 8/2016 | Bastian, II |
| 9,499,338 B2 | 11/2016 | Toebes et al. |
| 9,505,556 B2 | 11/2016 | Razumov |
| 9,555,967 B2 | 1/2017 | Stevens |
| 9,856,083 B2 | 1/2018 | Conrad et al. |
| 10,155,623 B2 | 12/2018 | Conrad et al. |
| 10,377,585 B2 | 8/2019 | Cyrulik et al. |
| 10,521,767 B2 * | 12/2019 | Pankratov ............ B65G 1/0492 |
| 10,850,921 B2 | 12/2020 | Conrad et al. |
| 11,004,033 B1 * | 5/2021 | Theobald ............. G05D 1/0027 |
| 11,078,017 B2 * | 8/2021 | Toebes ................ B65G 1/0492 |
| 2002/0029719 A1 | 3/2002 | Matsukawa |
| 2002/0076307 A1 | 6/2002 | Fallin et al. |
| 2003/0033217 A1 | 2/2003 | Cutlip |
| 2003/0185656 A1 | 10/2003 | Hansl |
| 2003/0200129 A1 | 10/2003 | Klaubauf et al. |
| 2004/0093116 A1 | 5/2004 | Mountz |
| 2004/0197171 A1 | 10/2004 | Freudelsperger |
| 2004/0238326 A1 | 12/2004 | Litchi |
| 2005/0158154 A1 | 7/2005 | Leerintveld et al. |
| 2006/0245862 A1 | 11/2006 | Hansl et al. |
| 2006/0257236 A1 | 11/2006 | Stingel, III et al. |
| 2007/0021864 A1 | 1/2007 | Mountz et al. |
| 2007/0068700 A1 | 3/2007 | Ohtsuki et al. |
| 2007/0177011 A1 | 8/2007 | Lewin et al. |
| 2007/0288123 A1 | 12/2007 | D'Andrea et al. |
| 2007/0290040 A1 | 12/2007 | Wurman et al. |
| 2007/0293978 A1 | 12/2007 | Wurman et al. |
| 2008/0001372 A1 | 1/2008 | Hoffman et al. |
| 2008/0131241 A1 | 6/2008 | King |
| 2008/0166217 A1 | 7/2008 | Fontana |
| 2008/0215180 A1 | 9/2008 | Kota |
| 2009/0074545 A1 | 3/2009 | Lert, Jr. et al. |
| 2009/0114115 A1 | 5/2009 | Minges |
| 2009/0185884 A1 | 7/2009 | Wurman et al. |
| 2009/0308000 A1 | 12/2009 | Corcoran |
| 2010/0222915 A1 | 9/2010 | Kuehnemann et al. |
| 2010/0272546 A1 | 10/2010 | Wolkerstorfer |
| 2010/0316468 A1 | 12/2010 | Lert |
| 2010/0316469 A1 | 12/2010 | Lert |
| 2010/0322747 A1 | 12/2010 | Lert et al. |
| 2012/0101627 A1 | 4/2012 | Lert |
| 2012/0141236 A1 | 6/2012 | Korner |
| 2012/0185082 A1 | 7/2012 | Toebes et al. |
| 2012/0185122 A1 | 7/2012 | Sullivan et al. |
| 2012/0186192 A1 | 7/2012 | Toebes et al. |
| 2012/0186942 A1 | 7/2012 | Toebes et al. |
| 2012/0189409 A1 | 7/2012 | Toebes et al. |
| 2012/0189416 A1 | 7/2012 | Toebes |
| 2012/0195720 A1 | 8/2012 | Sullivan et al. |
| 2012/0197431 A1 | 8/2012 | Toebes et al. |
| 2012/0200259 A1 | 8/2012 | Sullivan et al. |
| 2012/0328397 A1 | 12/2012 | Yamashita |
| 2012/0330458 A1 | 12/2012 | Weiss |
| 2013/0129453 A1 | 5/2013 | Salichs |
| 2013/0209202 A1 | 8/2013 | Schmit et al. |
| 2013/0245810 A1 | 9/2013 | Sullivan et al. |
| 2014/0044506 A1 | 2/2014 | De Vries |
| 2014/0056672 A1 | 2/2014 | Mathys et al. |
| 2014/0088748 A1 | 3/2014 | Woodtli et al. |
| 2014/0100999 A1 | 4/2014 | Mountz et al. |
| 2014/0124462 A1 | 5/2014 | Yamashita |
| 2014/0197171 A1 | 7/2014 | Taylor |
| 2014/0277692 A1 | 9/2014 | Buzan et al. |
| 2014/0350717 A1 | 11/2014 | Dagle et al. |

(56) References Cited

U.S. PATENT DOCUMENTS

| | | |
|---|---|---|
| 2015/0098775 A1 | 4/2015 | Razumov |
| 2015/0225187 A1 | 8/2015 | Razumov |
| 2016/0016731 A1 | 1/2016 | Razumov |
| 2016/0167880 A1 | 6/2016 | Pankratov et al. |
| 2016/0207709 A1 | 7/2016 | Pankratov et al. |
| 2016/0207710 A1 | 7/2016 | Conrad et al. |
| 2016/0207711 A1 | 7/2016 | Pankratov et al. |
| 2016/0214797 A1 | 7/2016 | Pankratov et al. |
| 2016/0214808 A1 | 7/2016 | Cyrulik et al. |
| 2018/0111770 A1 | 4/2018 | Cyrulik et al. |

FOREIGN PATENT DOCUMENTS

| | | |
|---|---|---|
| CN | 102822073 | 12/2012 |
| CN | 203294644 | 11/2013 |
| CN | 203794044 | 8/2014 |
| CN | 102887319 | 1/2018 |
| DE | 4104527 | 8/1992 |
| DE | 20011661 | 12/2000 |
| DE | 10142395 | 11/2002 |
| DE | 2011106677 | 1/2013 |
| EP | 0169156 | 1/1986 |
| EP | 737630 | 10/1996 |
| EP | 1598291 | 11/2005 |
| EP | 1627830 | 2/2006 |
| EP | 1775240 | 4/2007 |
| EP | 3245145 | 11/2017 |
| FR | 2730715 | 8/1996 |
| GB | 2407565 | 5/2005 |
| JP | 4723489 | 8/1977 |
| JP | 5231548 | 8/1977 |
| JP | 0672512 | 3/1994 |
| JP | 2001220002 | 8/2001 |
| JP | 2003012119 | 1/2003 |
| JP | 2004123240 | 4/2004 |
| JP | 3102245 | 7/2004 |
| JP | 2013086891 | 5/2013 |
| JP | 2014503440 | 2/2014 |
| JP | 2014508082 | 4/2014 |
| JP | 2014091698 | 5/2014 |
| JP | 6102603 | 3/2017 |
| TW | 201328951 | 7/2013 |
| WO | 9534491 | 12/1995 |
| WO | 2004103883 | 12/2004 |
| WO | 2005009324 | 2/2005 |
| WO | 2005056943 | 6/2005 |
| WO | 2006095047 | 9/2006 |
| WO | 2009150684 | 12/2009 |
| WO | 2012156355 | 11/2012 |
| WO | 2013004695 | 1/2013 |
| WO | 2014145450 | 9/2014 |
| WO | 2016115565 | 7/2016 |
| WO | 20160115565 | 7/2016 |

OTHER PUBLICATIONS

International Search Report, International Application No. PCT/US2015/065574, dated Feb. 12, 2016.

International Search Report, International Application No. PCT/US2016/014747, dated May 17, 2016.

* cited by examiner

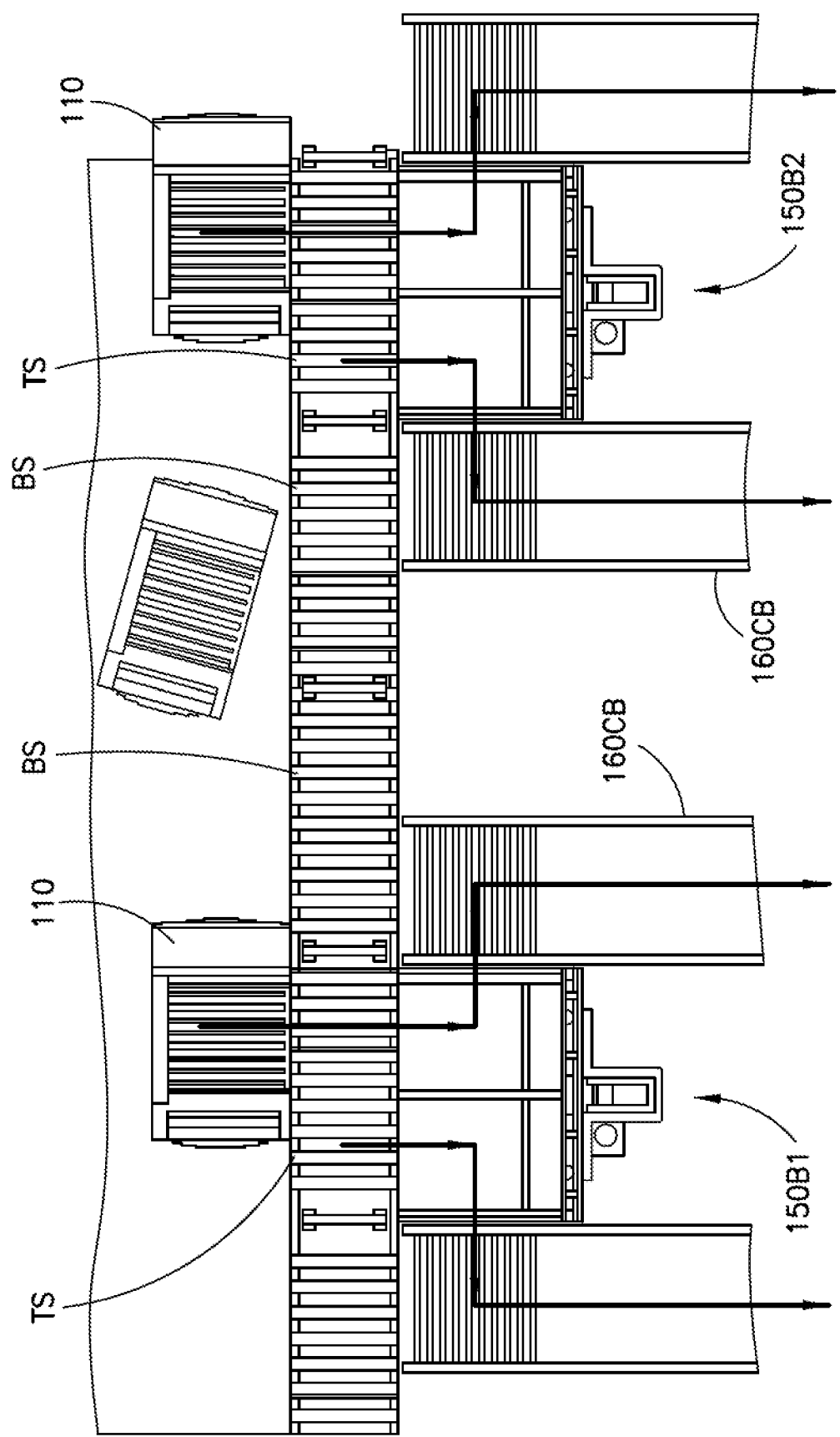

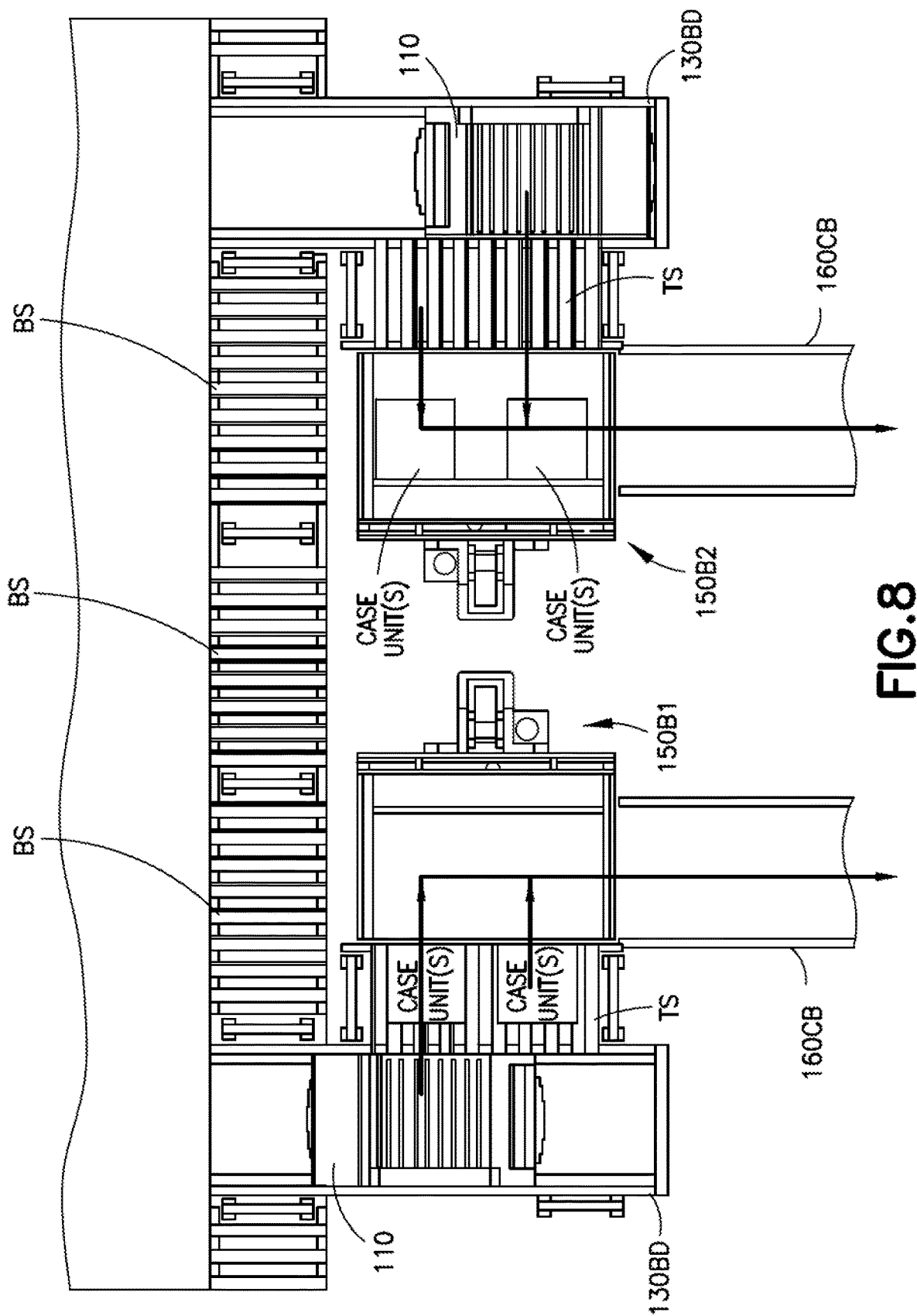

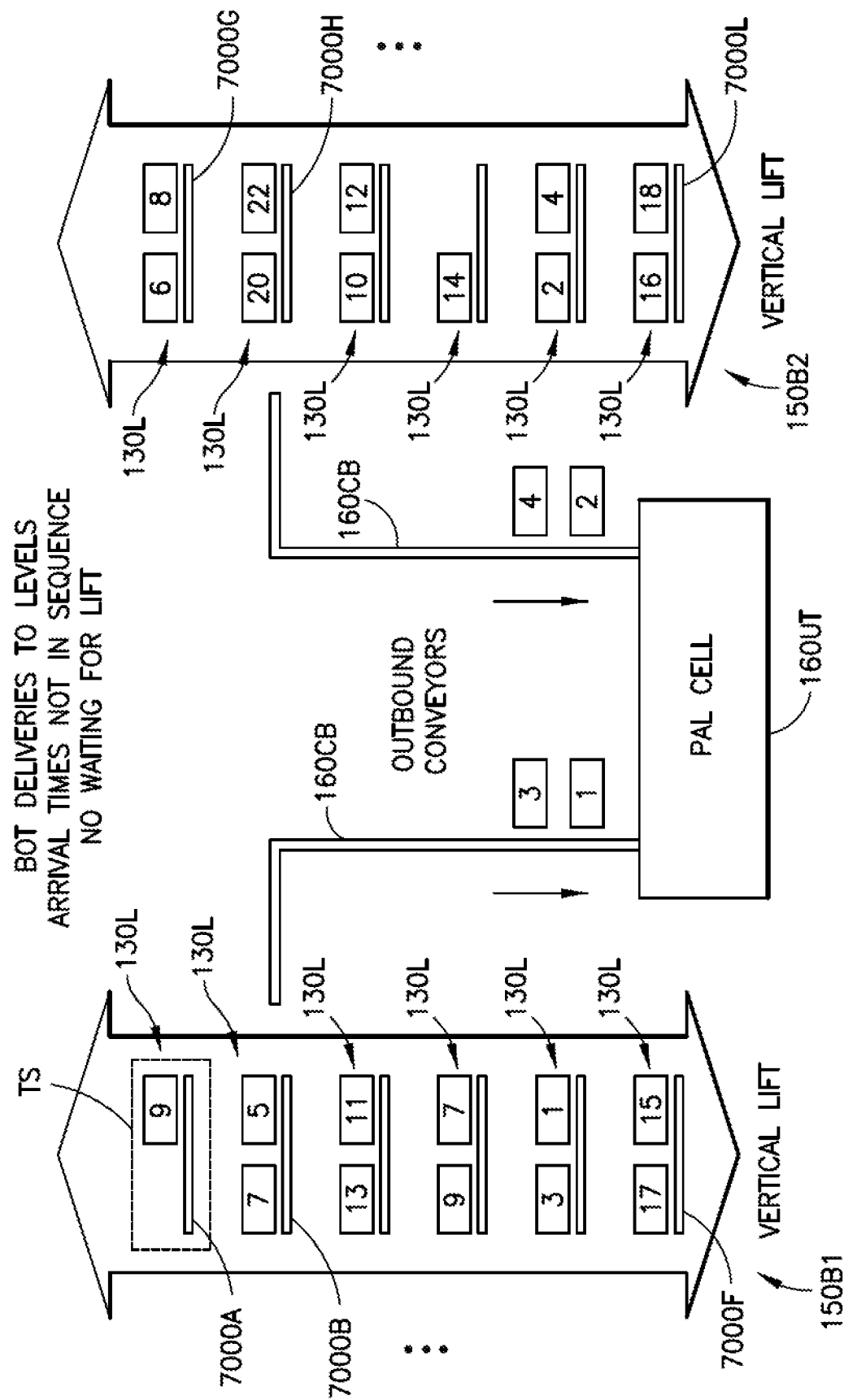

STORAGE AND RETRIEVAL SYSTEM

CROSS-REFERENCE TO RELATED APPLICATIONS

This application is a continuation of U.S. Non-Provisional patent application Ser. No. 16/222,283, filed Dec. 17, 2018, (now U.S. Pat. No. 10,850,921), which is a continuation of U.S. Non-Provisional patent application Ser. No. 15/848,809, filed Dec. 20, 2017, (now U.S. Pat. No. 10,155,623), which is a continuation of U.S. Non-Provisional patent application Ser. No. 14/997,920, filed on Jan. 18, 2016, (now U.S. Pat. No. 9,856,083), which claims priority from and the benefit of U.S. Provisional Patent Application No. 62/104,520, filed on Jan. 16, 2015, the disclosures of which are incorporated herein by reference in their entireties.

This application is also related to U.S. patent application Ser. No. 14/966,978, filed on Dec. 11, 2015; U.S. patent application Ser. No. 14/997,892, filed on Jan. 18, 2016; U.S. patent application Ser. No. 14/997,902, filed on Jan. 18, 2016; U.S. patent application Ser. No. 14/997,925, filed on Jan. 18, 2016; and U.S. Provisional Patent Application No. 62/107,135, filed on Jan. 23, 2015, the disclosures of which are incorporated herein by reference in their entireties.

BACKGROUND

1. Field

The exemplary embodiments generally relate to material handling systems and, more particularly, to transport and storage of items within the material handling system.

2. Brief Description of Related Developments

Multilevel storage and retrieval systems may be used in warehouses for the storage and retrieval of goods. Generally the transportation of goods into and out of the storage structure is done with lifts for transfer to a vehicle on a storage level, vehicles travelling up ramps to a predetermined storage level, or with vehicles that include lifts traveling along guide ways. Goods stored within the storage and retrieval system are generally stored in storage spaces on each storage level such that a transport vehicle disposed on that level has access to one level of storage spaces. Generally, the lifts that transfer items to and from the storage spaces carry the vehicles between different storage levels, are incorporated into the vehicles (such as with a gantry crane) or have a paternoster configuration where the lift payload shelves continually circulate around a frame at a predetermined rate.

The case units output from the multilevel storage and retrieval systems are transferred to a packing station where the case units are placed on pallets for shipping. Generally the pallets include case units of similar size and shape so that stable case levels, sometimes with paperboard sheets disposed between the levels, are formed on the pallets. In some instances each level of tier of the pallet is separately formed and then placed on the pallet to form stacked tiers. Mixed pallets are also possible. Generally when forming a pallet layer cases are placed in a buffer station or other location at the palletizing station so that the dimensions of the case are measured. A computer or other processor determines an arrangement of the cases based on the dimensions and instructs a robot to pick the cases for placement in the pallet layer.

It would be advantageous to sort case units for placement on a pallet during transport of the case units out of the storage and retrieval system storage structure to increase throughput of the storage and retrieval system.

BRIEF DESCRIPTION OF THE DRAWINGS

The foregoing aspects and other features of the disclosed embodiment are explained in the following description, taken in connection with the accompanying drawings, wherein:

FIGS. 7 and 8 are schematic illustrations of portions of the transport vehicle in accordance with aspects of the disclosed embodiment;

FIG. 9 is a schematic illustration of a portion of the storage and retrieval system in accordance with aspects of the disclosed embodiment;

DETAILED DESCRIPTION

Figure 1:
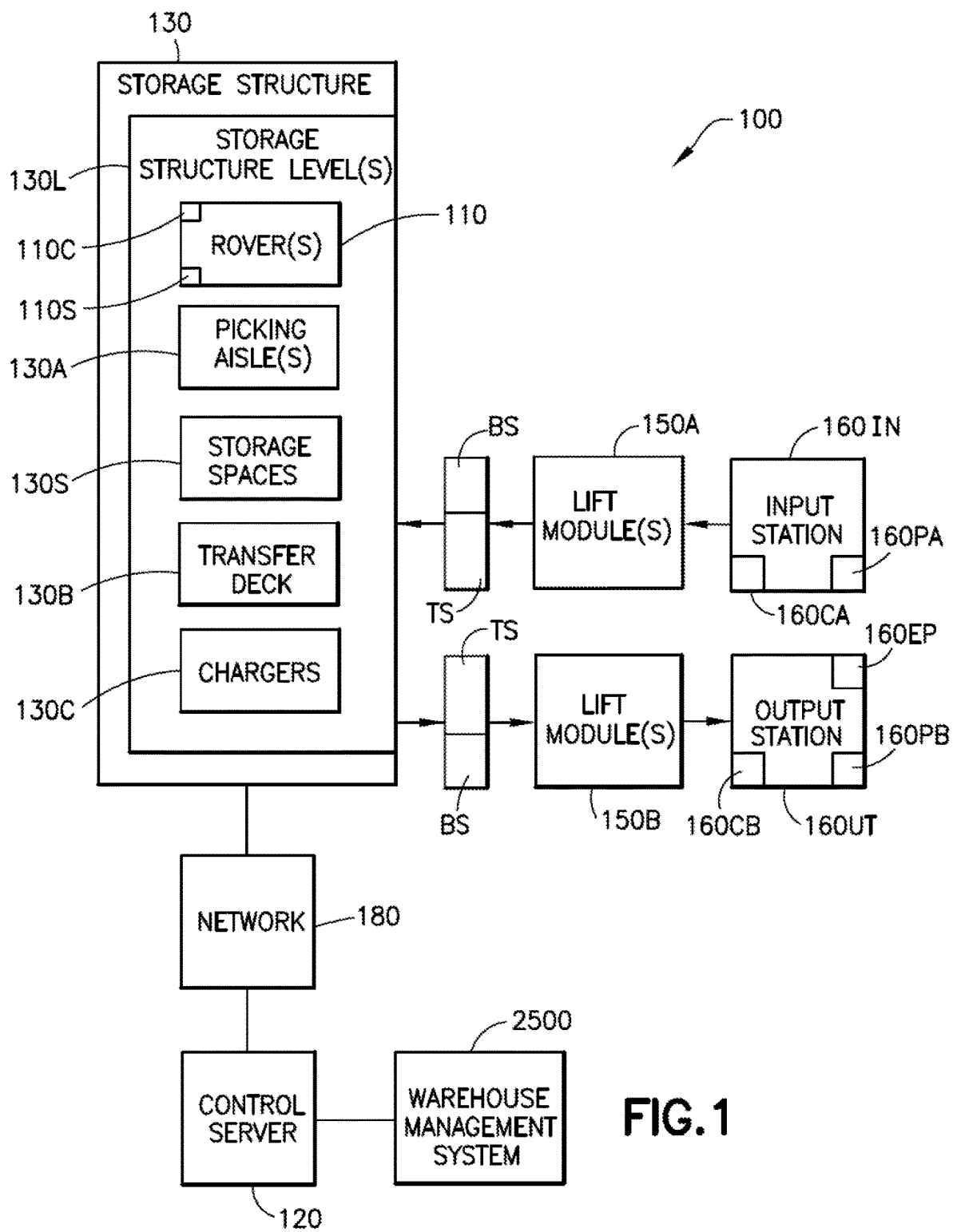
FIGS. 1 and 1A are schematic illustrations of an automated storage and retrieval system in accordance with aspects of the disclosed embodiment.

FIG. 1 is a schematic illustration of an automated storage and retrieval system 100 in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

In accordance with aspects of the disclosed embodiment the automated storage and retrieval system 100 may operate in a retail distribution center or warehouse to, for example, fulfill orders received from retail stores for case units such as those described in U.S. patent application Ser. No. 13/326,674 filed on Dec. 15, 2011, the disclosure of which is incorporated by reference herein in its entirety. For example, the case units are cases or units of goods not stored in trays, on totes or on pallets (e.g. uncontained). In other examples, the case units are cases or units of goods that are contained in any suitable manner such as in trays, on totes or on pallets. In still other examples, the case units are a combination of uncontained and contained items. It is noted that the case units, for example, include cased units of goods (e.g. case of soup cans, boxes of cereal, etc.) or individual goods that are adapted to be taken off of or placed on a pallet. In accordance with the aspects of the disclosed embodiment, shipping cases for case units (e.g. cartons, barrels, boxes, crates, jugs, or any other suitable device for holding case units) may have variable sizes and may be used to hold case units in shipping and may be configured so they are capable of being palletized for shipping. It is noted that when, for example, bundles or pallets of case units arrive at the storage and retrieval system the content of each pallet may be uniform (e.g. each pallet holds a predetermined number of the same item—one pallet holds soup and another pallet holds cereal) and as pallets leave the storage and retrieval system the pallets may contain any suitable number and combination of different case units (e.g. a mixed pallet where each mixed pallet holds different types of case units—a pallet holds a combination of soup and cereal) that are provided to, for example the palletizer in a sorted arrangement for forming the mixed pallet. In the embodiments the storage and retrieval system described herein may be applied to any environment in which case units are stored and retrieved.

Figure 1A:
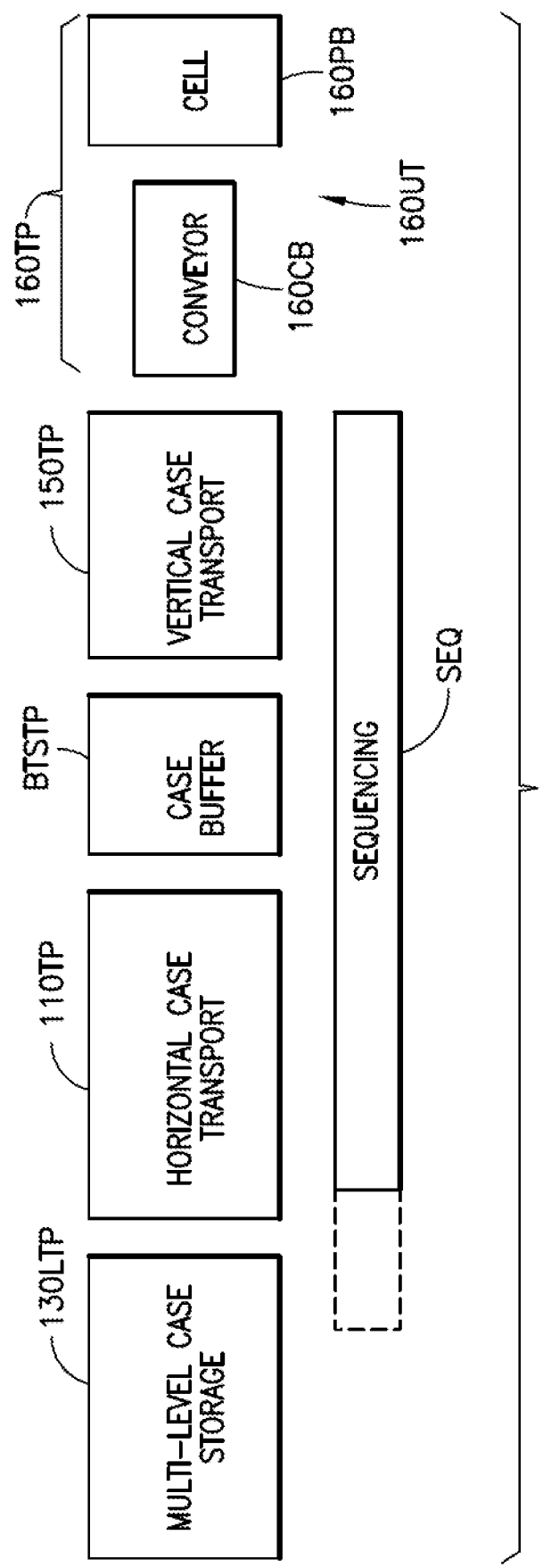
Figure 1B:
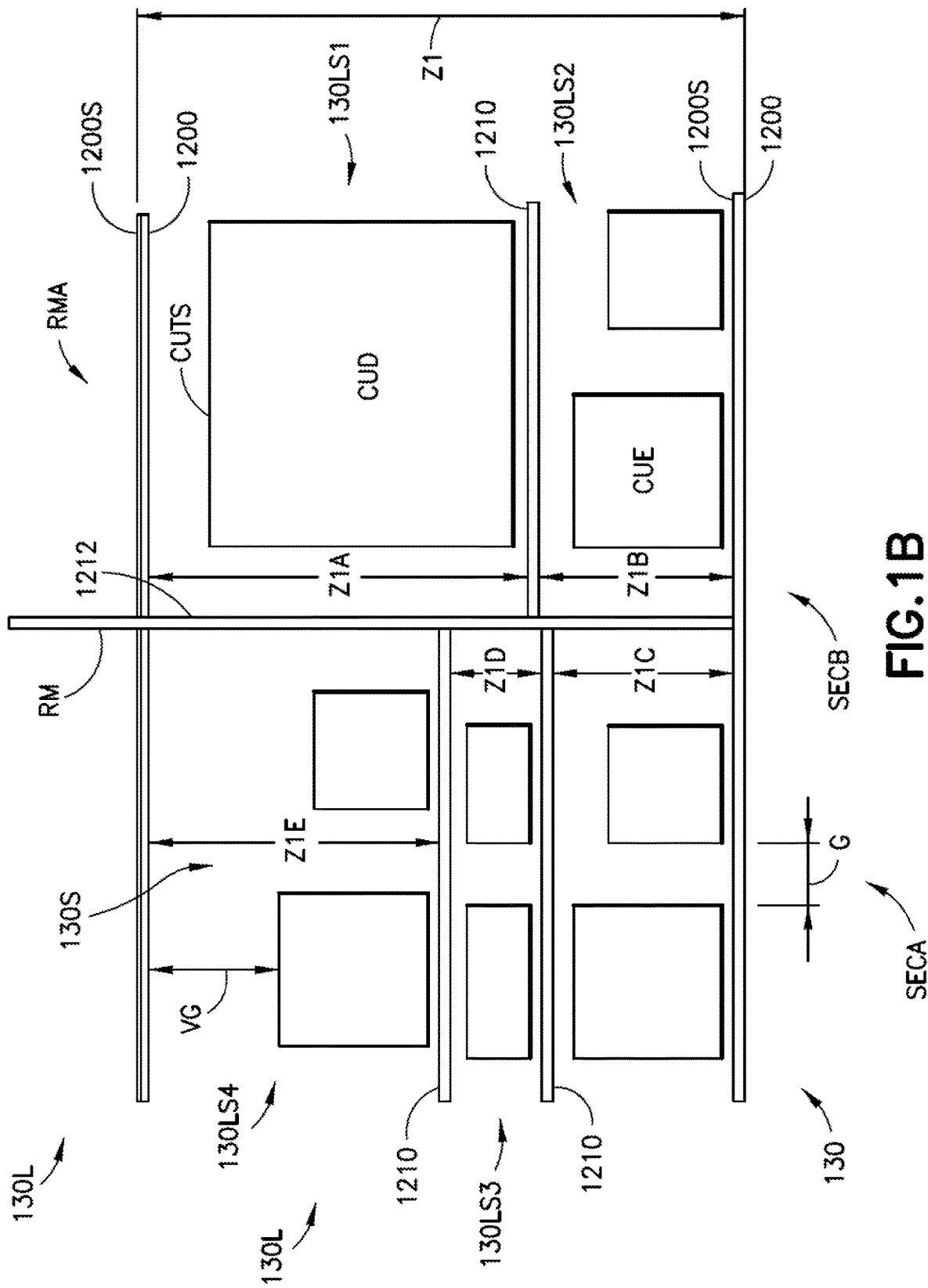
FIGS. 1B, 1C, 1D and 1E are schematic illustrations of portions of the automated storage and retrieval system in accordance with aspects of the disclosed embodiment.
Figure 1C:
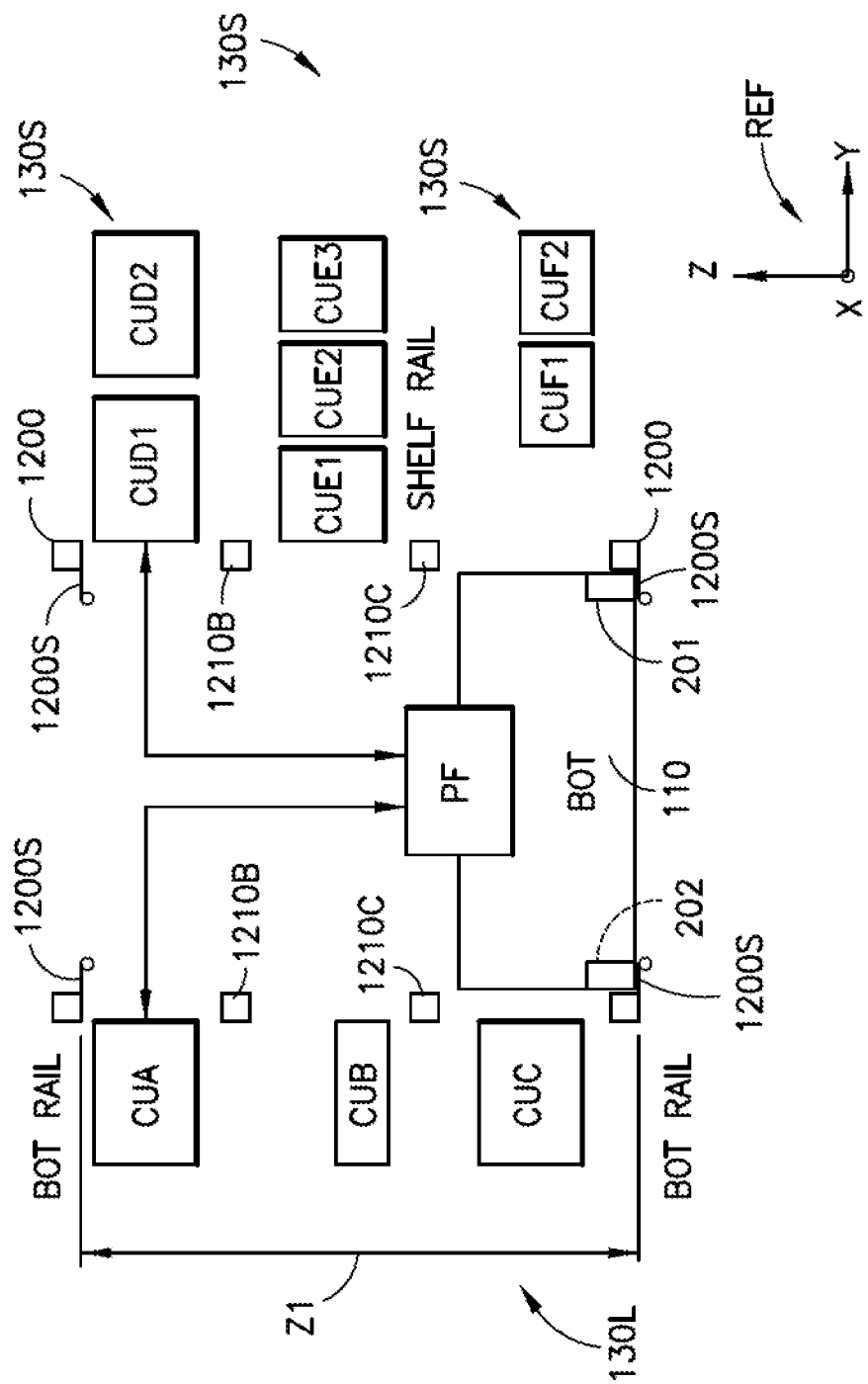
Figure 1D:
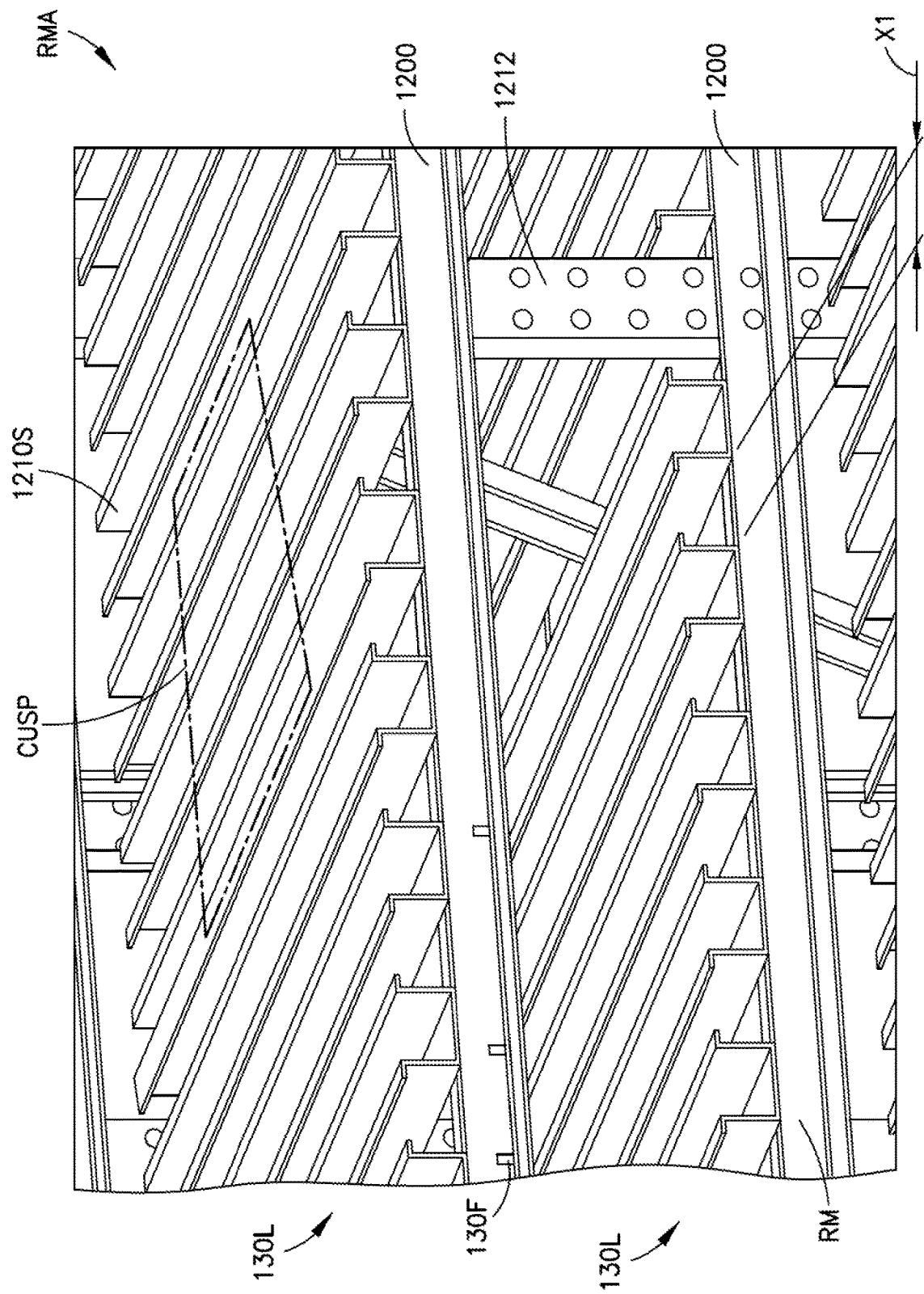
Figure 1E:
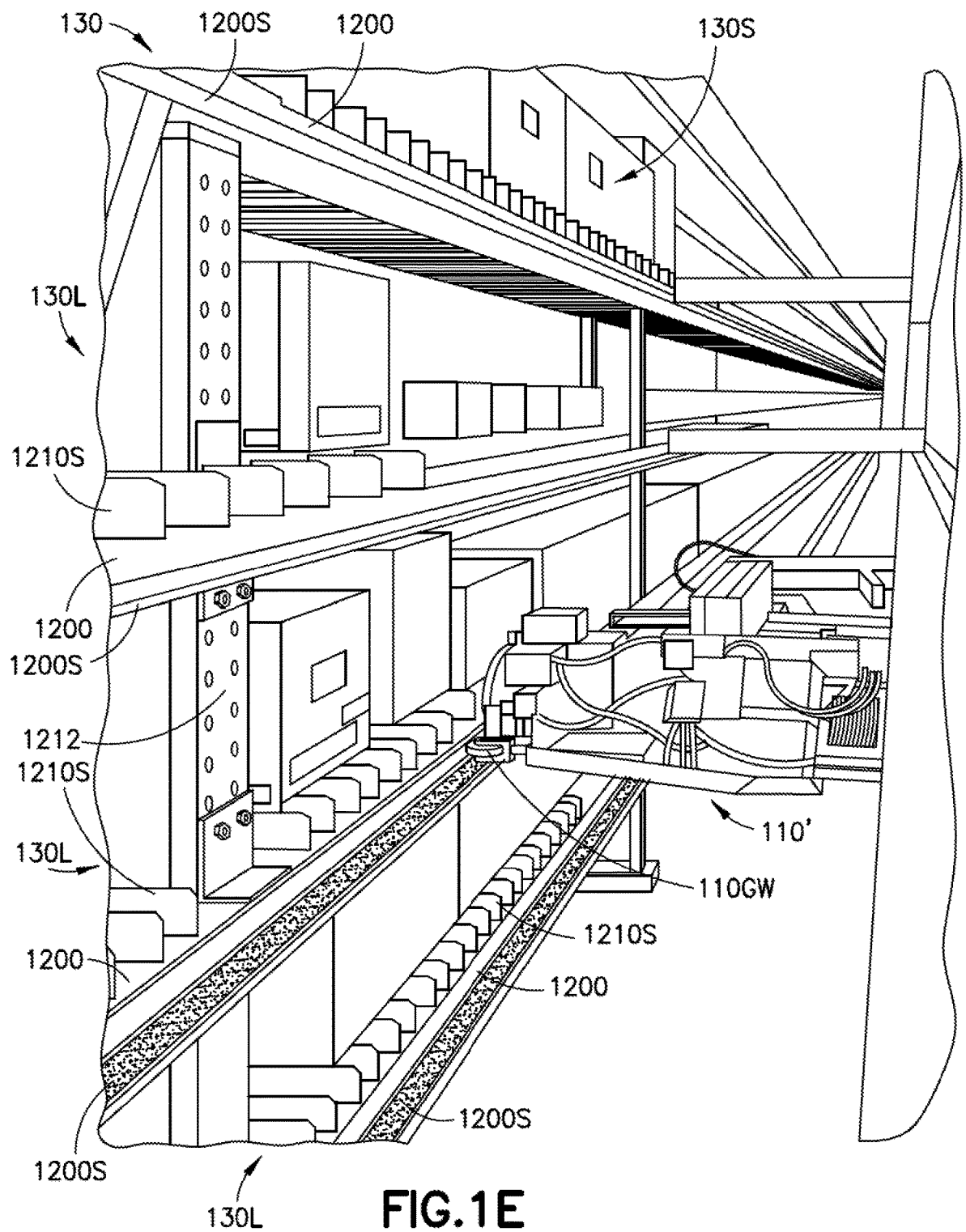
Figure 1F:
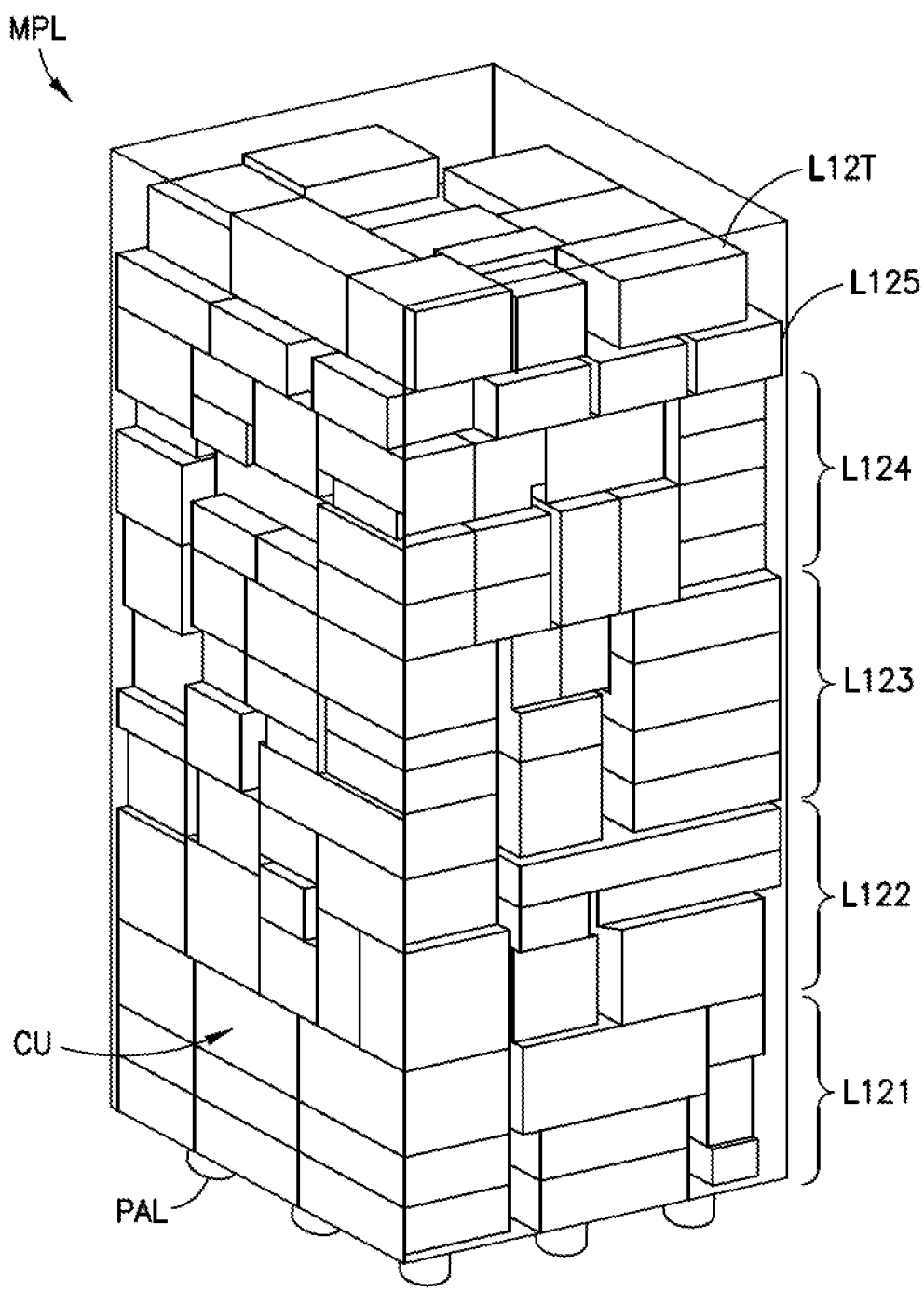
FIG. 1F is a schematic illustration of a mixed pallet load formed by the automated storage and retrieval system in accordance with aspects of the disclosed embodiment.
Figure 26:
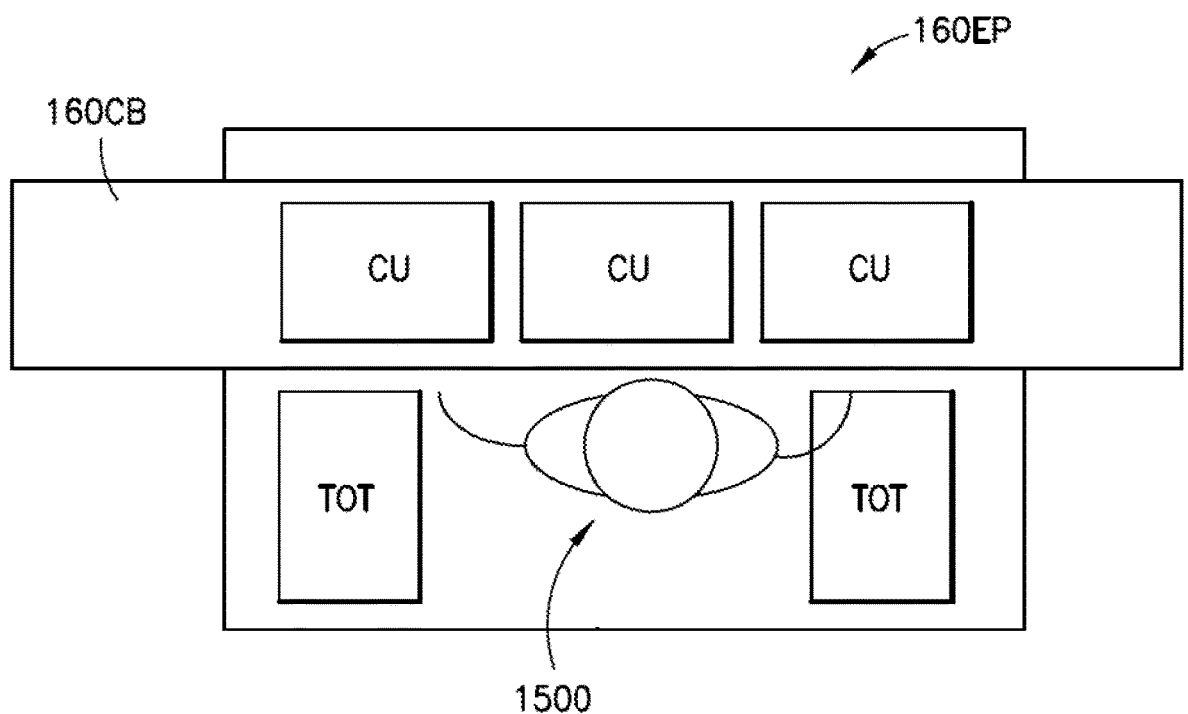
FIG. 26 is a schematic illustration of an operator station of the storage and retrieval system in accordance with aspects of the disclosed embodiment.

Also referring to FIG. 1F, it is noted that when, for example, incoming bundles or pallets (e.g. from manufacturers or suppliers of case units arrive at the storage and retrieval system for replenishment of the automated storage and retrieval system 100, the content of each pallet may be uniform (e.g. each pallet holds a predetermined number of the same item—one pallet holds soup and another pallet holds cereal). As may be realized, the cases of such pallet load may be substantially similar or in other words, homogenous cases (e.g. similar dimensions), and may have the same SKU (otherwise, as noted before the pallets may be "rainbow" pallets having layers formed of homogeneous cases). As pallets PAL leave the storage and retrieval system 100, with cases filling replenishment orders, the pallets PAL may contain any suitable number and combination of different case units CU (e.g. each pallet may hold different types of case units—a pallet holds a combination of canned soup, cereal, beverage packs, cosmetics and household cleaners). The cases combined onto a single pallet may have different dimensions and/or different SKU's. In one aspect of the exemplary embodiment, the storage and retrieval system 100 may be configured to generally include an in-feed section, a storage and sortation section (where, in one aspect, storage of items is optional) and an output section as will be described in greater detail below. As may be realized, in one aspect of the disclosed embodiment the system 100 operating for example as a retail distribution center may serve to receive uniform pallet loads of cases, breakdown the pallet goods or disassociate the cases from the uniform pallet loads into independent case units handled individually by the system, retrieve and sort the different cases sought by each order into corresponding groups, and transport and assemble the corresponding groups of cases into what may be referred to as mixed case pallet loads MPL. As may also be realized, as illustrated in FIG. 26, in one aspect of the disclosed embodiment the system 100 operating for example as a retail distribution center may serve to receive uniform pallet loads of cases, breakdown the pallet goods or disassociate the cases from the uniform pallet loads into independent case units handled individually by the system, retrieve and sort the different cases sought by each order into corresponding groups, and transport and sequence the corresponding groups of cases (in the manner described herein) at an operator station 160EP where items are picked from the different case units CU, and/or the different case units CU themselves, are placed in one or more bag(s), tote(s) or other suitable container(s) TOT by an operator 1500, or any suitable automation, in a predetermined order sequence of picked items according to, for example, an order, fulfilling one or more customer orders, in which the case units CU are sequenced at the operator station 160EP in accordance with the predetermined order sequence, noting that the sequencing of the case units CU as described herein effects the sequencing of the case units CU at the operator station 160EP. The in-feed section may generally be capable of resolving the uniform pallet loads to individual cases, and transporting the cases via suitable transport, for input to the storage and sortation section. In other aspects the output section assembles the appropriate group of ordered case units, that may be different in SKU, dimensions, etc. into bags, totes or other suitable containers to according to the predetermined order sequence of picked items at the operator station 160EP (such as to fill a customer order).

The storage and sortation section includes, as will be described in greater detail below, a multilevel automated storage array that has a transport system that in turn receives or feeds individual cases into the multilevel storage array for storage in a storage area. The storage and sortation section also defines outbound transport of case units from the multilevel storage array such that desired case units are individually retrieved in accordance with commands generated in accordance to orders entered into a warehouse management system, such as warehouse management system 2500, for transport to the output section. In other aspects, the storage and sortation section receives individual cases, sorts the individual cases (utilizing, for example, the buffer and interface stations described herein) and transfers the individual cases to the output section in accordance to orders entered into the warehouse management system. The sorting and grouping of cases according to order (e.g. an order out sequence) may be performed in whole or in part by either the storage and retrieval section or the output section, or both, the boundary between being one of convenience for the description and the sorting and grouping being capable of being performed any number of ways. The intended result is that the output section assembles the appropriate group of ordered cases, that may be different in SKU, dimensions, etc. into mixed case pallet loads in the manner described in, for example, U.S. patent application Ser. No. 13/654,293 filed on Oct. 17, 2012 (now U.S. Pat. No. 8,965,559) the disclosure of which is incorporated herein by reference in its entirety.

In the exemplary embodiment, the output section generates the pallet load in what may be referred to as a structured architecture of mixed case stacks. The structured architecture of the pallet load described herein is representative and in other aspects the pallet load may have any other suitable configuration. For example, the structured architecture may be any suitable predetermined configuration such as a truck bay load or other suitable container or load container envelope holding a structural load. The structured architecture of the pallet load may be characterized as having several flat case layers L121-L125, L12 T, at least one of which is formed of non-intersecting, free-standing and stable stacks of multiple mixed cases. The mixed case stacks of the given layer have substantially the same height, to form as may be realized substantially flat top and bottom surfaces of the given layer, and may be sufficient in number to cover the pallet area, or a desired portion of the pallet area. Overlaying layer(s) may be orientated so that corresponding cases of the layer(s) bridge between the stacks of the supporting layer. Thus, stabilizing the stacks and correspondingly the interfacing layer(s) of the pallet load. In defining the pallet load into a structured layer architecture, the coupled 3-D pallet load solution is resolved into two parts that may be saved separately, a vertical (1-D) part resolving the load into layers, and a horizontal (2-D) part of efficiently distributing stacks of equal height to fill out the pallet height of each layer. As will be described below, the storage and retrieval system outputs case units to the output section so that the two parts of the 3-D pallet load solution are resolved. The predetermined structure of the mixed pallet load defines an order of case units, whether the case units are a singular case unit pickface or a combined case unit pickface provided by the sortation and output sections to a load construction system (which may be automated or manual loading).

In accordance with aspects of the disclosed embodiment, referring again to FIG. 1, the automated storage and retrieval system 100 includes input stations 160IN (which include depalletizers 160PA and/or conveyors 160CA for transporting items to lift modules for entry into storage) and output stations 160UT (which include palletizers 160PB, operator stations 160EP and/or conveyors 160CB for transporting case units from lift modules for removal from storage), input and output vertical lift modules 150A, 150B (generally referred to as lift modules 150—it is noted that while input and output lift modules are shown, a single lift module may be used to both input and remove case units from the storage structure), a storage structure 130, and a number of autonomous rovers or transport vehicles 110 (referred to herein as "bots"). It is noted that the depalletizers 160PA may be configured to remove case units from pallets so that the input station 160IN can transport the items to the lift modules 150 for input into the storage structure 130. The palletizers 160PB may be configured to place items removed from the storage structure 130 on pallets PAL (FIG. 1F) for shipping. As used herein the lift modules 150, storage structure 130 and bots 110 may be collectively referred to herein as the multilevel automated storage array (e.g. storage and sorting section) noted above so as to define (e.g. relative to e.g. a bot 110 frame of reference REF—FIG. 6—or any other suitable storage and retrieval system frame of reference) transport/throughput axes (in e.g. three dimensions) that serve the three dimensional multilevel automated storage array where each throughput axis has an integral "on the fly sortation" (e.g. sortation of case units during transport of the case units) so that case unit sorting and throughput occurs substantially simultaneously without dedicated sorters as will be described in further detail below. Sortation along each throughput axis is selectable so that a load out (e.g. transfer of outgoing case units to form a pallet load) is effected along all throughput axes or any combination of throughput axes/axis with substantially no throughput cost relative to a throughput of case units without any sortation (e.g. a "sortationless" throughput). As an example of case unit throughput as it relates to sortation, referring also to FIG. 1A, the storage and retrieval system 100 includes several areas or regions of throughput. For example, there is multi-level case unit storage throughput 130LTP (e.g. placement of case units into storage), horizontal case unit transport throughput 110TP (e.g. a transfer of case unit(s) from storage along the picking aisles and transfer decks), case buffering throughput BTSTP (e.g. buffering of case units to facilitate transfer of the case units between storage and vertical transport), vertical transport throughput 150TP (e.g. transfer of case units by the vertical lifts), and throughput at the output stations 160TP which includes, e.g., transport by conveyors 160CB and palletizing by palletizer 160PB. In one aspect sortation of case units, as described herein, is effected substantially coincident (e.g. "on the fly") with throughput 130LTP, 110TP, BTSTP, 150TP of case units along each throughput axis (e.g. the X, Y, Z axes relative to, for example, a bot 110 and or lift 150 frame of reference) and sortation along each axis is independently selectable so that sortation is effected along one or more X, Y, Z axes.

As may be realized, an on the fly sortation of case units occurs, in one aspect, on the bot 110 without offloading case units/pickfaces carried by the bot 110 when the bot 110 is one of both moving between case unit/pickface holding locations and static/standing (e.g. not traversing a transfer deck, picking aisle, etc.) As will be described below, one or more of high density multi-level shelving aisles, linear buffer stations BS along the transfer decks 130B and linear multi-place transfer stations TS effect on the fly substantially coincident sortation with throughput along the X axis. As will also be described below, one or more of the bot 110 transfer arm and end effector 110PA (which is configured to sort cases/pickfaces through end effector traverse along the Y axis for multi-independent picking/placing of cases/pickfaces where the Y axis is defined by the extension of the transfer arm 110PA and is in a different direction angled relative to another of the transport axes defined by the bot 110 along the picking aisle 130A) and independent load handling devices of the lifts 150 (configured for sortation on the lift platforms through extension of the load handling device in along the Y axis) effect on the fly substantially coincident sortation with throughput along the Y axis. As may be realized, the lifts 150 are configured to transport pickfaces between different transfer deck levels and provide on the fly substantially coincident sortation with throughput along the Z axis (which is defined by the lifts 150) as will be described herein. In one aspect the lift is configured to pick one or more pickfaces from one or more transfer deck levels and transport the one or more pickfaces to a load fill section or cell (such as output station 160UT) of the storage and retrieval system 100. The term load fill section or load fill cell (used interchangeably herein, and generally referred to as a load fill) refers to either a pallet load fill section/cell (such as for the creation of a mixed pallet load MPL) or an itemized load fill section/cell as described with respect to FIG. 26.

Figure 1G:
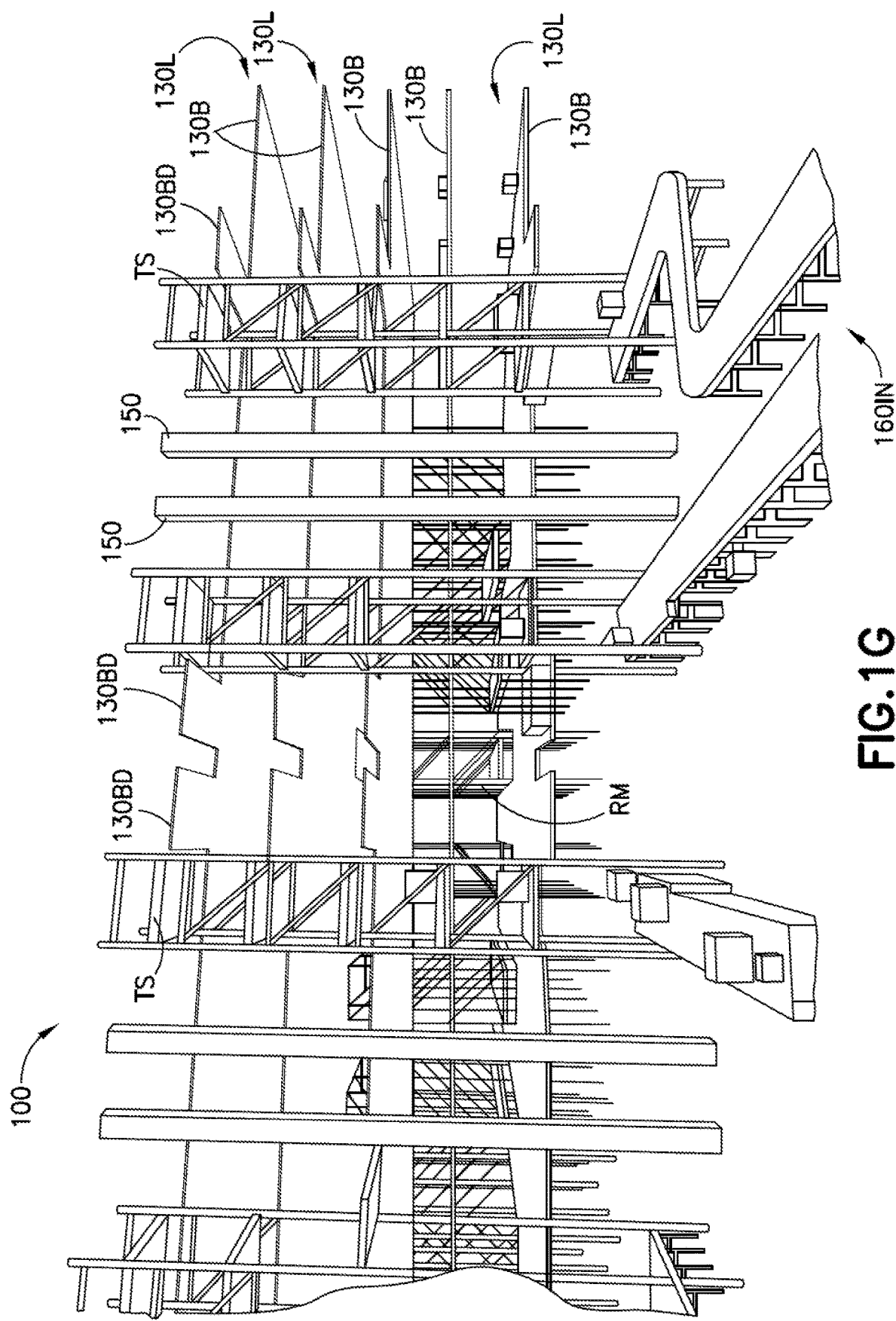
FIG. 1G is a schematic illustration of a portion of the automated storage and retrieval system in accordance with aspects of the disclosed embodiment.
Figure 2A:
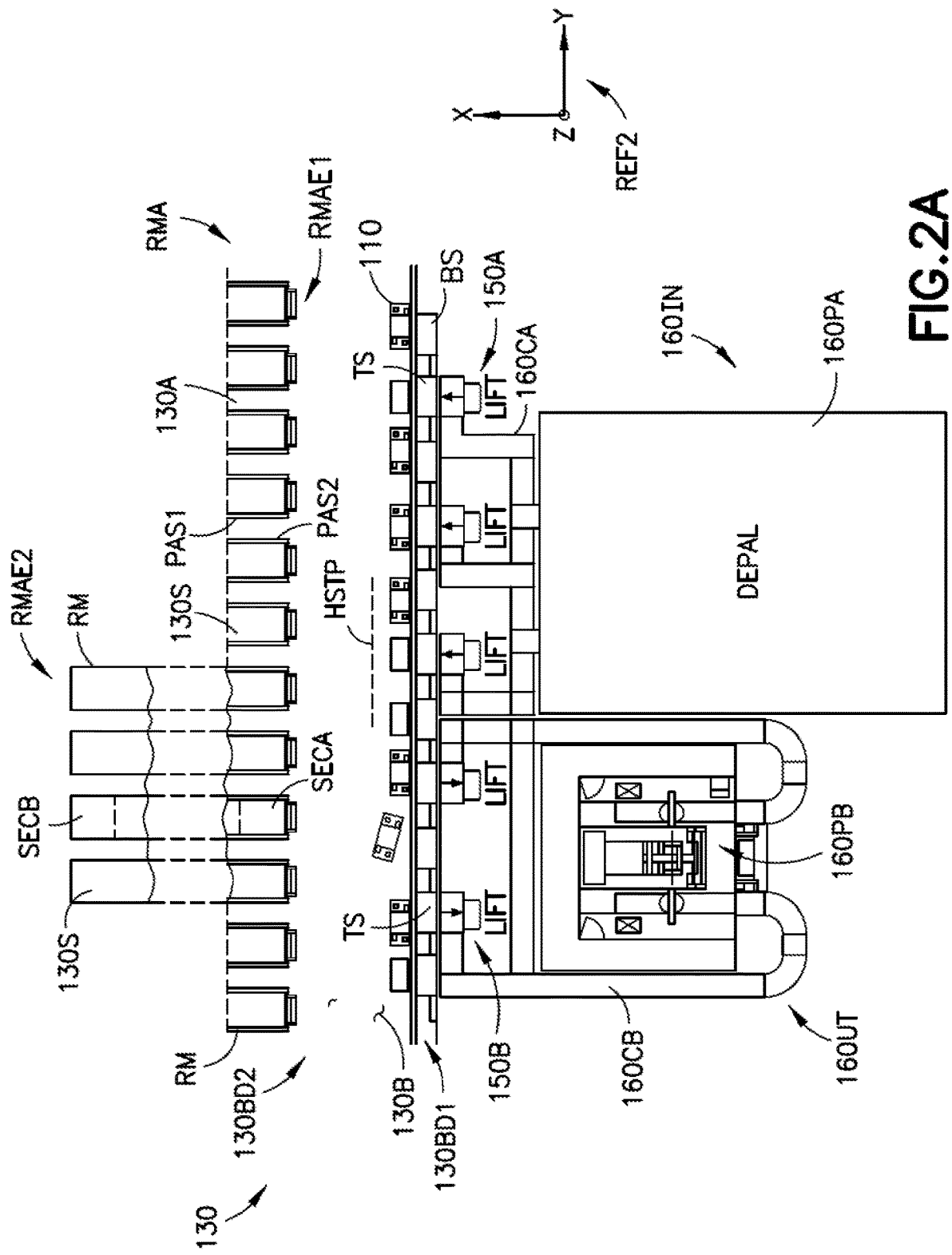
FIGS. 2A and 2B are schematic illustrations of portions of the storage and retrieval system in accordance with aspects of the disclosed embodiment.

Also referring to FIGS. 1G and 2A, the storage structure 130 may include multiple storage rack modules RM, configured in a high density three dimensional rack array RMA, that are accessible by storage or deck levels 130L. As used herein the term "high density three dimensional rack array"

refers to the three dimensional rack array RMA having undeterministic open shelving distributed along picking aisles 130A where multiple stacked shelves are accessible from a common picking aisle travel surface or picking aisle level (e.g. case units are placed at each picking aisle level within dynamically allocated storage spaces so that the vertical space/gap VG and horizontal space/gap G between case units is minimized at each picking aisle level, as will be described in greater detail below).

Each storage level 130L includes pickface storage/hand-off spaces 130S (referred to herein as storage spaces 130S) formed by the rack modules RM where the rack modules include shelves that are disposed along storage or picking aisles 130A (that are connected to the transfer deck 130B) which, e.g., extend linearly through the rack module array RMA and provide bot 110 access to the storage spaces 130S and transfer deck(s) 130B. In one aspect, the shelves of the rack modules RM are arranged as multi-level shelves that are distributed along the picking aisles 130A. As may be realized the bots 110 travel on a respective storage level 130L along the picking aisles 130A and the transfer deck 130B for transferring case units between any of the storage spaces 130S of the storage structure 130 (e.g. on the level which the bot 110 is located) and any of the lift modules 150 (e.g. each of the bots 110 has access to each storage space 130S on a respective level and each lift module 150 on a respective storage level 130L). The transfer decks 130B are arranged at different levels (corresponding to each level 130L of the storage and retrieval system) that may be stacked one over the other or horizontally offset, such as having one transfer deck 130B at one end or side RMAE1 of the storage rack array RMA or at several ends or sides RMAE1, RMAE2 of the storage rack array RMA as described in, for example, U.S. patent application Ser. No. 13/326,674 filed on Dec. 15, 2011 the disclosure of which is incorporated herein by reference in its entirety.

Figure 6:
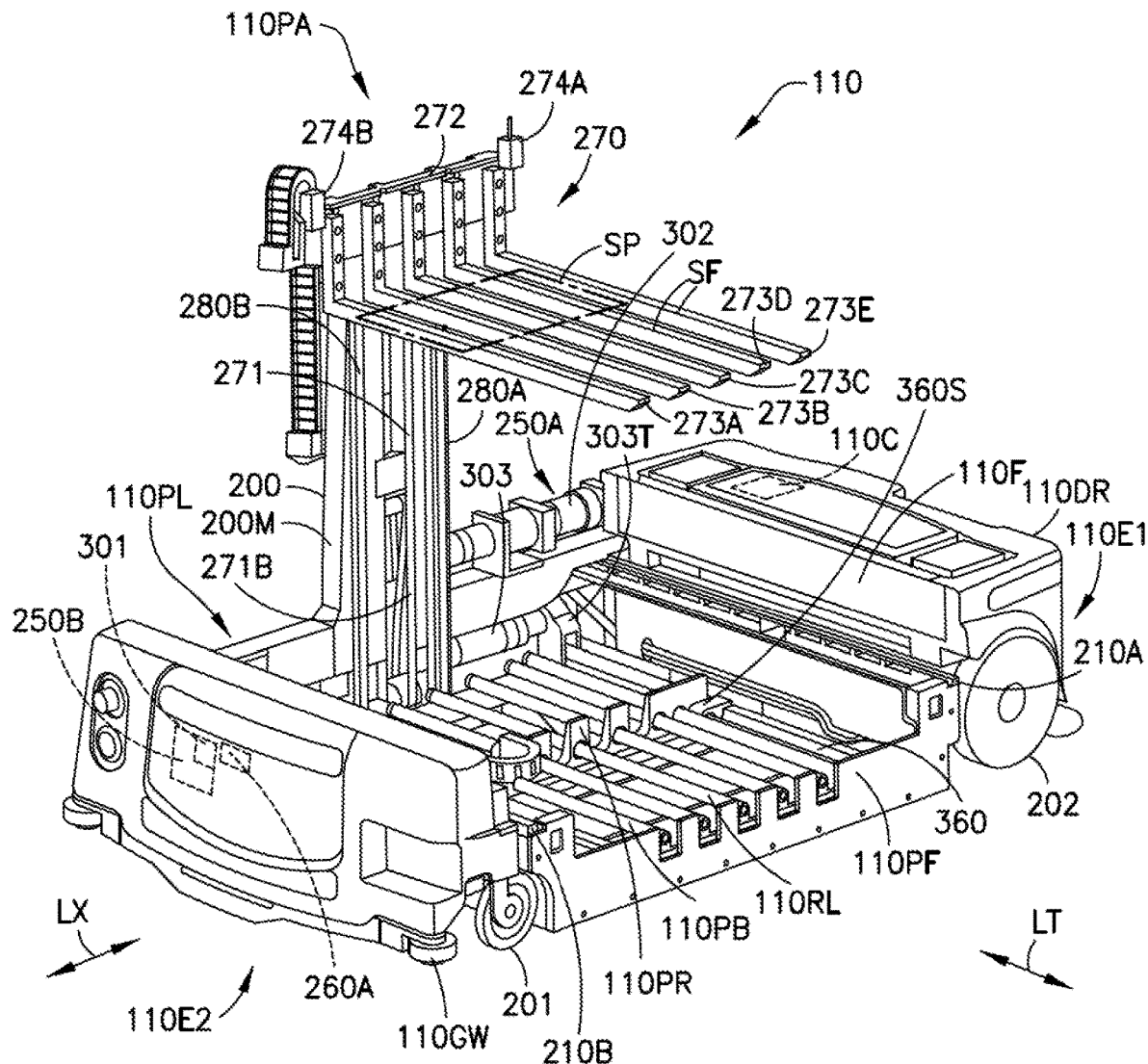
FIG. 6 is a schematic illustration of a transport vehicle in accordance with aspects of the disclosed embodiment.

The transfer decks 130B are substantially open and configured for the undeterministic traversal of bots 110 along multiple travel lanes (e.g. along the X throughput axis with respect to the bot frame of reference REF illustrated in FIG. 6) across and along the transfer decks 130B. As may be realized, the transfer deck(s) 130B at each storage level 130L communicate with each of the picking aisles 130A on the respective storage level 130L. Bots 110 bi-directionally traverse between the transfer deck(s) 130B and picking aisles 130A on each respective storage level 130L so as to travel along the picking aisles (e.g. along the X throughput axis with respect to the bot frame of reference REF illustrated in FIG. 6) and access the storage spaces 130S disposed in the rack shelves alongside each of the picking aisles 130A (e.g. bots 110 may access, along the Y throughput axis, storage spaces 130S distributed on both sides of each aisle such that the bot 110 may have a different facing when traversing each picking aisle 130A, for example, referring to FIG. 6, drive wheels 202 leading a direction of travel or drive wheels trailing a direction of travel). As may be realized, throughput outbound from the storage array in the horizontal plane corresponding to a predetermined storage or deck level 130L is effected by and manifest in the combined or integrated throughput along both the X and Y throughput axes. As noted above, the transfer deck(s) 130B also provides bot 110 access to each of the lifts 150 on the respective storage level 130L where the lifts 150 feed and remove case units (e.g. along the Z throughput axis) to and/or from each storage level 130L and where the bots 110 effect case unit transfer between the lifts 150 and the storage spaces 130S.

As described above, referring also to FIG. 2A, in one aspect the storage structure 130 includes multiple storage rack modules RM, configured in a three dimensional array RMA where the racks are arranged in aisles 130A, the aisles 130A being configured for bot 110 travel within the aisles 130A. The transfer deck 130B has an undeterministic transport surface on which the bots 100 travel where the undeterministic transport surface 130BS has more than one juxtaposed travel lane (e.g. high speed bot travel paths HSTP) connecting the aisles 130A. As may be realized, the juxtaposed travel lanes are juxtaposed along a common undeterministic transport surface 130BS between opposing sides 130BD1, 130BD2 of the transfer deck 130B. As illustrated in FIG. 2A, in one aspect the aisles 130A are joined to the transfer deck 130B on one side 130BD2 of the transfer deck 130B but in other aspects, the aisles are joined to more than one side 130BD1, 130BD2 of the transfer deck 130B in a manner substantially similar to that described in U.S. patent application Ser. No. 13/326,674 filed on Dec. 15, 2011, the disclosure of which is previously incorporated by reference herein in its entirety. As will be described in greater detail below the other side 130BD1 of the transfer deck 130B includes deck storage racks (e.g. interface stations TS and buffer stations BS) that are distributed along the other side 130BD1 of the transfer deck 130B so that at least one part of the transfer deck is interposed between the deck storage racks (such as, for example, buffer stations BS or transfer stations TS) and the aisles 130A. The deck storage racks are arranged along the other side 130BD1 of the transfer deck 130B so that the deck storage racks communicate with the bots 110 from the transfer deck 130B and with the lift modules 150 (e.g. the deck storage racks are accessed by the bots 110 from the transfer deck 130B and by the lifts 150 for picking and placing pickfaces so that pickfaces are transferred between the bots 110 and the deck storage racks and between the deck storage racks and the lifts 150 and hence between the bots 110 and the lifts 150).

Referring again to FIG. 1, each storage level 130L may also include charging stations 130C for charging an on-board power supply of the bots 110 on that storage level 130L such as described in, for example, U.S. patent application Ser. No. 14/209,086 filed on Mar. 13, 2014 and Ser. No. 13/326,823 filed on Dec. 15, 2011 (now U.S. Pat. No. 9,082,112), the disclosures of which are incorporated herein by reference in their entireties.

The bots 110 may be any suitable independently operable autonomous transport vehicles that carry and transfer case units along the X and Y throughput axes throughout the storage and retrieval system 100. In one aspect the bots 110 are automated, independent (e.g. free riding) autonomous transport vehicles. Suitable examples of bots can be found in, for exemplary purposes only, U.S. patent application Ser. No. 13/326,674 filed on Dec. 15, 2011; U.S. patent application Ser. No. 12/757,312 filed on Apr. 9, 2010 (now U.S. Pat. No. 8,425,173); U.S. patent application Ser. No. 13/326,423 filed on Dec. 15, 2011; U.S. patent application Ser. No. 13/326,447 filed on Dec. 15, 2011 (now U.S. Pat. No. 8,965,619); U.S. patent application Ser. No. 13/326,505 Dec. 15, 2011 (now U.S. Pat. No. 8,696,010); U.S. patent application Ser. No. 13/327,040 filed on Dec. 15, 2011 (now U.S. Pat. No. 9,187,244); U.S. patent application Ser. No. 13/326,952 filed on Dec. 15, 2011; U.S. patent application Ser. No. 13/326,993 filed on Dec. 15, 2011; U.S. patent application Ser. No. 14/486,008 filed on Sep. 15, 2014; and U.S. Provisional Patent Application No. 62/107,135 filed on Jan. 23, 2015, the disclosures of which are incorporated by reference herein in their entireties. The bots 110 (described in greater detail below) may be configured to place case units, such as the above described retail merchandise, into picking stock in the one or more levels of the storage structure 130 and then selectively retrieve ordered case units. As may be realized, in one aspect, the throughput axes X and Y (e.g. pickface transport axes) of the storage array are defined by the picking aisles 130A, at least one transfer deck 130B, the bot 110 and the extendable end effector (as described herein) of the bot 110 (and in other aspects the extendable end effector of the lifts 150 also, at least in part, defines the Y throughput axis). The pickfaces are transported between an inbound section of the storage and retrieval system 100, where pickfaces inbound to the array are generated (such as, for example, input station 160IN) and a load fill section of the storage and retrieval system 100 (such as for example, output station 160UT), where outbound pickfaces from the array are arranged to fill a load in accordance with a predetermined load fill order sequence. In one aspect, the storage rack modules RM and the bots 110 are arranged so that in combination the storage rack modules RM and the bots 110 effect the on the fly sortation of mixed case pickfaces coincident with transport on at least one (or in other aspects on at least one of each of the more than one) of the throughput axes so that two or more pickfaces are picked from one or more of the storage spaces and placed at one or more pickface holding locations (such as, for example, the buffer and transfer stations BS, TS), that are different than the storage spaces 130S, according to the predetermined load fill order sequence.

The bots 110, lift modules 150 and other suitable features of the storage and retrieval system 100 are controlled in any suitable manner such as by, for example, one or more central system control computers (e.g. control server) 120 through, for example, any suitable network 180. In one aspect the network 180 is a wired network, a wireless network or a combination of wireless and wired networks using any suitable type and/or number of communication protocols. In one aspect, the control server 120 includes a collection of substantially concurrently running programs (e.g. system management software) for substantially automatic control of the automated storage and retrieval system 100. The collection of substantially concurrently running programs, for example, being configured to manage the storage and retrieval system 100 including, for exemplary purposes only, controlling, scheduling, and monitoring the activities of all active system components, managing inventory (e.g. which case units are input and removed, the order in which the cases are removed and where the case units are stored) and pickfaces (e.g. one or more case units that are movable as a unit and handled as a unit by components of the storage and retrieval system), and interfacing with a warehouse management system 2500. The control server 120 may, in one aspect, be configured to control the features of the storage and retrieval system in the manner described herein. For simplicity and ease of explanation the term "case unit(s)" is generally used herein for referring to both individual case units and pickfaces (a pickface is formed of multiple case units that are moved as a unit).

Referring also to FIGS. 1B and 1D the rack module array RMA of the storage structure 130 includes vertical support members 1212 and horizontal support members 1200 that define the high density automated storage array as will be described in greater detail below. Rails 1200S may be mounted to one or more of the vertical and horizontal support members 1212, 1200 in, for example, picking aisles 130A and be configured so that the bots 110 ride along the rails 1200S through the picking aisles 130A. At least one side of at least one of the picking aisles 130A of at least one storage level 130L may have one or more storage shelves (e.g. formed by rails 1210, 1200 and slats 1210S) provided at differing heights so as to form multiple shelf levels 130LS1-130LS4 between the storage or deck levels 130L defined by the transfer decks 130B (and the rails 1200S which form an aisle deck). Accordingly, there are multiple rack shelf levels 130LS1-130LS4, corresponding to each storage level 130L, extending along one or more picking aisles 130A communicating with the transfer deck 130B of the respective storage level 130L. As may be realized, the multiple rack shelf levels 130LS1-130LS4 effect each storage level 130L having stacks of stored case units (or case layers) that are accessible from a common deck 1200S of a respective storage level 130L (e.g. the stacks of stored cases are located between storage levels).

As may be realized, bots 110 traversing a picking aisle 130A, at a corresponding storage level 130L, have access (e.g. for picking and placing case units) to each storage space 130S that is available on each shelf level 130LS1-130LS4, where each shelf level 130LS1-130LS4 is located between adjacent vertically stacked storage levels 130L on one or more side(s) PAS1, PAS2 (see e.g. FIG. 2A) of the picking aisle 130A. As noted above, each of the storage shelf levels 130LS1-130LS4 is accessible by the bot 110 from the rails 1200 (e.g. from a common picking aisle deck 1200S that corresponds with a transfer deck 130B on a respective storage level 130L). As can be seen in FIGS. 1B and 1D there are one or more intermediate shelf rails 1210 vertically spaced (e.g. in the Z direction) from one another (and from rails 1200) to form multiple stacked storage spaces 130S each being accessible by the bot 110 from the common rails 1200S. As may be realized, the horizontal support members 1200 also form shelf rails (in addition to shelf rails 1210) on which case units are placed.

Each stacked shelf level 130LS1-130LS4 (and/or each single shelf level as described below) of a corresponding storage level 130L defines an open and undeterministic two dimensional storage surface (e.g. having a case unit support plane CUSP as shown in FIG. 1D) that facilitates a dynamic allocation of pickfaces both longitudinally (e.g. along a length of the aisle or coincident with a path of bot travel defined by the picking aisle) and laterally (e.g. with respect to rack depth, transverse to the aisle or the path of bot travel). Dynamic allocation of the pickfaces and case units that make up the pickfaces is provided, for example, in the manner described in U.S. Pat. No. 8,594,835 issued on Nov. 26, 2013, the disclosure of which is incorporated by reference herein in its entirety. For example, the controller, such as controller 120 monitors the case units stored on the shelves and the empty spaces or storage locations between the case units. The empty storage locations are dynamically allocated such that, for exemplary purposes only, one case having a first size is replaced by three cases each having a second size which when combined fits into the space previously reserved for the first size case, or vice versa. Dynamic allocation substantially continuously resizes the empty storage locations as case units are placed on and removed from the storage shelves (e.g. the storage locations do not have a predetermined size and/or location on the storage shelves). As such, case unit (or tote) pickfaces of variable lengths and widths are positioned at each two dimensional storage location on the storage shelves (e.g. on each storage shelf level 130LS1-130LS4) with minimum gaps G (e.g. that effect picking/placing of case units free from contact with other case units stored on the shelves, see FIG. 1B) between adjacent stored case units/storage spaces.

As described above, the spacing between the rails 1200, 1210 (e.g. storage shelves) is a variable spacing so as to minimize (e.g. provide only sufficient clearance for insertion and removal of case units from a respective storage location) the vertical gap VG between vertically stacked case units. As will be described below (e.g. with respect to sections SECA, SECB in FIGS. 1B and 2A), in one aspect the vertical spacing between rails 1200, 1210 varies along a length of a respective picking aisle 130A while in other aspects the spacing between rails 1200, 1210 may be substantially continuous along a picking aisle 130A. As may be realized and as described in greater detail below, the spacing between the rails 1200, 1210 on one side PAS1 (FIG. 2A) of a picking aisle 130A may be different than the spacing between rails 1200, 1210 on an opposite side PAS2 (FIG. 2A) of the same picking aisle 130A. As may be realized, any suitable number of shelves 1210 may be provided between the decks 1200S of adjacent vertically stacked storage levels 130L where the shelves have the same or differing pitches between the shelves (see e.g. FIG. 1C where case units CUD1, CUD2, CUE1-CUE3, CUF1, CUF2 are located in a vertical stack on one side of the picking aisle and case units CUA, CUB, CUC are located in a vertical stack on an opposite side of the picking aisle on storage shelves having a substantially similar pitch). In one aspect of the disclosed embodiment, referring to FIG. 1B, a vertical pitch between rack shelf levels 130LS1-130LS4 (that corresponds to each storage level 130L) is varied so that a height Z1A-Z1E between the shelves is different, rather than equal to, for example, minimize a vertical gap VG between an upper or top surface CUTS of a case unit CU and a bottom of the storage shelf 1200, 1210 located directly above the case unit. As can be seen in FIG. 1B, minimizing the gaps G, VG in both the horizontal and vertical directions results in a densely packed case unit arrangement within the storage shelves so as to form the high density three dimensional rack array RMA where, for example, the high density multi-level shelving aisles increases throughput along the X throughput axis and enables an ordered/sorted (e.g. according to the predetermined load out sequence) multi-pick of two or more case units from a common picking aisle in one common pass of the picking aisle as will be described below. For example, still referring to FIG. 1B, one section SECB of the storage level 130L includes two storage shelves 1200, 1210 where one shelf has a pitch of Z1A and the other shelf has a pitch of Z1B where Z1A and Z1B are different from each other. This differing pitch allows for the placement of case units CUD, CUE having differing heights in a stack one above the other on a common storage level 130L. In other aspects pitches Z1A, Z1B may be substantially the same. In this aspect the storage level 130L includes another storage section SECA that has three storage shelves where one shelf has a pitch of Z1E, one storage shelf has a pitch of Z1D and the other storage shelf has a pitch of Z1C where Z1E, Z1D and Z1C are different from each other. In other aspects at least two of the pitches Z1E, Z1D and Z1C are substantially the same. In one aspect the pitch between the shelves is arranged so that larger and/or heavier case units CUC, CUE are arranged closer to the deck 1200S than smaller and/or lighter case units CUD, CUA, CUB. In other aspects the pitch between the shelves is arranged so that the case units are arranged in any suitable positions that may or may not be related to case unit size and weight.

In other aspects, the vertical pitch between at least some of the rack shelves is the same so that the height Z1A-Z1E between at least some shelves is equal while the vertical pitch between other shelves is different. In still other aspects, the pitch of rack shelf levels 130LS1-130LS4 on one storage level is a constant pitch (e.g. the rack shelf levels are substantially equally spaced in the Z direction) while the pitch of rack shelf levels 130LS1-130LS4 on a different storage level is a different constant pitch.

In one aspect, the storage space(s) 130S defined by the storage shelf levels 130LS1-130LS4 between the storage or deck levels 130L accommodates case units of different heights, lengths, widths and/or weights at the different shelf levels 130LS1-130LS4 as described in, for example, U.S. Non-provisional application Ser. No. 14/966,978, filed on Dec. 11, 2015 and U.S. Provisional Patent Application 62/091,162 filed on Dec. 12, 2014, the disclosures of which are incorporated by reference herein in their entireties. For example, still referring to FIG. 1B the storage level 130L includes storage sections having at least one intermediate shelf 1210. In the example shown, one storage section includes one intermediate shelf 1210 while another storage section includes two intermediate shelves 1210 for forming shelf levels 130LS1-130LS4. In one aspect the pitch Z1 between storage levels 130L may be any suitable pitch such as, for example, about 32 inches to about 34 inches while in other aspects the pitch may be more than about 34 inches and/or less than about 32 inches. Any suitable number of shelves may be provided between the decks 1200S of adjacent vertically tacked storage levels 130L where the shelves have the same or differing pitches between the shelves (see e.g. FIG. 1C where case units CUD1, CUD2, CUE1-CUE3, CUF1, CUF2 are located in a vertical stack on one side of the picking aisle and case units CUA, CUB, CUC are located in a vertical stack on an opposite side of the picking aisle on storage shelves having a substantially similar pitch).

In one aspect of the disclosed embodiment the storage or deck levels 130L (e.g. the surface on which the bots 110 travel) are arranged at any suitable predetermined pitch Z1 that is not, for example, an integer multiple of the intermediate shelf pitch(es) Z1A-Z1E. In other aspects the pitch Z1 may be an integer multiple of the intermediate shelf pitch, such as for example, the shelf pitch may be substantially equal to the pitch Z1 so that the corresponding storage space has a height substantially equal to the pitch Z1. As may be realized, the shelf pitch Z1A-Z1E is substantially decoupled from the storage level 130L pitch Z1 and corresponds to general case unit heights as illustrated in FIG. 1B. In one aspect of the disclosed embodiment case units of different heights are dynamically allocated or otherwise distributed along each aisle within a storage space 130S having a shelf height commensurate with the case unit height. The remaining space between the storage levels 130L, both along the length of the aisle coincident with the stored case unit (e.g. in the X direction with respect to the rack frame of reference REF2 where the X direction is the same in the bot frame of reference REF as the bot travel through a picking aisle 130A) and alongside the stored case unit, being freely usable for dynamic allocation for cases of a corresponding height. As may be realized, the dynamic allocation of case units having different heights onto shelves having different pitches provides for stored case layers of different heights, between storage levels 130L on both sides of each picking aisle 130A, with each case unit being dynamically distributed along a common picking aisle 130A so that each case unit within each stored case layer being independently accessible (e.g. for picking/placing) by the bot in the common aisle. This high density placement/allocation of case units and the arrangement of the storage shelves provides maximum efficiency of storage space/volume use between the storage levels 130L, and hence of maximum efficiency of the rack module array RMA, with optimized distribution of case unit SKU's, as each aisle length may include multiple case units of different heights, yet each rack shelf at each shelf level may be filled by dynamic allocation/distribution (e.g. to fill the three dimensional rack module array RMA space in length, width and height, to provide a high density storage array).

Figure 6A:
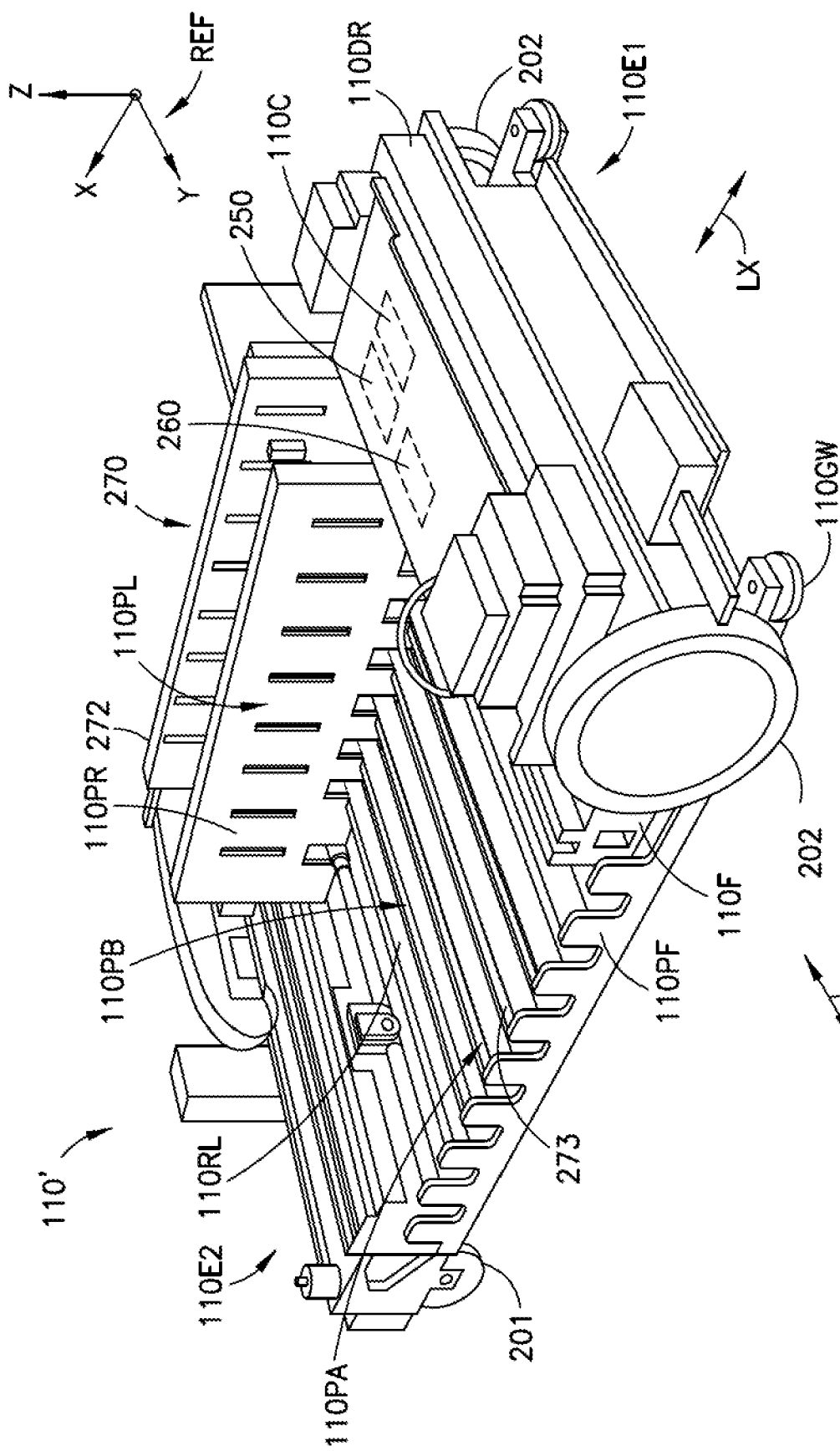
FIG. 6A is a schematic illustration of a transport vehicle in accordance with aspects of the disclosed embodiment.

In one aspect, referring to FIGS. 1E and 6A each of the storage levels 130L includes a single level of storage shelves to store a single level of case units (e.g. each storage level includes a single case unit support plane CUSP) and the bots 110 are configured to transfer case units to and from the storage shelves of the respective storage level 130L. For example, the bot 110' illustrated in FIG. 6A is substantially similar to bot 110 described herein however, the bot 110' is not provided with sufficient Z-travel of the transfer arm 110PA for placing case units on the multiple storage shelf levels 130LS1-130LS4 (e.g. accessible from a common rail 1200S) as described above. Here the transfer arm drive 250 (which may be substantially similar to one or more of drive 250A, 250B) includes only sufficient Z-travel for lifting the case units from the case unit support plane CUSP of the single level of storage shelves, for transferring the case units to and from the payload area 110PL and for transferring the case units between the fingers 273 of the transfer arm 110PA and the payload bed 110PB. Suitable examples of bots 110' can be found in, for example, U.S. patent application Ser. No. 13/326,993 filed on Dec. 15, 2011, the disclosure of which is incorporated herein by reference in its entirety.

In one aspect of the disclosed embodiment, referring also to FIG. 2A, the rack shelves 1210 (inclusive of the rack shelf formed by rail 1200) are sectioned SECA, SECB longitudinally (e.g. along the length of the picking aisle 130A in the X direction, with respect to a storage structure frame of reference REF2) to form ordered or otherwise matched rack shelf sections along each picking aisle 130A. The aisle shelf sections SECA, SECB are ordered/matched to each other based on, for example, a pick sequence of a bot 110 traversing the aisle in a common pass picking case units destined for a common order fill (e.g. based on the order out sequence). In other words, a bot 110 makes a single pass (e.g. traversal in a single direction) down a single or common picking aisle while picking one or more case units from aisle shelf sections SECA, SECB on a common side of the picking aisle 130A to build a pickface on the bot 110 where the pickface includes case units that are arranged on the bot according to the order fill/order out sequence as will be described in greater detail below. Each of the aisle rack sections SECA, SECB includes intermediate shelves in the manner described above. In other aspects some of the aisle shelves do not include intermediate shelves while others do include intermediate shelves.

In one aspect, the ordered aisle rack sections SECA, SECB include shelf pitches that are different between sections SECA, SECB. For example, aisle rack section SECA has shelves with one or more pitches while aisle rack section SECB has shelves with one or more different pitches (e.g. different than the pitches of the shelves in section SECA). In accordance with the aspects of the disclosed embodiment, the pitch of at least one intermediate shelf of one aisle rack section SECA, SECB is related to the pitch of at least one intermediate shelf of another of the ordered aisle rack sections SECA, SECB of the common picking aisle 130A. The different pitches of the intermediate shelves 1210 in the ordered aisle rack section SECA, SECB are selected so as to be related and to effect multiple (at least two) ordered picks (i.e. picks in an ordered sequence) with a bot 110, in accordance with a mixed SKU load out sequence (e.g. palletizing to a common pallet load), from shelves of different pitches, from a common pass of a common picking aisle 130A. As may be realized, the mixed load output from the storage and retrieval system 100 (e.g. to fill a truck loadport/pallet load) is sequenced in a predetermined order according to various load out picking aisles (e.g. aisles from which case units are picked for transfer to an outgoing pallet) and the shelf pitch in the ordered sections SECA, SECB facilitates a bot 110 pick of more than one case unit in ordered sequence according to an order of the load out sequence in a common picking aisle pass (e.g. more than one case unit is picked in a predetermined order from a common picking aisle in one pass of the common picking aisle). The different aisle shelf pitches of the ordered rack sections SECA, SECB are so related to increase the probability of such an ordered multi-pick (the picking of two or more case units from a single aisle with a single pass of the aisle as described above) so that the multi-pick is performed by each bot order fulfillment pass along each aisle, and so related such that more than a majority of cases picked in the storage and retrieval system 100 by the bots 110 and destined for a common load out (e.g. a common pallet load) are picked by a common bot 110 in an ordered sequence corresponding to the load out sequence during a single pass of a common picking aisle (e.g. the two or more cases picked by the bot 110 are picked from the same picking aisle in a single pass, e.g. the bot travels in a single direction once through the picking aisle). As may be realized, in one aspect of the disclosed embodiment both sides PAS1, PAS2 of the picking aisle 130A have ordered aisle rack sections SECA, SECB where one ordered section may be matched with one or more sections on the same side PAS1, PAS2 of the common picking aisle 130A. As may be realized, the matched aisle rack sections may be located adjacent one another or spaced apart from one another along the picking aisle 130A.

Referring again to FIG. 2A each transfer deck or storage level 130L includes one or more lift pickface interface/handoff stations TS (referred to herein as interface stations TS) where case unit(s) (of single or combined case pickfaces) or totes are transferred between the lift load handling devices LHD and bots 110 on the transfer deck 130B. The interface stations TS are located at a side of the transfer deck 130B opposite the picking aisles 130A and rack modules RM, so that the transfer deck 130B is interposed between the picking aisles and each interface station TS. As noted above, each bot 110 on each picking level 130L has access to each storage location 130S, each picking aisle 130A and each lift 150 on the respective storage level 130L, as such each bot 110 also has access to each interface station TS on the respective level 130L. In one aspect the interface stations are offset from high speed bot travel paths HSTP along the transfer deck 130B so that bot 110 access to the interface stations TS is undeterministic to bot speed on the high speed travel paths HSTP. As such, each bot 110 can move a case unit(s) (or pickface, e.g. one or more cases, built by the bot) from every interface station TS to every storage space 130S corresponding to the deck level and vice versa.

In one aspect the interface stations TS are configured for a passive transfer (e.g. handoff) of case units (and/or pickfaces) between the bot 110 and the load handing devices LHD of the lifts 150 (e.g. the interface stations TS have no moving parts for transporting the case units) which will be described in greater detail below. For example, also referring to FIG. 2B the interface stations TS and/or buffer stations BS include one or more stacked levels TL1, TL2 of transfer rack shelves RTS (e.g. so as to take advantage of the lifting ability of the bot 110 with respect to the stacked rack shelves RTS) which in one aspect are substantially similar to the storage shelves described above (e.g. each being formed by rails 1210, 1200 and slats 1210S) such that bot 110 handoff (e.g. pick and place) occurs in a passive manner substantially similar to that between the bot 110 and the storage spaces 130S (as described herein) where the case units or totes are transferred to and from the shelves. In one aspect the buffer stations BS on one or more of the stacked levels TL1, TL2 also serve as a handoff/interface station with respect to the load handling device LHD of the lift 150. In one aspect, where the bots, such as bots 110', are configured for the transfer of case units to a single level 130L of storage shelves, the interface stations TS and/or buffer stations BS also include a single level of transfer rack shelves (which are substantially similar to the storage rack shelves of the storage levels 130L described above with respect to, for example, FIG. 1D). As may be realized, operation of the storage and retrieval system with bots 110' serving the single level storage and transfer shelves is substantially similar to that described herein. As may also be realized, load handling device LHD handoff (e.g. pick and place) of case units (e.g. individual case units or pickfaces) and totes to the stacked rack shelves RTS (and/or the single level rack shelves) occurs in a passive manner substantially similar to that between the bot 110 and the storage spaces 130S (as described herein) where the case units or totes are transferred to and from the shelves. In other aspects the shelves may include transfer arms (substantially similar to the bot 110 transfer arm 110PA shown in FIG. 6, although Z direction movement may be omitted when the transfer arm is incorporated into the interface station TS shelves) for picking and placing case units or totes from one or more of the bot 110 and load handling device LHD of the lift 150. Suitable examples of an interface station with an active transfer arm are described in, for example, U.S. patent application Ser. No. 12/757,354 filed on Apr. 9, 2010, the disclosure of which is incorporated by reference herein in its entirety.

In one aspect, the location of the bot 110 relative to the interface stations TS occurs in a manner substantially similar to bot location relative to the storage spaces 130S. For example, in one aspect, location of the bot 110 relative to the storage spaces 130S and the interface stations TS occurs in a manner substantially similar to that described in U.S. patent application Ser. No. 13/327,035 filed on Dec. 15, 2011 (now U.S. Pat. No. 9,008,884) and Ser. No. 13/608,877 filed on Sep. 10, 2012 (now U.S. Pat. No. 8,954,188), the disclosures of which are incorporated herein by reference in their entireties. For example, referring to FIGS. 1 and 1D, the bot 110 includes one or more sensors 110S that detect the slats 1210S or a locating feature 130F (such as an aperture, reflective surface, RFID tag, etc.) disposed on/in the rail 1200. The Slats and/or locating features 130F are arranged so as to identify a location of the bot 110 within the storage and retrieval system, relative to e.g. the storages spaces and/or interface stations TS. In one aspect the bot 110 includes a controller 110C that, for example, counts the slats 1210S to at least in part determine a location of the bot 110 within the storage and retrieval system 100. In other aspects the location features 130F may be arranged so as to form an absolute or incremental encoder which when detected by the bot 110 provides for a bot 110 location determination within the storage and retrieval system 100.

Figure 2B:
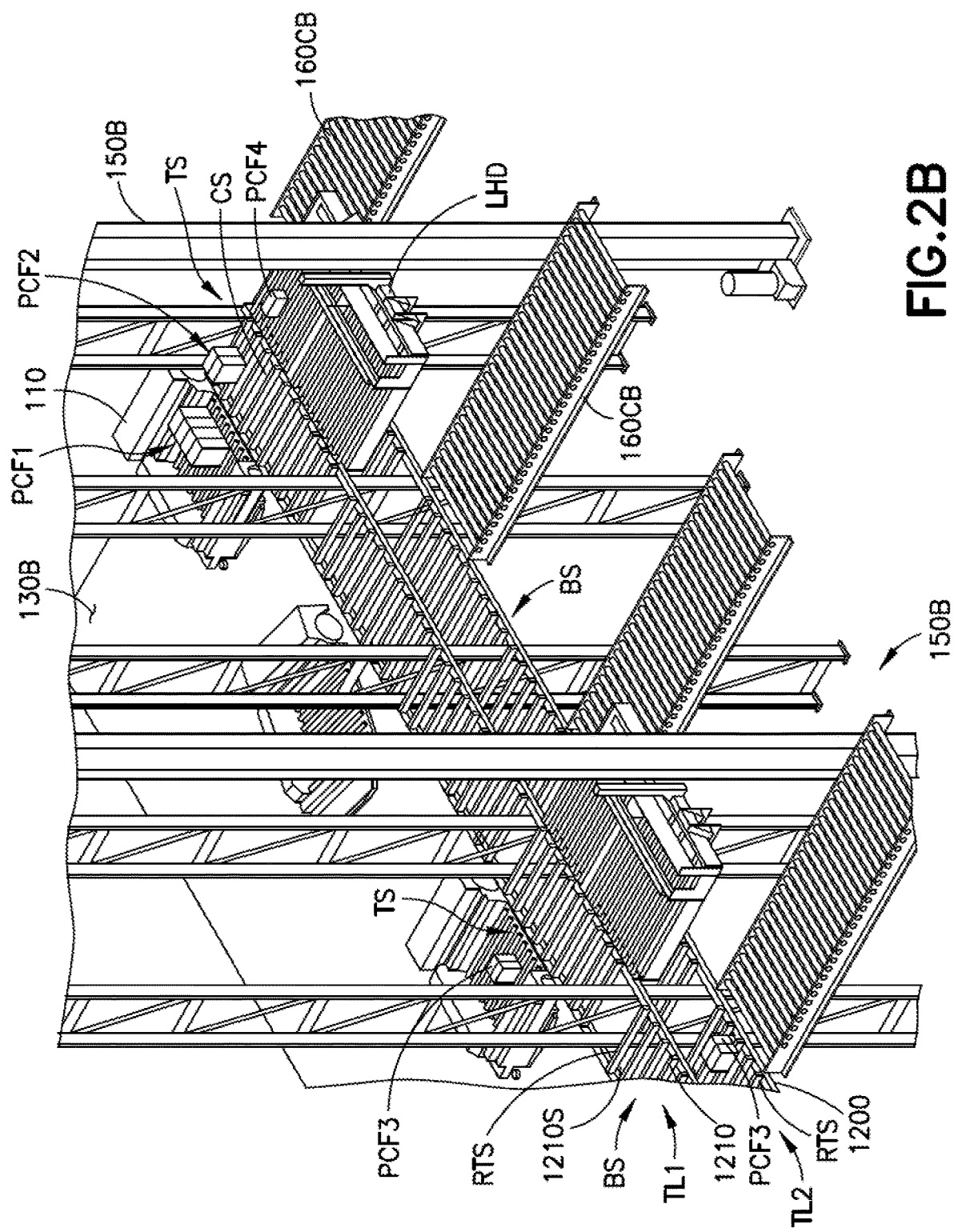

As may be realized, referring to FIG. 2B, the transfer rack shelves RTS at each interface/handoff station TS define multi-load stations (e.g. having one or more storage case unit holding locations for holding a corresponding number of case units or totes) on a common transfer rack shelf RS. As noted above, each load of the multi-load station is a single case unit/tote or a multi-case pickface (e.g. having multiple case units/totes that are moved as a single unit) that is picked and paced by either the bot or load handling device LHD. As may also be realized, the bot location described above allows for the bot 110 to position itself relative to the multi-load stations for picking and placing the case units/totes and pickfaces from a predetermined one of the holding locations of the multi-load station. The interface/handoff stations TS define multi-place buffers (e.g. buffers having one or more case holding location—see FIG. 4B—arranged along, for example, the X axis of the bot 110 as the bot 110 interfaces with the interface station TS) where inbound and/or outbound case units/totes and pickfaces are temporarily stored when being transferred between the bots 110 and the load handling devices LHD of the lifts 150.

In one aspect one or more peripheral buffer/handoff stations BS (substantially similar to the interface stations TS and referred to herein as buffer stations BS) are also located at the side of the transfer deck 130B opposite the picking aisles 130A and rack modules RM, so that the transfer deck 130B is interposed between the picking aisles and each buffer station BS. The peripheral buffer stations BS are interspersed between or, in one aspect as shown in FIGS. 2A and 2B, otherwise in line with the interface stations TS. In one aspect the peripheral buffer stations BS are formed by rails 1210, 1200 and slats 1210S and are a continuation of (but a separate section of) the interface stations TS (e.g. the interface stations and the peripheral buffer stations are formed by common rails 1210, 1200). As such, the peripheral buffer stations BS, in one aspect, also include one or more stacked levels TL1, TL2 of transfer rack shelves RTS as described above with respect to the interface stations TS while in other aspects the buffer stations include a single level of transfer rack shelves. The peripheral buffer stations BS define buffers where case units/totes and/or pickfaces are temporarily stored when being transferred from one bot 110 to another different bot 110 on the same storage level 130L as will be described in greater detail below. As maybe realized, in one aspect the peripheral buffer stations are located at any suitable location of the storage and retrieval system including within the picking aisles 130A and anywhere along the transfer deck 130B.

Still referring to FIGS. 2A and 2B in one aspect the interface stations TS are arranged along the transfer deck 130B in a manner akin to parking spaces on the side of a road such that the bots 110 "parallel park" at a predetermined interface station TS for transferring case units to and from one or more shelves RTS at one or more levels TL1, TL2 of the interface station TS. In one aspect, a transfer orientation of the bots 110 (e.g. when parallel parked) at an interface station TS is the same orientation as when the bot 110 is travelling along the high speed bot transport path HSTP (e.g. the interface station is substantially parallel with a bot travel direction of the transfer deck and/or a side of the transfer deck on which the lifts 150 are located). Bot 110 interface with the peripheral buffer stations BS also occurs by parallel parking so that a transfer orientation of the bots 110 (e.g. when parallel parked) at a peripheral buffer station BS is the same orientation as when the bot 110 is travelling along the high speed bot transport path HSTP.

Figure 3A:
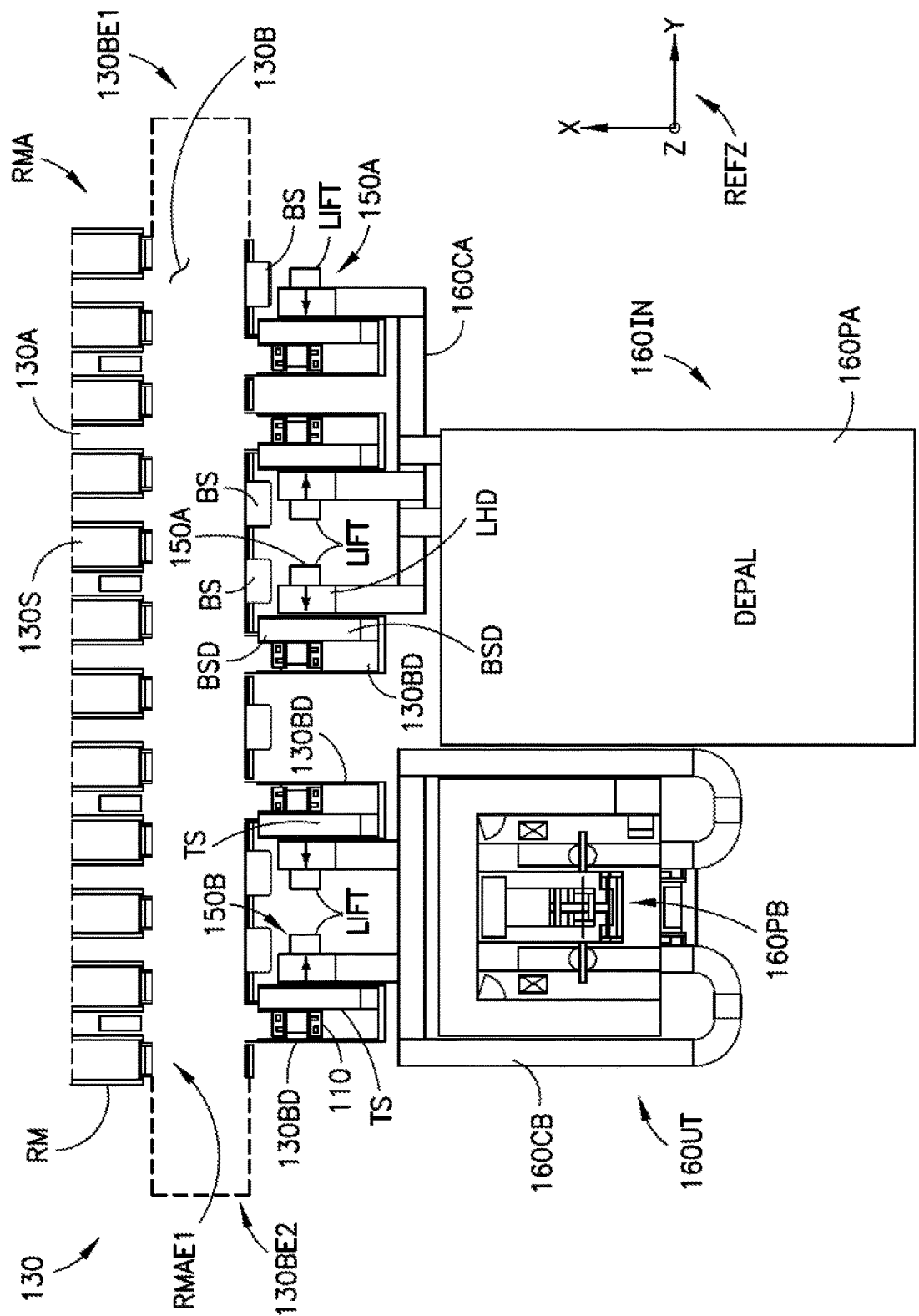
FIGS. 3A and 3B are schematic illustrations of portions of the storage and retrieval system in accordance with aspects of the disclosed embodiment.
Figure 3B:
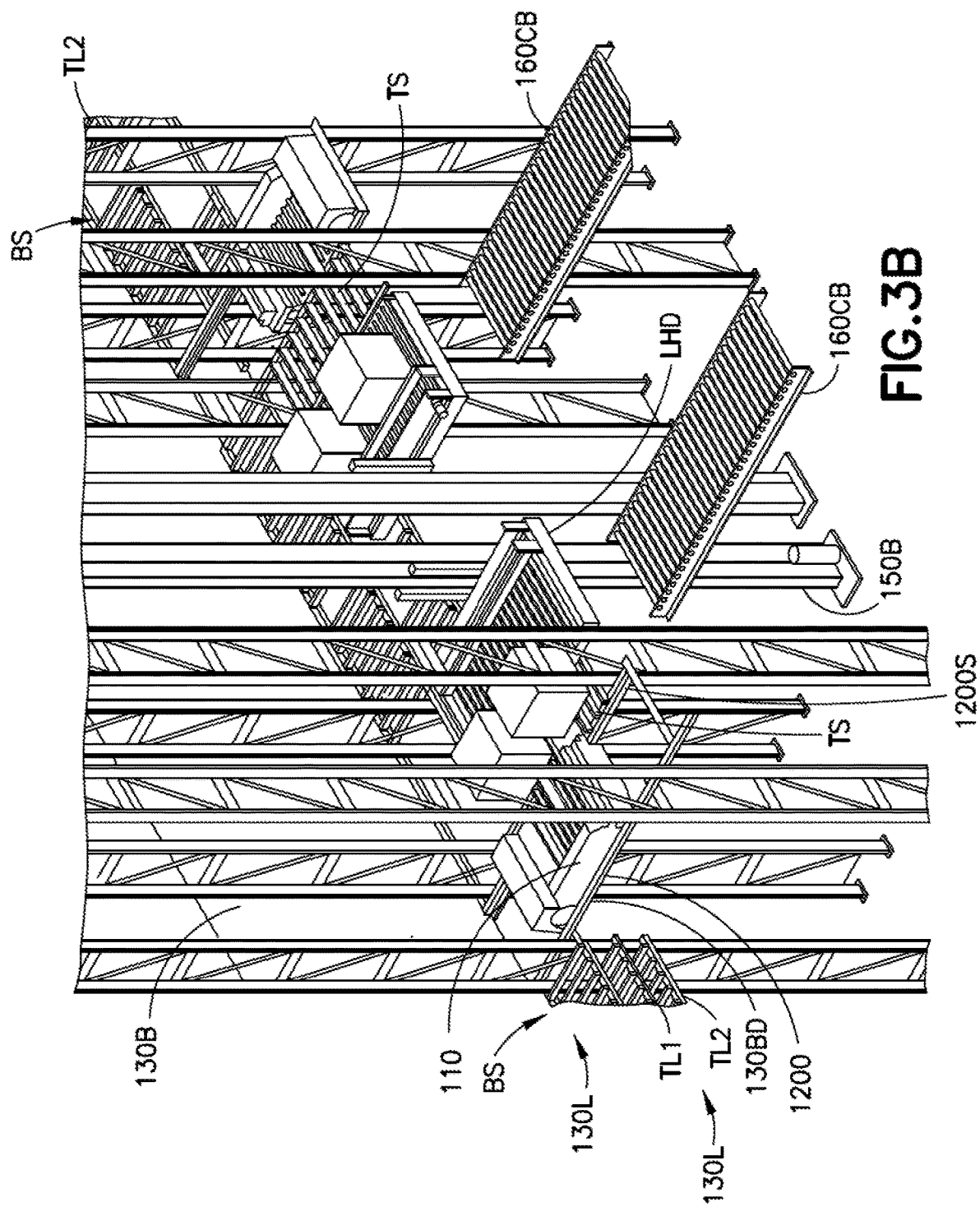

In another aspect, referring to FIGS. 3A and 3B, at least the interface stations TS are located on an extension portion or pier 130BD that extends from the transfer deck 130B. In one aspect, the pier 130BD is similar to the picking aisles where the bot 110 travels along rails 1200S affixed to horizontal support members 1200 (in a manner substantially similar to that described above). In other aspects, the travel surface of the pier 130BD may be substantially similar to that of the transfer deck 130B. Each pier 130BD is located at the side of the transfer deck 130B, such as a side that is opposite the picking aisles 130A and rack modules RM, so that the transfer deck 130B is interposed between the picking aisles and each pier 130BD. The pier(s) 130BD extends from the transfer deck at a non-zero angle relative to at least a portion of the high speed bot transport path HSTP. In other aspects the pier(s) 130BD extend from any suitable portion of the transfer deck 130B including the ends 130BE1, 130BE2 of the transfer deck 130BD. As may be realized, peripheral buffer stations BSD (substantially similar to peripheral buffers stations BS described above) may also be located at least along a portion of the pier 130BD.

Figure 4A:
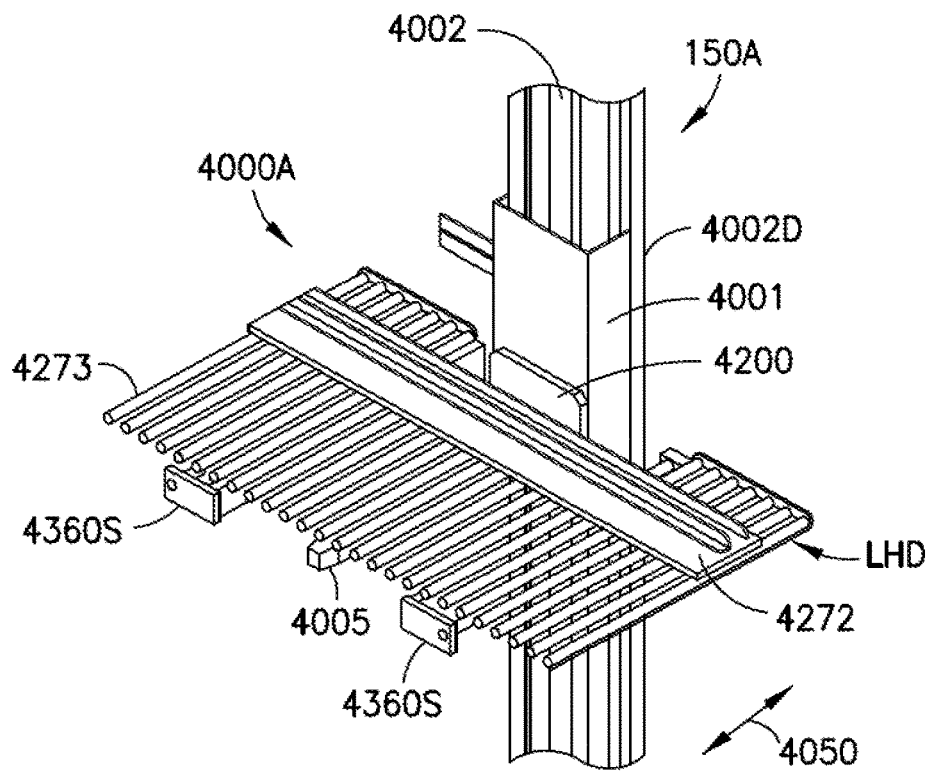
FIGS. 4A, 4B and 5 are schematic illustrations of portions of the storage and retrieval system in accordance with aspects of the disclosed embodiment.
Figure 4B:
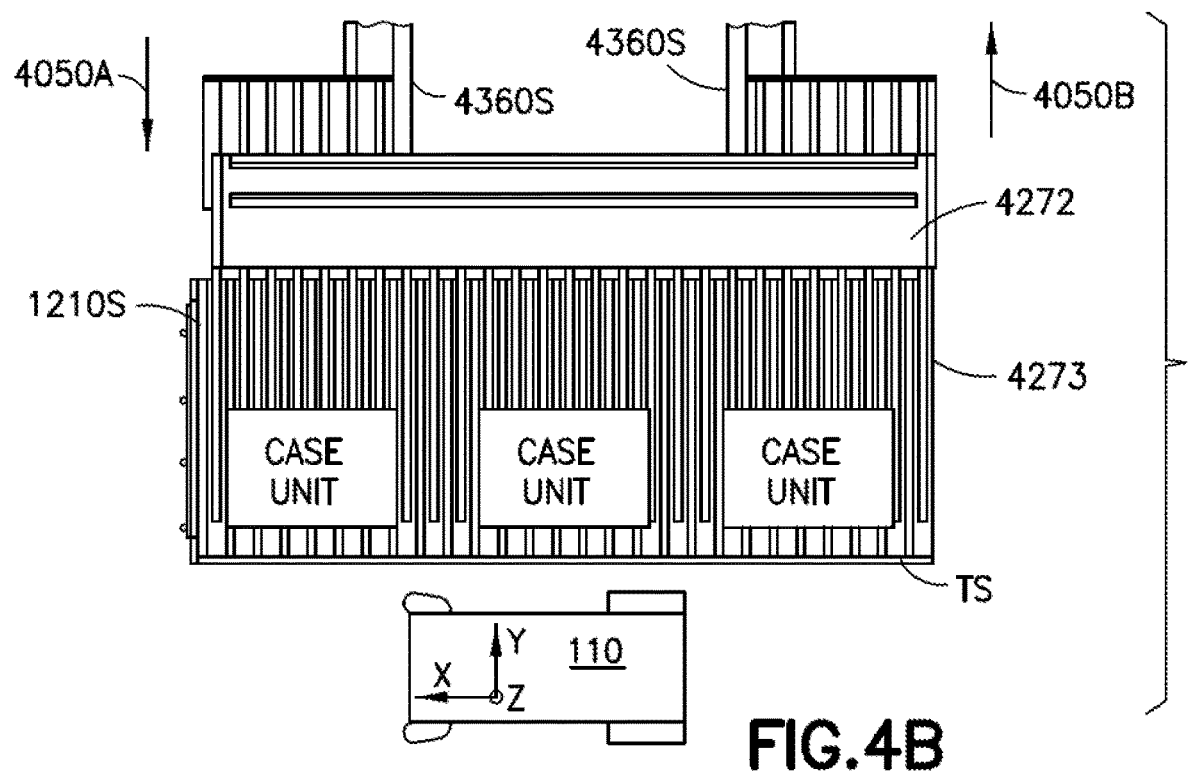
Figure 5:
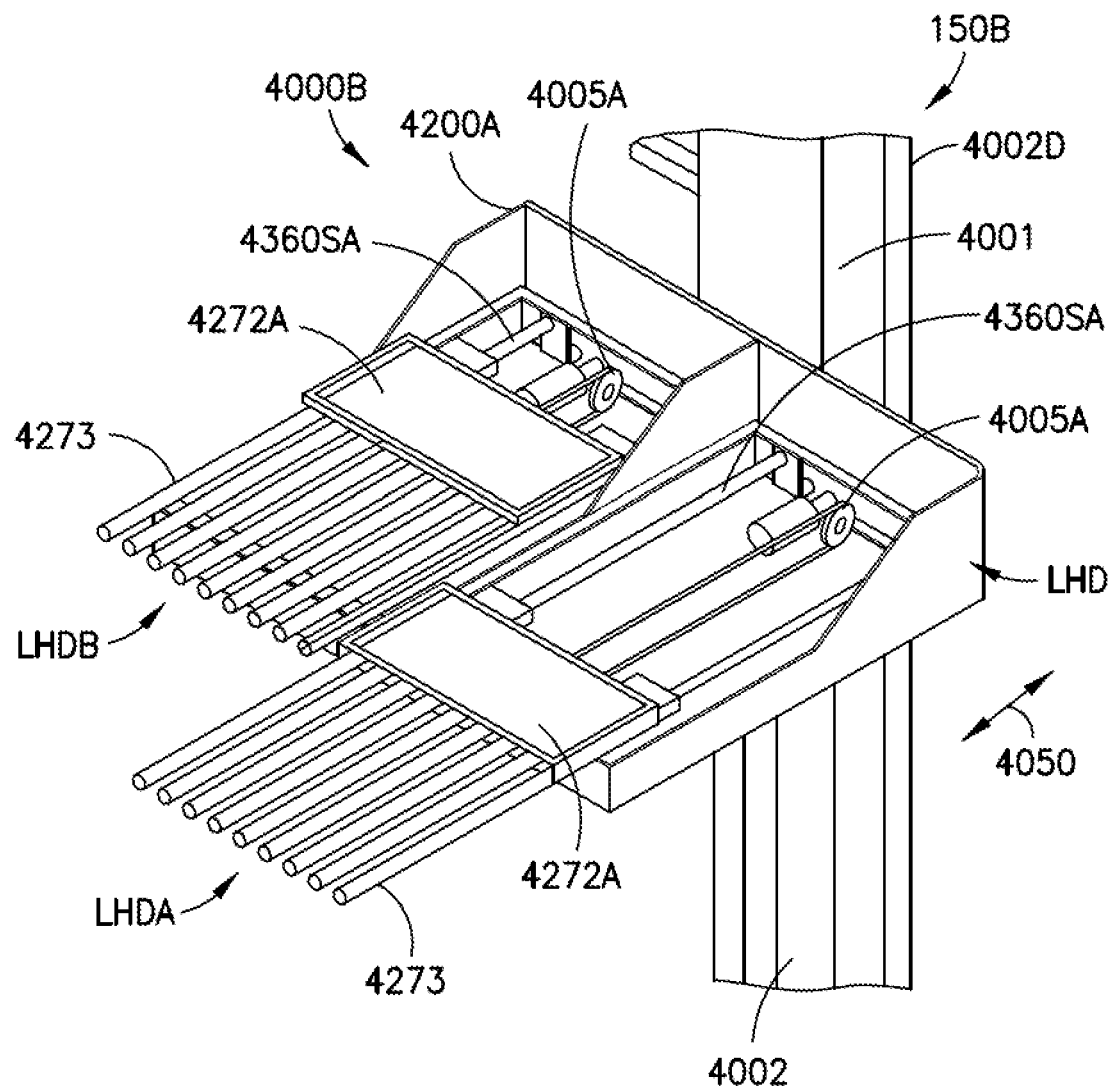

Referring now to FIGS. 4A, 4B and 5, as described above, in one aspect the interface stations TS are passive stations and as such the load transfer device LHD of the lifts 150A, 150B have active transfer arms or pick heads 4000A, 4000B. In one aspect the inbound lift modules 150A and the outbound lift modules 150B have different types of pick heads (as will be described below) while in other aspects the inbound lift modules 150A and the outbound lift modules 150B have the same type of pick head similar to one of the pick heads described below (e.g. both the lifts 150A, 150B have pick head 4000A or both lifts 150A, 150B have pick head 4000B). The pick heads of the lifts 150A, 150B may, at least in part, define the Y throughput axis as described herein. In one aspect, both the inbound and outbound lift modules 150A, 150B have a vertical mast 4002 along which a slide 4001 travels under the motive force of any suitable drive unit 4002D (e.g. connected to, for example, control server 120) configured to lift and lower the slide (and the pick head 4000A, 4000B mounted thereto). The inbound lift module(s) 150A include a pick head 4000A mounted to the slide 4001 so that as the slide moves vertically the pick head 4000A moves vertically with the slide 4001. In this aspect the pick head 4000A includes one or more tines or fingers 4273 mounted to a base member 4272. The base member 4272 is movably mounted to one or more rail 4360S of frame 4200 which in turn is mounted to the slide 4001. Any suitable drive unit 4005, such as a belt drive, chain drive, screw drive, gear drive, etc. (which is substantially similar in form but may not be similar in capacity to drive 4002D as the drive 4005 may be smaller than drive 4002D) is mounted to the frame 4200 and coupled to the base member 4272 for driving the base member 4272 (with the finger(s)) in the direction of arrow 4050.

The outbound lift module(s) 150B also include a pick head 4000B mounted to the slide 4001 so that as the slide moves vertically the pick head 4000B moves vertically with the slide 4001. In this aspect the pick head 4000B includes one or more pick head portions or effectors (e.g. transfer arms) LHDA, LHDB each having one or more tines or fingers 4273 mounted to a respective base member 4272A. Each base member 4272A is movably mounted to one or more rail 4360SA of frame 4200A which in turn is mounted to the slide 4001. Any suitable drive unit(s) 4005A, such as a belt drive, chain drive, screw drive, gear drive, etc. is mounted to the frame 4200A and coupled to a respective base member 4272A for driving the respective base member 4272A (with the finger(s)) in the direction of arrow 4050 (each effector has a respective drive unit so that each effector is independently movable in the direction of arrow 4050).

While two effectors LHDA, LHDB are illustrated on pick head 4000B the pick head 4000B includes any suitable number of effectors that correspond to a number of case unit/pickface holding locations of, for example, the interface stations TS so that case units/pickfaces are individually picked from the interface stations TS as described in greater detail below.

As may be realized, the lift modules 150A, 150B are under the control of any suitable controller, such as control server 120, such that when picking and placing case unit(s) the pick head is raised and/or lowered to a predetermined height corresponding to an interface station TS at a predetermined storage level 130L. As may be realized, the lift modules 150A, 150B provide the Z throughput axis (relative to both the bot frame of reference REF and the rack frame of reference REF2) of the storage and retrieval system where the output lift modules 150B sort case units on the fly for delivery to the output stations 160US as will be described below. At the interface stations TS the pick head 4000A, 4000B or individual portion thereof (e.g. effector LHDA, LHDB), corresponding to one or more case unit holding location(s) of the interface station TS from which one or more case unit(s) are being picked, is extended so that the fingers 4273 are interdigitated between the slats 1210S (as illustrated in FIG. 4B) underneath the case unit(s) being picked. The lift 150A, 150B raises the pick head 4000A, 4000B to lift the case unit(s) from the slats 1210S and retracts the pick head 4000A, 4000B for transport of the case unit(s) to another level of the storage and retrieval system, such as for transporting the case unit(s) to output station 160UT. Similarly, to place one or more case unit(s) the pick head 4000A, 4000B or individual portion thereof (e.g. effector LHDA, LHDB), corresponding to one or more case unit holding location(s) of the interface station TS from which one or more case unit(s) are being placed, is extended so that the fingers 4273 are above the slats. The lift 150A, 150B lowers the pick head 4000A, 4000B to place the case unit(s) on the slats 1210S and so that the fingers 4273 are interdigitated between the slats 1210S underneath the case unit(s) being picked.

Referring now to FIG. 6, as noted above, the bot 110 includes a transfer arm 110PA that effects the picking and placement of case units from the stacked storage spaces 130S, interface stations TS and peripheral buffer stations BS, BSD defined at least in part, in the Z direction by one or more of the rails 1210A-1210C, 1200 (e.g. where the storage spaces, interface stations and/or peripheral buffer stations may be further defined in the X and Y directions, relative to either of the rack frame of reference REF2 or the bot frame of reference REF, through the dynamic allocation of the case units as described above). As may be realized, the bot defines the X throughput axis and, at least in part, the Y throughput axis (e.g. relative to the bot frame of reference REF) as will be described further below. The bots 110, as noted above, transport case units between each lift module 150 and each storage space 130S on a respective storage level 130L. The bots 110 include a frame 110F having a drive section 110DR and a payload section 110PL. The drive section 110DR includes one or more drive wheel motors each connected to a respective drive wheel(s) 202 for propelling the bot 110 along the X direction (relative to the bot frame of reference REF so as to define the X throughput axis). As may be realized, the X axis of bot travel is coincident with the storage locations when the bot 110 travels through the picking aisles 130A. In this aspect the bot 110 includes two drive wheels 202 located on opposite sides of the bot 110 at end 110E1 (e.g. first longitudinal end) of the bot 110 for supporting the bot 110 on a suitable drive surface however, in other aspects any suitable number of drive wheels are provided on the bot 110. In one aspect each drive wheel 202 is independently controlled so that the bot 110 may be steered through a differential rotation of the drive wheels 202 while in other aspects the rotation of the drive wheels 202 may be coupled so as to rotate at substantially the same speed. Any suitable wheels 201 are mounted to the frame on opposite sides of the bot 110 at end 110E2 (e.g. second longitudinal end) of the bot 110 for supporting the bot 110 on the drive surface. In one aspect the wheels 201 are caster wheels that freely rotate allowing the bot 110 to pivot through differential rotation of the drive wheels 202 for changing a travel direction of the bot 110. In other aspects the wheels 201 are steerable wheels that turn under control of, for example, a bot controller 110C (which is configured to effect control of the bot 110 as described herein) for changing a travel direction of the bot 110. In one aspect the bot 110 includes one or more guide wheels 110GW located at, for example, one or more corners of the frame 110F. The guide wheels 110GW may interface with the storage structure 130, such as guide rails (not shown) within the picking aisles 130A, on the transfer deck 130B and/or at interface or transfer stations for interfacing with the lift modules 150 for guiding the bot 110 and/or positioning the bot 110 a predetermined distance from a location to/from which one or more case units are placed and/or picked up as described in, for example, U.S. patent application Ser. No. 13/326,423 filed on Dec. 15, 2011 the disclosure of which is incorporated herein by reference in its entirety. As noted above, the bots 110 may enter the picking aisles 130A having different facing directions for accessing storage spaces 130S located on both sides of the picking aisles 130A. For example, the bot 110 may enter a picking aisle 130A with end 110E2 leading the direction of travel or the bot may enter the picking aisle 130A with end 110E1 leading the direction of travel.

The payload section 110PL of the bot 110 includes a payload bed 110PB, a fence or datum member 110PF, a transfer arm 110PA and a pusher bar or member 110PR. In one aspect the payload bed 110PB includes one or more rollers 110RL that are transversely mounted (e.g. relative to a longitudinal axis LX of the bot 110) to the frame 110F so that one or more case units carried within the payload section 110PL can be longitudinally moved (e.g. justified with respect to a predetermined location of the frame/payload section and/or a datum reference of one or more case units) along the longitudinal axis of the bot, e.g., to position the case unit at a predetermined position within the payload section 110PL and/or relative to other case units within the payload section 110PL (e.g. longitudinal forward/aft justification of case units). In one aspect the rollers 110RL may be driven (e.g. rotated about their respective axes) by any suitable motor for moving the case units within the payload section 110PL. In other aspects the bot 110 includes one or more longitudinally movable pusher bar (not shown) for pushing the case units over the rollers 110RL for moving the case unit(s) to the predetermined position within the payload section 110PL. The longitudinally movable pusher bar may be substantially similar to that described in, for example, U.S. patent application Ser. No. 13/326,952 filed on Dec. 15, 2011, the disclosure of which was previously incorporated by reference herein in its entirety. The pusher bar 110PR is movable in the Y direction, relative to the bot 110 reference frame REF to effect, along with the fence 110PF and or pick head 270 of the transfer arm 110PA, a lateral justification of case unit(s) within the payload area 110PL in the manner described in U.S. Provisional Patent Application No. 62/107,135 filed on Jan. 23, 2015, previously incorporated herein by reference in their entireties.

Still referring to FIG. 6, the case units are placed on the payload bed 110PB and removed from the payload bed 110PB with the transfer arm 110PA along the Y throughput axis. The transfer arm 110PA includes a lift mechanism or unit 200 located substantially within the payload section 110PL as described in, for example, U.S. Provisional Patent Application No. 62/107,135 filed on Jan. 23, 2015, previously incorporated herein by reference in their entireties. The lift mechanism 200 provides both gross and fine positioning of pickfaces carried by the bot 110 which are to be lifted vertically into position in the storage structure 130 for picking and/or placing the pickfaces and/or individual case units to the storage spaces 130S (e.g. on a respective storage level 130L on which the bot 110 is located). For example, the lift mechanism 200 provides for picking and placing case units at the multiple elevated storage shelf levels 130LS1-130LS4, TL1, TL2 accessible from the common picking aisle or interface station deck 1200S (see e.g. FIGS. 1B, 2B and 3B).

The lift mechanism 200 is configured so that combined robot axis moves are performed (e.g. combined substantially simultaneous movement of the pusher bar 110PR, lift mechanism 200, pick head extension and fore/aft justification mechanism(s) such as, e.g., the longitudinally movable pusher bar described above), so that different/multi-sku or multi-pick payloads are handled by the bot. In one aspect, the actuation of the lifting mechanism 200 is independent of actuation of the pusher bar 110PR as will be described below. The decoupling of the lift mechanism 200 and pusher bar 110PR axes provides for combined pick/place sequences effecting a decreased pick/place cycle time, increased storage and retrieval system throughput and/or increased storage density of the storage and retrieval system as described above. For example, the lift mechanism 200 provides for picking and placing case units at multiple elevated storage shelf levels accessible from a common picking aisle and/or interface station deck 1200S as described above.

The lifting mechanism may be configured in any suitable manner so that a pick head 270 of the bot 110 bi-directionally moves along the Z axis (e.g. reciprocates in the Z direction—see FIG. 6). In one aspect, the lifting mechanism includes a mast 200M and the pick head 270 is movably mounted to the mast 200M in any suitable manner. The mast is movably mounted to the frame in any suitable manner so as to be movable along the lateral axis LT of the bot 110 (e.g. in the Y direction so as to define the Y throughput axis). In one aspect the frame includes guide rails 210A, 210B to which the mast 200 is slidably mounted. A transfer arm drive 250A, 250B may be mounted to the frame for effecting at least movement of the transfer arm 110PA along the lateral axis LT (e.g. Y axis) and the Z axis. In one aspect the transfer arm drive 250A, 250B includes an extension motor 301 and a lift motor 302. The extension motor 301 may be mounted to the frame 110F and coupled to the mast 200M in any suitable manner such as by a belt and pulley transmission 260A, a screw drive transmission (not shown) and/or a gear drive transmission (not shown). The lift motor 302 may be mounted to the mast 200M and coupled to pick head 270 by any suitable transmission, such as by a belt and pulley transmission 271, a screw drive transmission (not shown) and/or a gear drive transmission (not shown). As an example, the mast 200M includes guides, such as guide rails 280A, 280B, along which the pick head 270 is mounted for guided movement in the Z direction along the guide rails 280A, 280B. In other aspects the pick head is mounted to the mast in any suitable manner for guided movement in the Z direction. With respect to the transmissions 271, a belt 271B of the belt and pulley transmission 271 is fixedly coupled to the pick head 270 so that as the belt 271 moves (e.g. is driven by the motor 302) the pick head 270 moves with the belt 271 and is bi-directionally driven along the guide rails 280A, 280B in the Z direction. As may be realized, where a screw drive is employed to drive the pick head 270 in the Z direction, a nut may be mounted to the pick head 270 so that as a screw is turned by the motor 302 engagement between the nut and screw causes movement of the pick head 270. Similarly, where a gear drive transmission is employed a rack and pinion or any other suitable gear drive may drive the pick head 270 in the Z direction. In other aspects any suitable linear actuators are used to move the pick head in the Z direction. The transmission 260A for the extension motor 301 is substantially similar to that described herein with respect to transmission 271.

Still referring to FIG. 6 the pick head 270 of the bot 110 transfers case units between the bot 110 and a case unit pick/place location such as, for example, the storage spaces 130S, peripheral buffer stations BS, BSD and/or interface stations TS (see FIGS. 2A-3B) and in other aspects substantially directly between the bot 110 and a lift module(s) 150. In one aspect, the pick head 270 includes a base member 272, one or more tines or fingers 273A-273E and one or more actuators 274A, 274B. The base member 272 is mounted to the mast 200M, as described above, so as to ride along the guide rails 280A, 280B. The one or more tines 273A-273E are mounted to the base member 272 at a proximate end of the tines 273A-273E so that a distal end of the tines 273A-273E (e.g. a free end) is cantilevered from the base member 272. Referring again to FIG. 1D, the tines 273A-273E are configured for insertion between slats 1210S that form the case unit support plane CUSP of the storage shelves.

One or more of the tines 273A-273E is movably mounted to the base member 272 (such as on a slide/guide rail similar to that described above) so as to be movable in the Z direction. In one aspect any number of tines are mounted to the base member 272 while in the aspect illustrated in the figures there are, for example, five tines 273A-273E mounted to the base member 272. Any number of the tines 273A-273E are movably mounted to the base member 272 while in the aspect illustrated in the figures, for example, the outermost (with respect to a centerline CL of the pick head 270) tines 273A, 273E are movably mounted to the base member 272 while the remaining tines 273B-273D are immovable relative to the base member 272.

In this aspect the pick head 270 employs as few as three tines 273B-273D to transfer smaller sized case units (and/or groups of case units) to and from the bot 110 and as many as five tines 273A-273E to transfer larger sized case units (and/or groups of case units) to and from the bot 110. In other aspects, less than three tines are employed (e.g. such as where more than two tines are movably mounted to the base member 272) to transfer smaller sized case units. For example, in one aspect all but one tine 273A-273E is movably mounted to the base member so that the smallest case unit being transferred to and from the bot 110 without disturbing other case units on, for example, the storage shelves has a width of about the distance X1 between slats 1210S (see FIG. 1D).

The immovable tines 373B-373D define a picking plane SP of the pick head 270 and are used when transferring all sizes of case units (and/or pickfaces) while the movable tines 373A, 373E are selectively raised and lowered (e.g. in the Z direction with the actuators 274A, 274B) relative to the immovable tines 373B-373D to transfer larger case units (and/or pickfaces). Still referring to FIG. 6 an example is shown where all of the tines 273A-273E are positioned so that a case unit support surface SF of each tine 273A-273E is coincident with the picking plane SP of the pick head 270 however, as may be realized, the two end tines 273A, 273E are movable so as to be positioned lower (e.g. in the Z direction) relative to the other tines 273B-273D so that the case unit support surface SF of tines 273A, 273E is offset from (e.g. below) the picking plane SP so that the tines 273A, 273E do not contact the one or more case units carried by the pick head 270 and do not interfere with any unpicked case units positioned in storage spaces 130S on the storage shelves or any other suitable case unit holding location.

The movement of the tines 273A-273E in the Z direction is effected by the one or more actuators 274A, 274B mounted at any suitable location of the transfer arm 110PA. In one aspect, the one or more actuators 274A, 274B are mounted to the base member 272 of the pick head 270. The one or more actuators are any suitable actuators, such as linear actuators, capable of moving one or more tines 273A-273E in the Z direction. In the aspect illustrated in, for example, FIG. 6 there is one actuator 274A, 274B for each of the movable tines 273A, 273E so that each moveable tine is independently movable in the Z direction. In other aspects one actuator may be coupled to more than one movable tine so that the more than one movable tine move as a unit in the Z direction.

As may be realized, movably mounting one or more tines 273A-273E on the base member 272 of the pick head 270 provides for full support of large case units and/or pickfaces on the pick head 270 while also providing the ability to pick and place small case units without interfering with other case units positioned on, for example, the storage shelves, interface stations and/or peripheral buffer stations. The ability to pick and place variably sized case units without interfering with other case units on the storage shelves, interface stations and/or peripheral buffer stations reduces a size of a gap GP (see FIG. 1B) between case units on the storage shelves. As may be realized, because the tines 273B-273D are fixed to the base member 272 there is no duplicative motion when picking/placing case units as the lifting and lowering of case units and/or pickfaces to and from the case unit holding location is effected solely by the lift motor 301, 301A.

Referring again to FIG. 6, it is again noted that the pusher bar 110PR is movable independent of the transfer arm 110PA. The pusher bar 110PR is movably mounted to the frame in any suitable manner such as by, for example, a guide rod and slide arrangement and is actuated along the Y direction (e.g. in a direction substantially parallel to the extension/retraction direction of the transfer arm 110PA). In one aspect at least one guide rod 360 is mounted within the payload section 110PL so as to extend transversely relative to the longitudinal axis LX of the frame 110F. The pusher bar 110PR may include at least one slide member 360S configured to engage and slide along a respective guide rod 360. In one aspect, at least the guide rod/slide arrangement holds the pusher bar 110PR captive within the payload section 110PL. The pusher bar 110PR is actuated by any suitable motor and transmission, such as by motor 303 and transmission 303T. In one aspect the motor 303 is a rotary motor and the transmission 303T is a belt and pulley transmission. In other aspects the pusher bar 110PR may be actuated by a linear actuator having substantially no rotary components.

Figure 10:
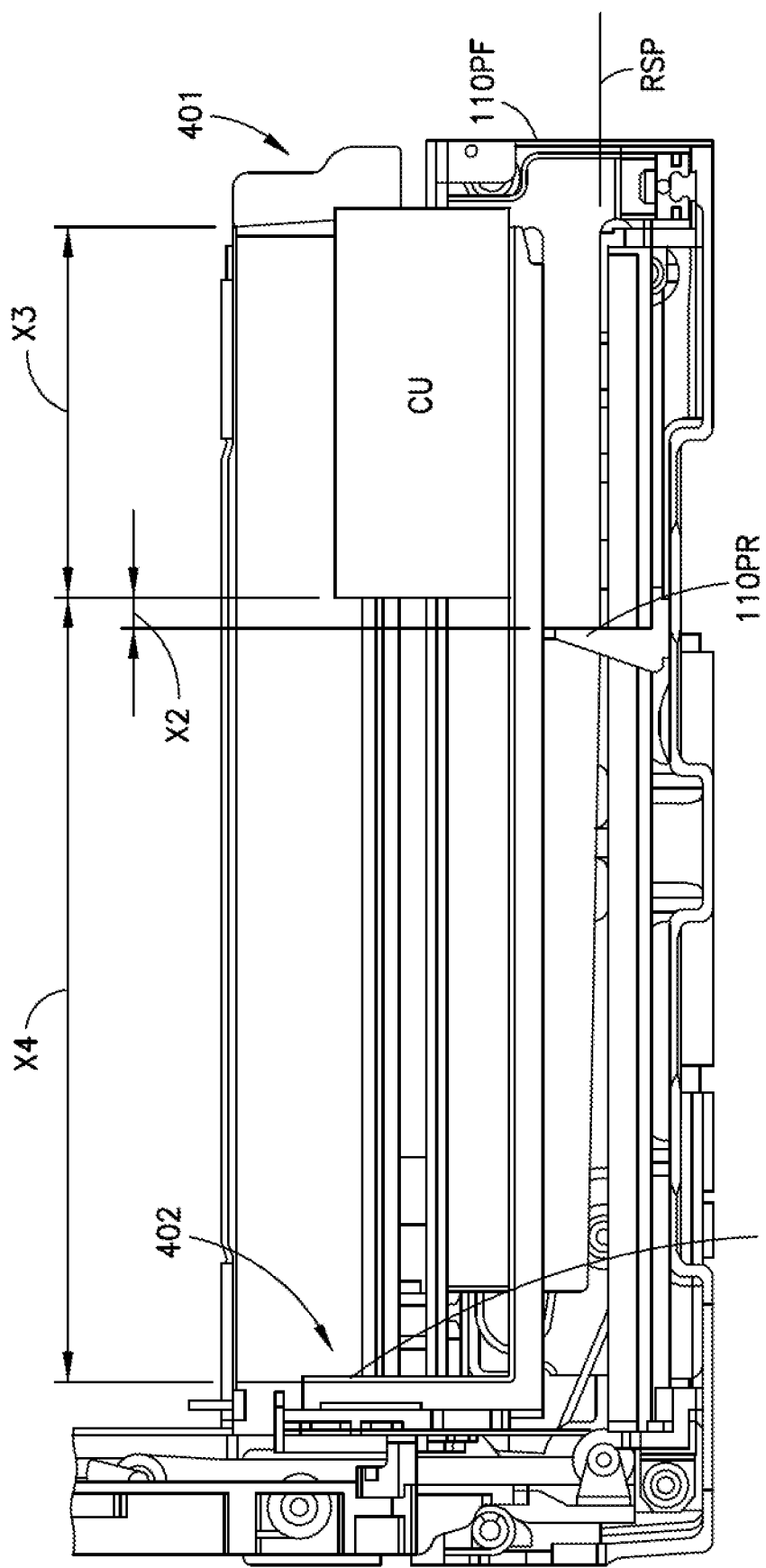
FIGS. 10, 10A-10E are schematic illustrations of portions of the transport vehicle in accordance with aspects of the disclosed embodiment.
Figure 10A:
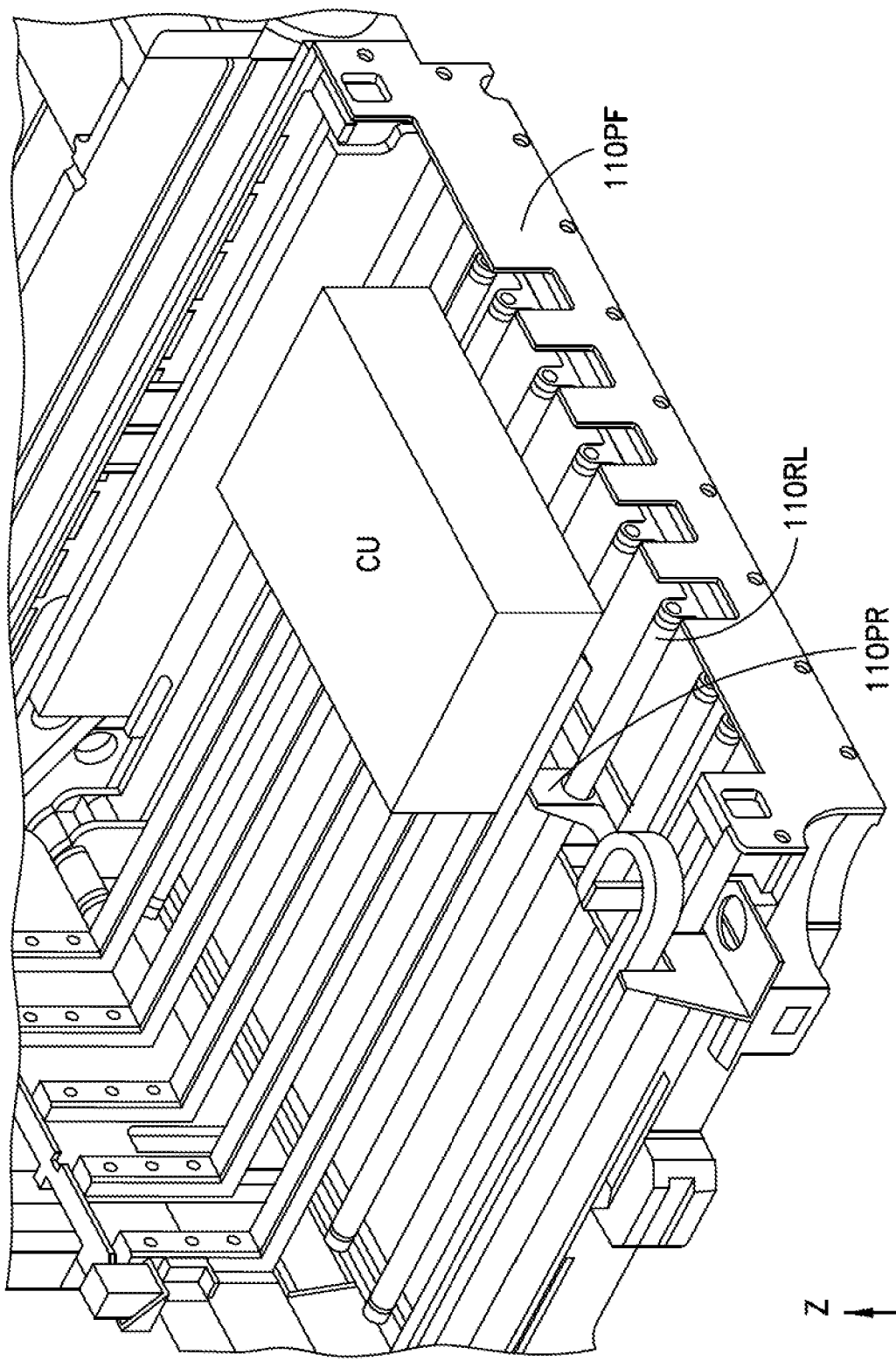
Figure 10B:
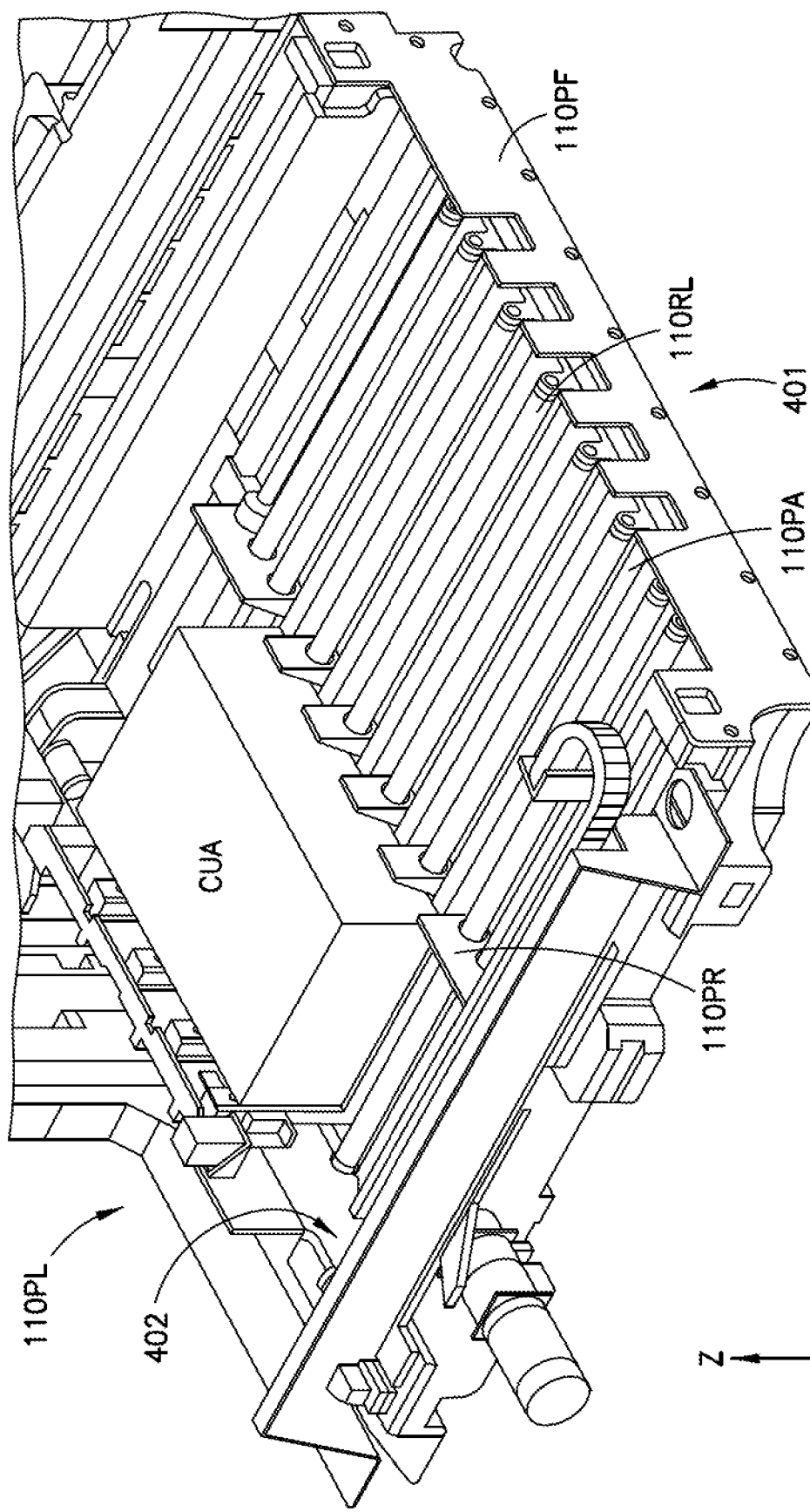

The pusher bar 110PR is arranged within the payload section 110PL so as to be substantially perpendicular to the rollers 110RL and so that the pusher bar 110PR does not interfere with the pick head 270. As can be seen in FIG. 10B, the bot 110 is in a transport configuration where at least one case unit would be supported on the rollers 110RL (e.g. the rollers collectively form the payload bed). In the transport configuration the tines 273A-273E of the pick head 270 are interdigitated with the rollers 110RL and are located below (along the Z direction) a case unit support plane RSP (see FIG. 10) of the rollers 110RL. The pusher bar 110PR is configured with slots 351 (FIG. 10C) into which the tines 273A-273E pass where sufficient clearance is provided within the slots 351 to allow the tines to move below the case unit support plane RSP and to allow free movement of the pusher bar 110PR without interference from the tines 273A-273E. The pusher bar 110PR also includes one or more apertures through which the rollers 110RL pass where the apertures are sized to allow free rotation of the rollers about their respective axes. As may be realized, the independently operable pusher bar 110PR does not interfere with the rollers 110PR, extension of the transfer arm 110PA in the transverse direction (e.g. Y direction) and the lifting/lowering of the pick head 270.

Figure 14:
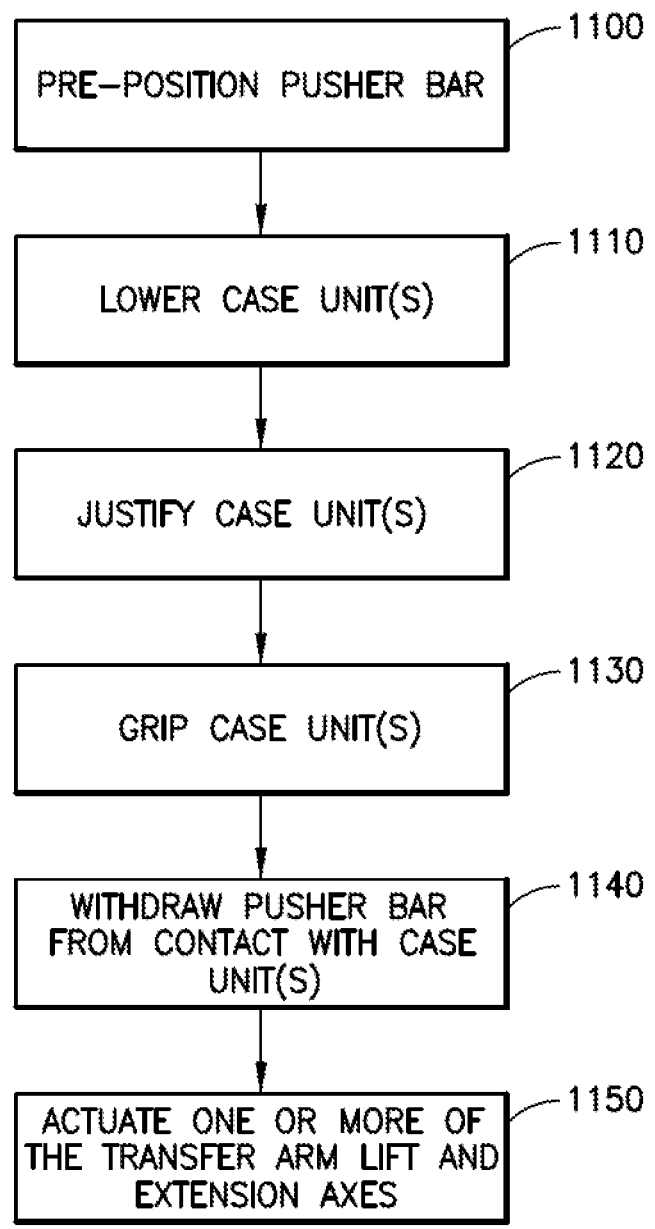
FIGS. 14-20 are exemplary flow diagrams in accordance with aspects of the disclosed embodiment.

As noted above, because the pusher bar 110PR is a separate, standalone axis of the bot 110 that operates free of interference from the pick head 270 extension and lift axes, the pusher bar 110PR can be operated substantially simultaneously with the lifting and/or extension of the transfer arm 110PA. The combined axis moves (e.g. the simultaneous movement of the pusher bar 110PR with the transfer arm 110PA extension and/or lift axes) provides for increased payload handling throughput in along the Y throughput axis and effects the ordered (e.g. according to the predetermined load out sequence) multi-pick of two or more case units from a common picking aisle, in one common pass of the picking aisle. For example, referring to FIGS. 10-10A during a transfer arm 110PA multi-pick/place sequence the pusher bar 110PR is prepositioned (as the case unit(s) and/or pickface are being picked and transferred into the payload section 110PL) to a location that is a predetermined distance X2 away from the contact depth X3 (e.g. the depth of the tines occupied by the case unit(s) and/or pickface CU when being picked/placed from a storage space or other case unit holding location) (FIG. 14, Block 1100). The distance X2 is a minimized distance that only allows sufficient clearance between pusher bar 110PR and the case unit(s) to allow the case unit(s) to be seated on the rollers 110RL. As the case unit(s) CU are lowered onto the rollers 110RL (FIG. 14, Block 1110) the distance travelled by the pusher bar 110PR to contact the case unit(s) CU is a shorter distance X2 when compared to moving from a back side 402 (relative to the lateral direction and an access side 401 of the payload section 110PL) of the payload section 110PL a distance X4 as with conventional transport vehicles. When the case unit(s) CU are lowered by the transfer arm 110PA and transferred to the rollers 110RL so as to be solely supported by the rollers 110RL, the pusher bar 110PR is actuated to forward (relative to the lateral direction and an access side 401 of the payload section 110PL) justify the case unit(s) CU (FIG. 14, Block 1120). For example, the pusher bar 110PR may push the case unit(s) CU laterally in the Y direction so that the case unit(s) contact the fence 110PF (which is located at the access side 401 of the payload section 110PL so that a case unit reference datum may be formed through contact between the case unit(s) CU and the fence 110PF. In one aspect the pusher bar 110PR may engage or otherwise grip the case unit(s) CU during transport of the case units (e.g. so as to hold the case unit(s) against the fence 110PF) for maintaining the case unit(s) CU in a predetermined spatial relationship with each other and a reference frame REF (FIG. 6) of the bot 110 (FIG. 14, Block 1130). When placing the case unit(s) the pusher bar 110PR, after justifying the case unit(s) CU against the fence 110PF, is withdrawn (e.g. in the Y direction) from contact with the case unit(s) CU (FIG. 14, Block 1140). Substantially immediately after the pusher bar 110PR disengages the case unit(s) CU one or more of the lift axis (e.g. in the Z direction) and extension axis (e.g. in the Y direction) of the transfer arm 110PA are actuated substantially simultaneously with the withdrawing movement of the pusher bar 110PR (FIG. 14, Block 1150). In one aspect both the lift and extension axes are actuated when the pusher bar is withdrawn from contact with the case unit(s) CU while in other aspect one of the lift and extension axes is actuated. As may be realized, the simultaneous movement of the transfer arm 110PA lift axis and/or extension axis with the withdrawal of the pusher bar 110PR as well as the decreased distance the pusher moves to justify the case unit(s) CU decreases the time needed to transfer case unit(s) CU to and from the bot 110 and increases throughput of the storage and retrieval system 100.

Figure 12:
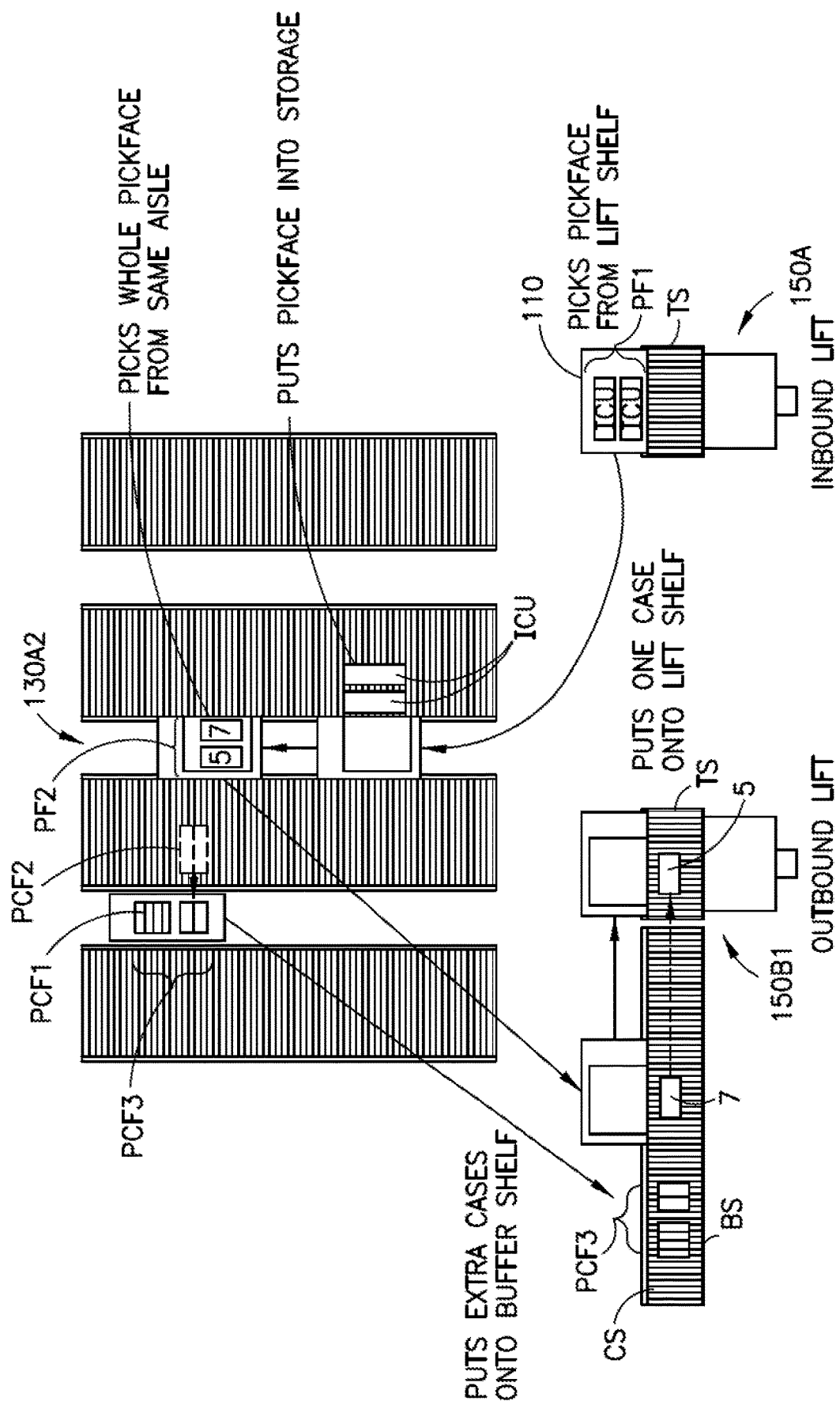

As described herein, referring to FIGS. 2A, 2B and 12, each bot 110 is configured to transport pickfaces between the picking aisles 130A and the transfer/handoff stations TS and buffer stations BS. In one aspect, the control server 120 is configured to command the bot 110, and effect with the bot 110 outbound flow (which may also be referred to as order fulfillment stream, outbound stream(s) or order fulfillment) sortation of case order(s) independent of the pick order of cases from the storage area by the bot 110 forming a pickface. In one aspect, the bot controller 110C is configured to command the bot 110, and effect with the bot 110 outbound flow sortation of case order(s) independent of the pick order of cases from the storage area by the bot 110 forming a pickface. In still other aspects, the control server 120 and the bot controller 110C are both configured to command the bot 110, and effect with the bot 110 outbound flow sortation of case order(s) independent of the pick order of cases from the storage area by the bot 110 forming a pickface. Thus, the control server 120 and/or the bot controller 110C is/are configured to set the outbound case flow, at least in part with bot 110 sortation of the cases carried in common by the both 110 and decoupled from the pick order of the cases by the bot 110 from storage. As may be realized, in one aspect, each bot 110 is configured to transport pickfaces between a first pickface interface station (e.g. transfer/handoff station TS and/or buffer station BS) and a second pickface interface station (e.g. transfer/handoff station TS and/or buffer station BS that is spaced apart from the first pickface interface station) where, as described herein, the bot 110 picks a first pickface from the first interface station, traverses the transfer deck 130B and places/buffers the first pickface, or at least a portion thereon, at the second pickface interface location so that the second pickface interface station has multiple pickfaces buffered on a common support/surface CS in an ordered sequence of pickfaces according to a predetermined case out order sequence of mixed case pickfaces. As will be described below, the bot 110 is configured to transfer a first pickface PCF1 having any suitable number of case units therein from the picking aisles 130A (or a transfer station TS or a buffer station BS)

and place second pickface PCF2, that is different than the first pickface PCF1, onto a common surface CS (such as of a rack shelf RTS) of the transfer/handoff station TS (or buffer station BS) that is common to both the bot 110 and the lift 150B. This may be referred to for description purposes as outbound flow sortation with the bot at transfer stations (and/or at buffer stations). As will also be described below, the first and second pickfaces, in one aspect, have at least one case unit that is common to both the first and second pickfaces. In one aspect, as described herein, the bot 110 is configured to build the first pickface (e.g. at least one of the multiple pickfaces) on the fly, e.g. during traverse (e.g. while the bot is moving) from a first pick location in the picking aisles 130A to placement of the second pickface at the transfer/handoff station TS (or buffer station BS), in a multi-pick/place sequence. In another aspect, the bot 110 is configured to build the first pickface (e.g. at least one of the multiple pickfaces placed on the common surface CS) on the fly, e.g. during traverse (e.g. while the bot is stationary at the second pickface interface station or the second pickface interface station buffer) from the first pick location to the transfer/handoff station TS (or buffer station BS), in a multi-pick/place sequence. As may be realized, where the pickfaces are picked, e.g. by the bot 110, from a first pickface interface station, such as a transfer station TS or buffer station BS and placed at the second pickface interface station, such as another transfer station TS or buffer station BS the pickface bypasses storage (e.g. is not placed in a storage space 130S before delivery to the second pickface interface station). In other aspects, at least a portion of the pickface picked from the first pickface interface station is placed in a storage space 130S (e.g. in the storage rack array RMA) by the bot 110 before transport to the second pickface interface station. In one aspect, the pickface picked from an inbound transfer station TS (or buffer station BS) may be the same pickface that is placed at an outbound transfer station TS (or buffer station BS) (i.e. the pickface is not broken up during transport from the inbound transfer station TS/buffer station BS and the outbound transfer station TS/buffer station BS where the transport between the inbound and outbound stations may or may not include placement of the pickface in storage).

The controller 110C of the bot 110 is configured to effect the on the fly building of the first pickface (or any other pickface picked by the bot 110). In one aspect the bot 110 is configured, as described herein, to build the pickface onboard the bot 110 such as, for example, in the payload section 110PL where case units/pickfaces are picked by the bot and arranged in the payload section in a predetermined order or sequence. In one aspect, the bot 110 is also configured to pick/build a pickface PCF3 that is different than the first pickface PCF1 and place the different pickface PCF3 on a shelf (such as another rack shelf RTS stacked above or below the rack shelf forming the common surface CS) of the transfer/handoff station TS (or buffer station BS). The bot 110 includes case manipulation, as described herein. The bot has picked the first pickface PCF1 and is configured to further pick the second pickface PCF2 from one or more case units (forming the different pickface PCF3) from the rack shelf RTS (or other location such as a storage shelf in the picking aisles) and place the different pickface PCF3 on the common surface CS. As may be realized, the lift 150B, in one aspect is configured to pick the second pickface PCF2 from the transfer/handoff station TS. In other aspects, the lift 150 is configured, as described herein, to pick a third pickface PCF4 from the common surface CS (such as the rack transfer shelf RTS) of the transfer/handoff station TS (or buffer station BS) where the third pickface PCF4 is different than the first and second pickfaces PCF1, PCF2 and the common case is common to the first, second and third pickfaces PCF1, PCF2, PCF4. As may be realized, the second interface station (such as the transfer station TS or buffer station BS) forms a common pickface transfer interface for the lift 150 so that the commonly supported pickfaces are picked in common with the lift 150. It is noted that the ability of the lift 150 to pick individual pickfaces, as noted above, from different deck levels effects sorting of the pickfaces in the Z throughput axis.

Figure 15:
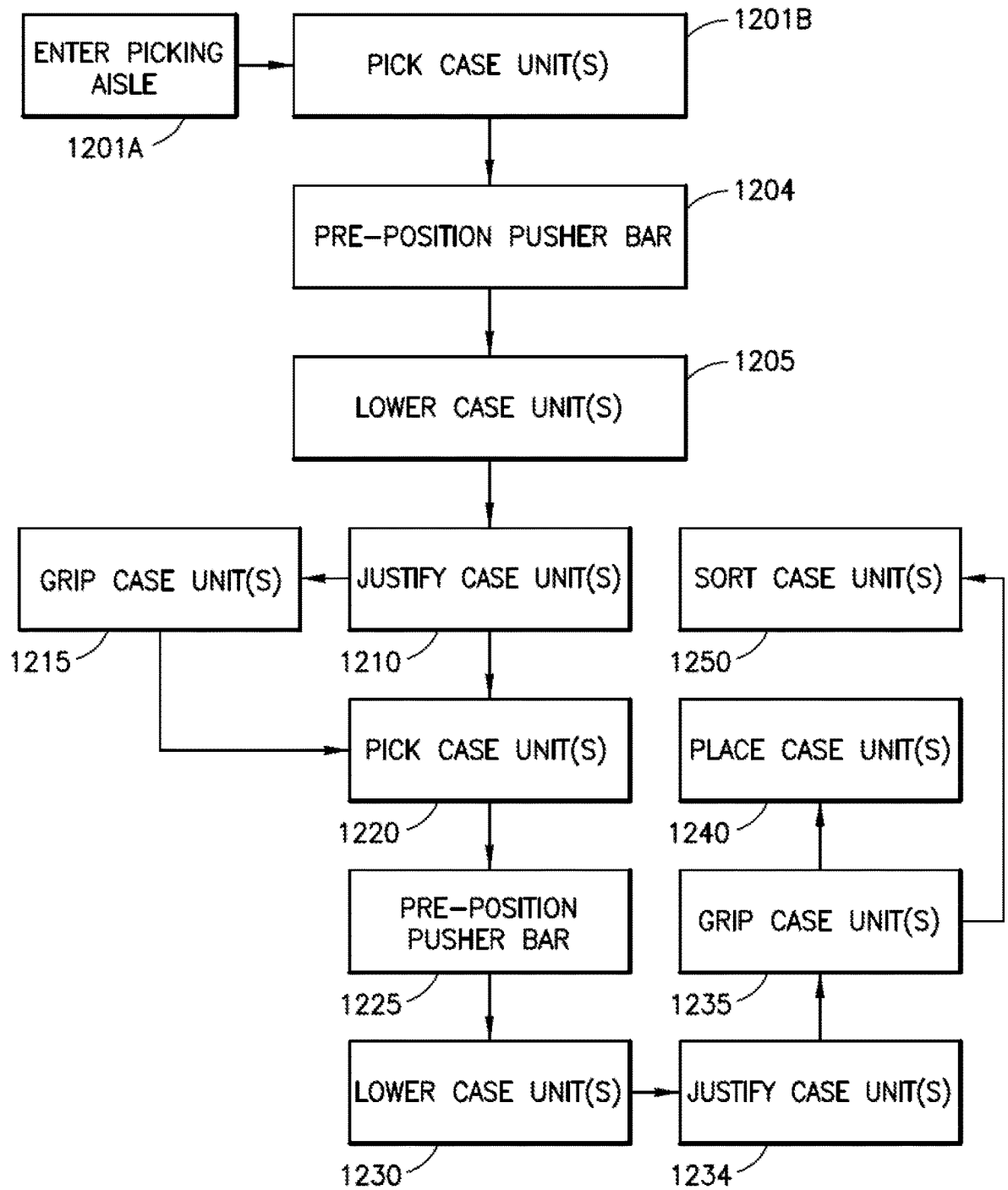

In one aspect of the disclosed embodiment, as may be realized, in the multi-pick/place sequence multiple case units are substantially simultaneously carried and manipulated (e.g. so as to form one or more pickfaces) within the payload section 110PL to further increase throughput of the storage and retrieval system 100 and to effect the multi-pick/place sequence in accordance with a predetermined order out sequence. Referring also to FIG. 1, the bot receives pick and place commands from, for example, control server 120 (and/or warehouse management system 2500) and the bot controller 110C executes those commands for forming the ordered multi-pick. Here the bot 110 enters the common aisle 130A1 from, for example, the transfer deck 130B for making a single or common pass through the picking aisle 130A1 during which the bot 110 picks two or more case units according to the predetermined order out sequence (FIG. 15, Block 1201A). In one aspect the manipulation of the case units CU is a sorting of the case units (in other words picking and placing of case units according to the predetermined load out sequence) where the cases are positioned on the transfer arm 110PA for picking/placement of the case units and/or positioned so that the case units are not transferred and remain on the transfer arm 110PA while other case units are transferred to and from the transfer arm 110PA. Here, the bot 110 travels through the common picking aisle 130A1 in the direction of arrow XC and stops at a predetermined storage space 130S1, according to the predetermined order out sequence, where the bot 110 picks one or more case units from the predetermined storage space 130S1 with a common transfer arm 110PA where placement of the case units on the common transfer arm 110PA corresponds to the predetermined order out sequence as will be described in greater detail below (e.g. the case units are sorted on-the-fly, e.g. during transport, with the bot 110).

As an example of case manipulation on the bot 110, referring also to FIGS. 10B-10E, case unit(s) CUA may be picked from a case unit holding location (e.g. such as storage spaces 130S in a common picking aisle for effecting the ordered multi-pick, and in other aspects from a lift interface station TS, and/or a case unit buffer station BS located in a picking aisle or on the transfer deck) and transferred into the payload section 110PL (FIG. 15, Block 1201B). As the case unit(s) CUA is being transferred into the payload section 110PL the pusher bar 110PR may be pre-positioned (FIG. 15, Block 1204) adjacent the fence 110PF so that the pusher bar 110PR is positioned between the case unit(s) CUA and the fence 110PF when the case unit(s) CUA is lowered for transfer to the rollers 110RL (FIG. 15, Block 1205). The pusher bar 110PR is actuated to push the case unit(s) CUA (resting on the rollers 110RL) in the Y direction towards the back (e.g. rear) 402 of the payload section 110PL so that the case unit(s) CUA contacts a justification surface 273JS (FIG. 10) of the tines 273A-273E and is justified to the back 402 of the payload section 110PL (FIG. 15, Block 1210).

In one aspect, the bot 110 continues to traverse the common picking aisle 130A1 in the same direction XC (e.g.

so that all of the case units in the ordered multi-pick are picked in the common pass of the picking aisle with the bot 110 travelling in a single direction) and stops at another predetermined storage space 130S according to the predetermined order out sequence. As noted above, the pusher bar 110PR remains in contact with (e.g. grips) the case unit(s) CUA during transport of the case unit(s) between case unit holding locations so that the case unit(s) CUA remains in a predetermined location at the back 402 of the payload section 110PL (and/or at a predetermined location longitudinally) relative to the reference frame REF of the bot 110 (FIG. 15, Block 1215). To pick subsequent case units, from for example, the other storage space 130S2 of the common picking aisle 130A1 the pusher bar 110PR is moved in the Y direction to disengage the case unit(s) CUA and the lift and extension axes of the transfer arm 110PA are actuated to retrieve another case unit(s) CUB from the other storage space 130S2 (or in other aspects from e.g. a lift/handoff interface station TS and/or a buffer/handoff station BS as noted above) (FIG. 15, Block 1220). While the case unit(s) CUB are being picked the pusher bar 110PR is positioned in the Y direction adjacent the back 402 of the payload section 110PL so as to be located between the case units CUA and the justification surface 273JS of the tines 273A-273E (FIG. 15, Block 1225). The case unit(s) CUB are transferred into the payload section and lowered/placed on the rollers 110RL (FIG. 15, Block 1230) so that the case units CUA, CUB are arranged relative to each other along the Y axis. The pusher bar 110PR is actuated in the Y direction to push the case units CUA, CUB towards the fence 110PF to forward justify the case units CUA, CUB (FIG. 15, Block 1234) and grip/hold the case units CUA, CUB for transport (FIG. 15, Block 1235). As may be realized, in one aspect the case units CUA, CUB are placed at a case unit holding location together as a unit while in other aspects the case units CUA, CUB are sorted, e.g. transported to and placed at separate positions of a common case unit holding location or at different case unit holding locations (FIG. 15, Block 1240) as will be described in greater detail below. For example, referring also to FIGS. 7-9, the bot 110 carrying the ordered multi-pick payload transfers the case units of the ordered multi-pick to one or more interface stations TS (which include buffer shelves 7000A-7000L) corresponding to output lifts 150B1, 150B2.

Figure 10C:
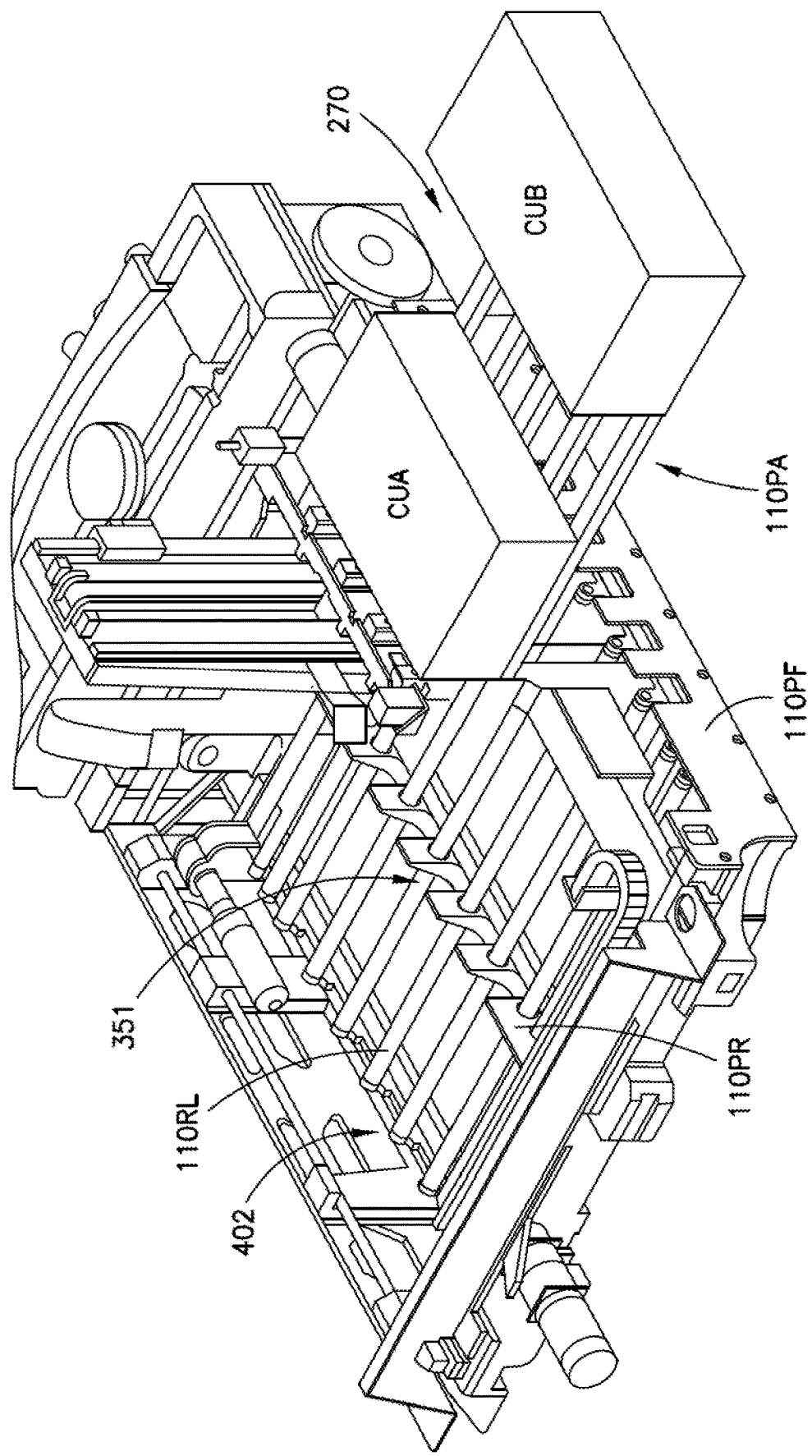
Figure 10D:
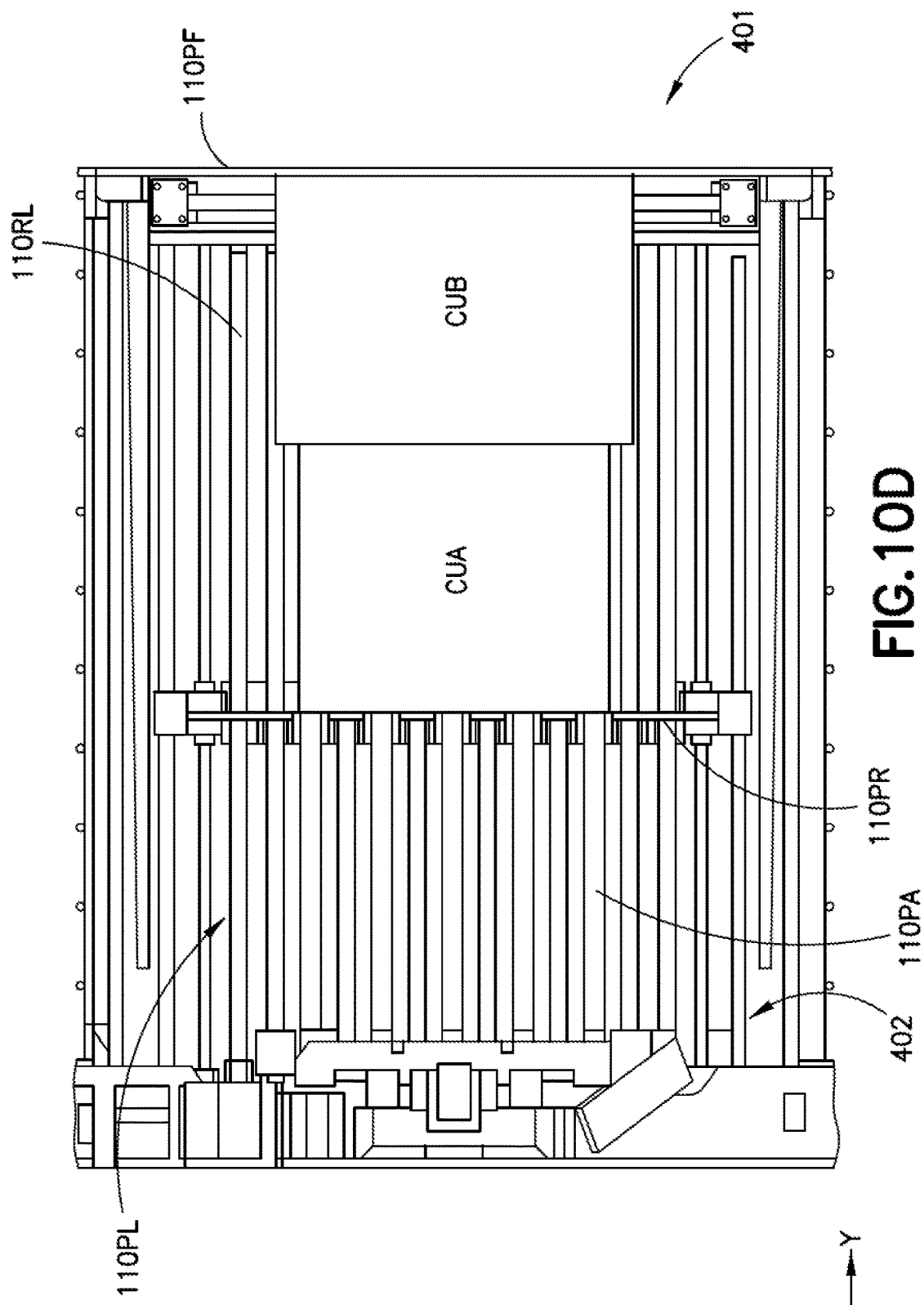
Figure 10E:
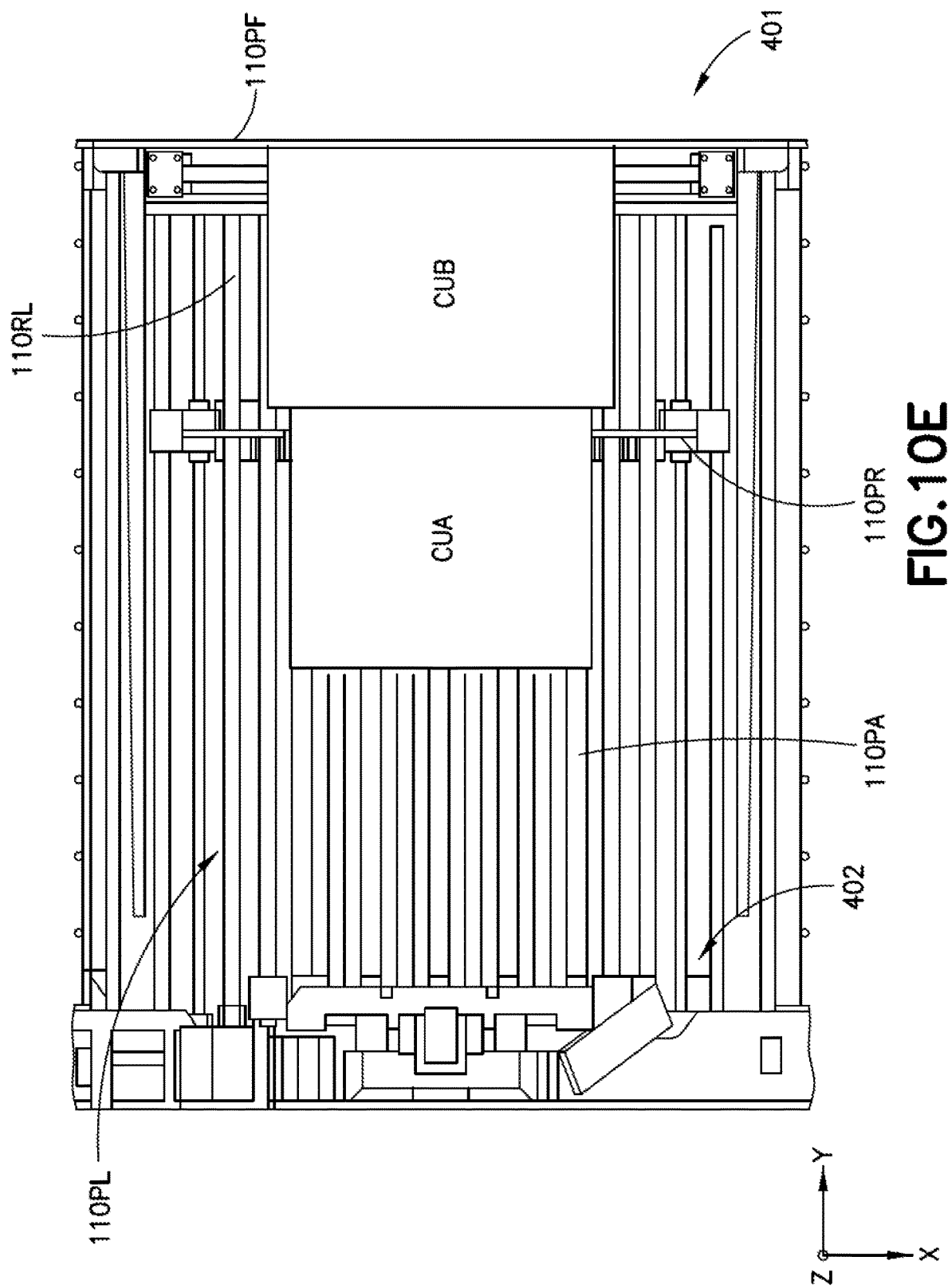
Figure 11:
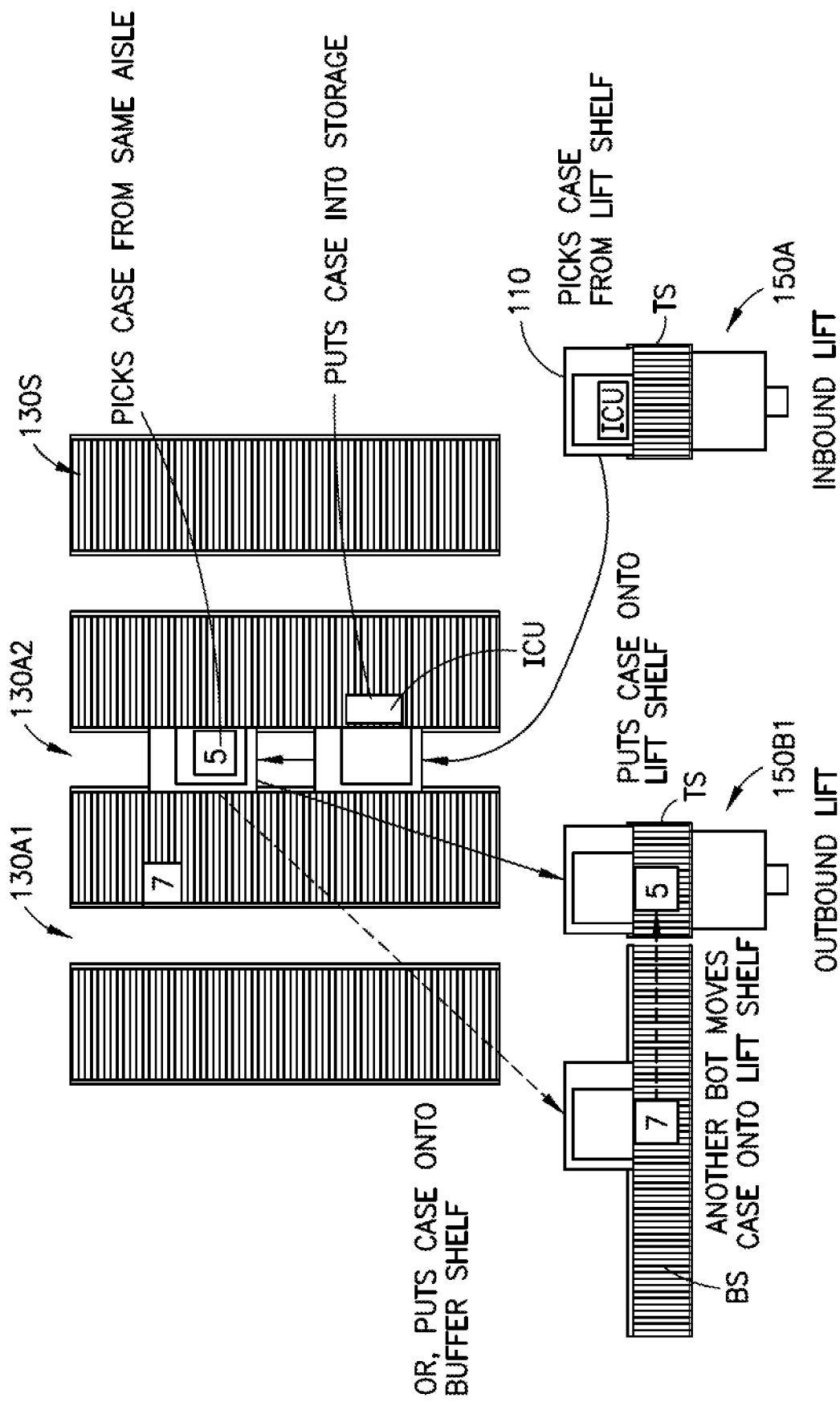
FIGS. 11-13 are schematic illustrations of portions of the storage and retrieval system in accordance with aspects of the disclosed embodiment.
Figure 16:
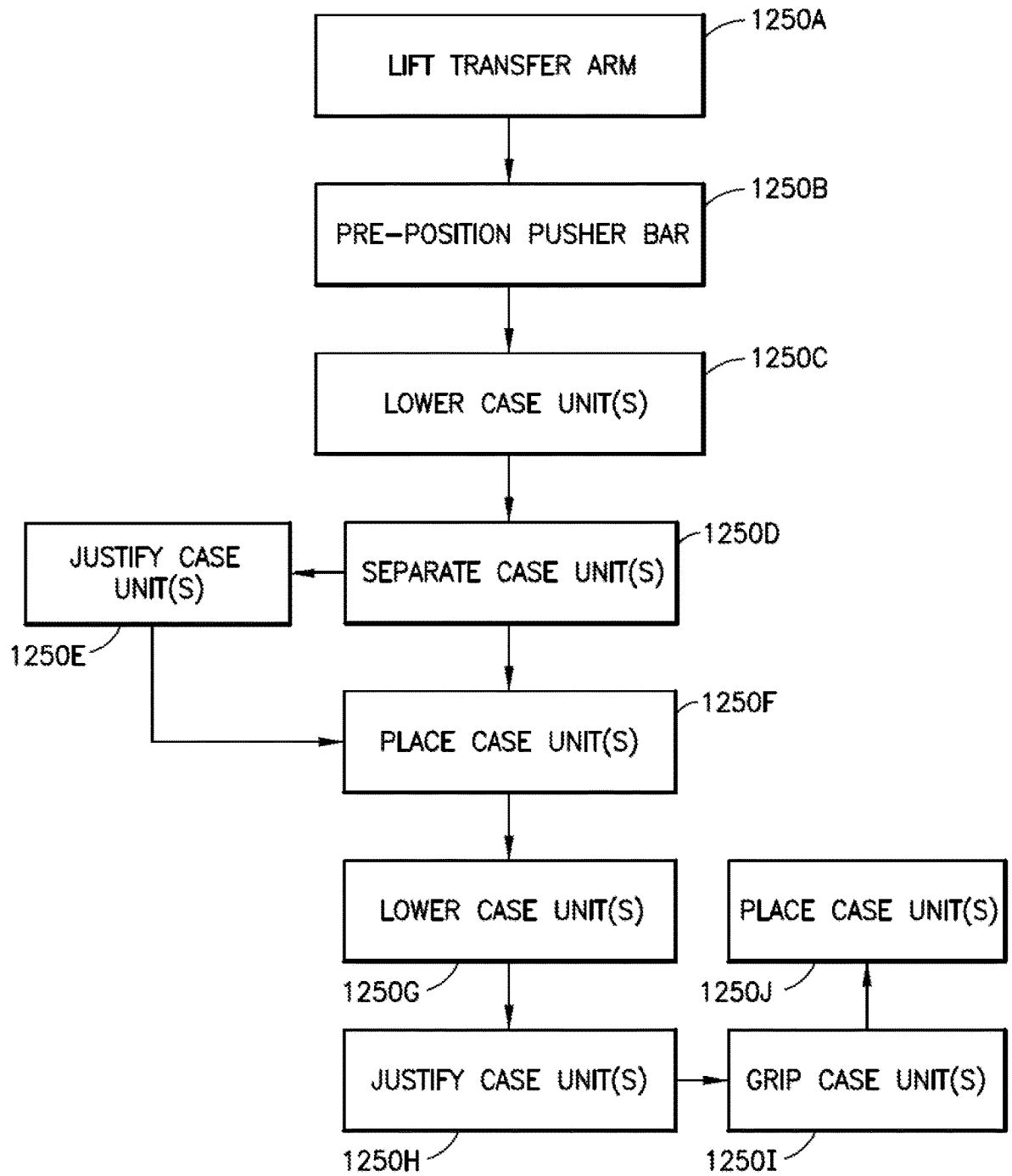

As may be realized, in one aspect where the bots 110 "parallel park" into an interface station TS (FIG. 7) or turn into a pier 130BD (FIG. 8) the spacing between bots travelling on the high speed bot travel path HSTP of the transfer deck 130B (FIG. 2A) is such that the bot interfacing with the interface station TS is able to slow down and turn into the interface station TS substantially without interference from and/or interference with another bot 110 travelling along the transfer deck 130B. In other aspects, the bots travelling on the transfer deck may drive around the bots turning into the interface stations as the transfer deck(s) 130B is substantially open and configured for the undeterministic traversal of bots 110 across and along the transfer deck(s) 130B as described above. Where the case units of the multi-pick are placed at different positions of, for example, a common buffer shelf of interface/handoff station 7000A-7000L of the lifts 150B1, 150B2 the bot 110 places a first one of the case units CUB (corresponding to, for exemplary purposes pickface 7 in FIG. 9 which in this example includes a single case unit) in a first position of the buffer shelf 7000B and places the second one of the case units CUA (corresponding to, for exemplary purposes pickface 5 in FIG. 9 which in this example includes a single case unit) in a second position of the buffer shelf 7000B. Where the case units of the multi-pick are placed at a common case unit holding location the bot 110 places both case units CUA, CUB as a unit (e.g. a pickface) at for example, a common position of buffer shelf 7000A (corresponding to, for exemplary purposes pickface 9 in FIG. 9 which in this example, includes two case units).

Where the case units CUA, CUB are sorted (FIG. 15, Block 1250) for placement at separate positions of a common case holding location or at different case holding locations, the case units CUA, CUB are separated from each other in the payload section 110PL. For example, the pick head 270 of the transfer arm 110PA may be moved in the Z direction to lift the case units CUA, CUB from the rollers 110RL by an amount sufficient to allow the pusher bar 110PR to pass beneath the case unit(s) (FIG. 16, Block 1250A). As the case units CUA, CUB are lifted the pusher bar 110PR is positioned along the Y direction so as to be located between the case units CUA, CUB (see FIG. 10E) (FIG. 16, Block 1250B). The pick head 270 is lowered so that the case units CUA, CUB are transferred to the rollers 110RL and so that the pusher bar is inserted between the case units CUA, CUB (FIG. 16, Block 1250C). The pusher bar 110PR is moved in the Y direction (e.g. to separate the case unit(s)) to move case unit(s) CUA towards the back 402 of the payload section 110PL (e.g. against the justification surface 273JS of the tines 273A-273E or any other suitable position) while the case unit(s) CUB remain at the front of the payload section 110PL adjacent the fence 110PF (e.g. as shown in FIG. 10C) (FIG. 16, Block 1250D). As may be realized, where the case units are held against the justification surface 273JS of the tines during transport, the pusher bar is moved in the Y direction (e.g. to separate the case unit(s)) to move case unit(s) CUB towards the front 401 of the payload section 110PL (e.g. against the fence 110PF or any other suitable position) while the case unit(s) CUA remain at the back of the payload section 110PL adjacent the justification surface 273JS. The pusher bar 110PR may also be moved in the Y direction to re-justify the case unit(s) CUB against the fence 110PF to position the case unit(s) on the tines 273A-273E for placement at a case unit holding location (FIG. 16, Block 1250E). As may be realized, with the case unit(s) CUA being positioned substantially against the justification surface 273JS of the tines 273A-273E (e.g. of the pick head 270) the case unit(s) CUB can be placed at a case unit holding location substantially without interference from the case unit(s) CUA (FIG. 16, Block 1250F), e.g. the case unit CUA is free from contacting case units disposed at the case unit holding location. The case unit(s) CUA is lowered/transferred back into the payload section 110PL (e.g. by retracting and lowering the transfer arm 110PA) (FIG. 16, Block 1250G). The pusher bar 110PR, which is pre-positioned between the justification surface 273JS and the case unit(s) CUA, pushes the case unit(s) CUA, which is disposed on the rollers 110RL, against the fence 110PF to forward justify the case unit(s) CUA for placement at another case unit holding location (e.g. different than the holding location that case unit(s) CUB were placed) (FIG. 16, Block 1250H). The pusher bar 110PR remains against the case unit(s) CUA for gripping (e.g. with the fence) the case unit(s) during transport to the other case unit holding location (FIG. 16, Block 1250I). The pusher bar 110PR moves away from the case unit(s) CUA and the transfer arm is actuated to lift and extend the pick head 270 for placing the case unit(s) CUA at the other case unit holding location (FIG. 16, Block 1250J).

Figure 17:
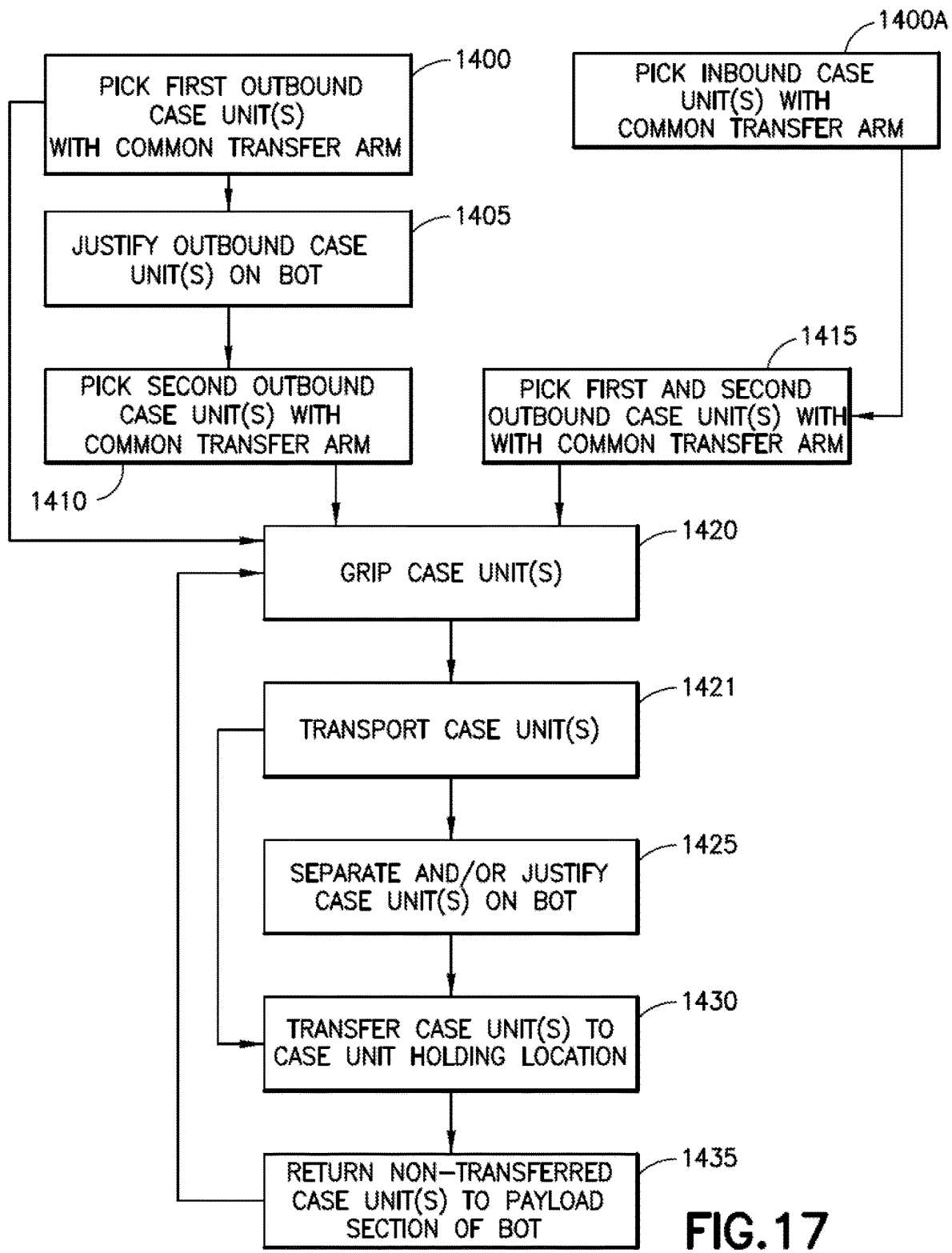

An example of a bot 110 case unit(s) transfer transaction including a case unit(s) multi-pick and place operation with on the fly sortation of the case units for creating a mixed pallet load MPL (as shown in FIG. 1F) and/or to fill the predetermined order sequence of picked items in one or more bag(s), tote(s) or other container(s) TOT at an operator station or cell 160EP (as shown in FIG. 26, such as to e.g., fill a customer order) according to a predetermined order out sequence will be described with respect to FIGS. 9 and 11-13 in accordance with an aspects of the disclosed embodiment. For example, referring to FIG. 11 a customer order may require case unit(s) 7 to be delivered to output lift 150B1 and case units 5 to also be delivered to output lift 150B1 (in other aspects, it is noted that customer orders may require case units carried by a common bot 110 to be delivered to different output lifts 150B1, 150B2 (FIG. 9) such that the transfer of the case units carried by the common bot 110 to different output lifts occurs in a manner substantially similar to that described herein). In the aspects of the disclosed embodiment described herein the output lift 150B1 (e.g. each of the output lifts 150B1, 150B2 of the storage and retrieval system/order fulfillment system) defines a fulfillment course or pathway (also referred to as a stream) of mixed case pickfaces outbound from the storage array to a load fill where the mixed case pickfaces enter and exit the fulfillment course in substantially the same order. As may be realized, while the input and output lifts 150A, 150B are described as vertically reciprocating lifts it should be understood that in other aspects the input and output lifts 150A, 150B are any suitable transport modules for transporting case pickfaces to and from the storage structure 130 (e.g. between a respective pickface interface station, such as transfer station TS or buffer station BS, and a respective one of an input station 160IN, e.g. an input cell, and an output station 160UT, e.g. a load fill section/cell). For example, in other aspects the lift modules 150A, 150B are one or more of vertically reciprocating lifts, any suitable automated material handling systems, conveyors, bots, turntables, roller beds, multilevel vertical conveyor (e.g. paternoster conveyor) that operate synchronously or asynchronously. To efficiently use each bot 110 in the storage and retrieval system 100 the controller, such as control server 120, determines which picking aisle(s) case units 5, 7 are located. The controller also determines which inbound case unit(s) ICU are to be stored in the picking aisle(s) from which case units 5, 7 (e.g. the outbound case units) are to be picked. The controller sends commands to a bot 110 on a level where case units 5, 7 are located to pick one or more inbound case units ICU from an interface station TS of one or more lift modules 150A in a manner similar to that described above (FIG. 17, Block 1400A). The bot 110 grips the case unit(s) ICU (FIG. 17, Block 1420) and transports the case unit(s) to one or more storage space 130 within one or more picking aisle 130A2 (FIG. 17, Block 1421) where at least one of the picking aisles in which the inbound case units are placed includes one of the outbound case units 5, 7. As may be realized, where the inbound case units are placed at different storage locations 130S the inbound case units are sorted (FIG. 17, Block 1425) as described above where one or more case unit(s) are transferred to one case unit holding location, such as a storage space 130S or buffer, (FIG. 17, Block 1430) while case units that are not transferred are returned to the payload section of the bot 110 for transfer to another case unit holding location (FIG. 17, Block 1435).

As may be realized, the outbound case units 5, 7 are located in the same or different picking aisles and are retrieved by one bot 110 or different bots 110 depending on a proximity of the outbound case units and the predetermined storage position(s) of the inbound case unit(s). For example, referring to FIG. 11, the bot 110 picks an inbound case unit ICU from interface station TS of lift module 150A for placement in picking aisle 130A2 (in a manner substantially similar to that described above), which is the aisle case unit 5 is located. Case unit 7 in this example is located in picking aisle 130A1. After placement of the inbound case unit ICU the bot continues to travel along picking aisle 130A2 in a common pass (e.g. a single traversal of the picking aisle in a single direction) to pick the outbound case unit 5 (FIG. 17, Block 1400). Where it is more efficient to have a single bot 110 pick multiple case units, the outbound case unit 5 is justified on the bot 110 as described above (FIG. 17, Block 1405) and the bot travels to the location of another case unit, such as outbound case unit 7 in aisle 130A1 (it is noted that where a second outbound case is located in a common aisle with the first outbound case both outbound case units are picked in a common pass of the picking aisle with the common transfer arm 110PA (FIG. 6) of the bot 110). The second outbound case unit(s) 7 is picked with the common transfer arm 110PA (FIG. 17, Block 1410) and both case units 5, 7 are transferred and placed at one or more of peripheral buffer station BS and interface station TS of a pickface transport system such as lift module 150B (FIG. 17, Blocks 1420-1435) in a manner substantially similar to that described above with respect to the placement of the inbound case unit(s). Where is it more efficient to have a two different bots 110 pick a respective one of case units 5, 7 after picking the respective outbound case (FIG. 17, Block 1400) the case unit is gripped (FIG. 17, Block 1420) and transferred to and placed at one of the peripheral buffer station BS or the interface station TS of outbound lift 150B (FIG. 17, Block 1421-1435) as described herein. In one aspect, where an outbound case unit, such as case unit 5 is placed at a peripheral buffer station BS a different bot 110, than the bot that placed the case unit 5 at the peripheral buffer station BS, transfers the case unit 5 to the interface station TS while in other aspects the same bot 110 returns to the peripheral buffer station BS to transfer case unit 5 to the interface station TS. In the aspects of the disclosed embodiment described herein, the buffer stations BS and/or the transfer stations TS (e.g. at least one pickface handoff station) commonly supports more than one of the mixed case pickfaces defining a portion of the mixed case pickfaces outbound from the storage array/structure 130 entering the fulfillment course in an ordered sequence of pickfaces based on a predetermined sequence of the load fill. In one or more of the aspects of the disclosed embodiment described herein, the buffer station BS and/or transfer stations TS forms a common pickface transfer interface for the outbound lift(s) 150B1, so that the commonly supported pickfaces are picked in common with the outbound lift(s) 150B1. In one or more of the aspects of the disclosed embodiment described herein, each of the buffer stations BS and/or transfer stations TS commonly supports more than one of the mixed case pickfaces defining a portion of the mixed case pickfaces outbound from the storage array (see for exemplary purposes only pickfaces 1-4 in FIG. 9) in an ordered sequence of pickfaces based on the predetermined sequence of the load fill. In one or more aspects of the disclosed embodiment described herein, the mixed case pickfaces defining the portion of the mixed case pickfaces outbound from the storage array/structure 130 in the ordered sequence and commonly supported on the buffer station BS and/or transfer station TS is based on an ordered sequence of pickfaces on another buffer station BS and/or transfer station TS of another fulfillment course (see e.g. the mixed cases outbound from the outbound lift 150B2). In one or more aspects of the disclosed embodiment, any suitable controller, such as controller 120 is in communication with the bot(s) 110 and is configured to effect placement of pickfaces on the buffer station BS and or transfer station TS based on the ordered sequence of pickfaces.

In one aspect the outbound case units are picked and transferred as a unit (e.g. a pickface) by a common transfer arm 110PA (FIG. 6) of bot 110. Referring now to FIG. 12 again a customer order may require case unit(s) 7 to be delivered to output lift 150B1 and case units 5 to also be delivered to output lift 150B1 (in other aspects, it is noted that customer orders may require case units carried by a common bot 110 to be delivered to different output lifts 150B1, 150B2 (FIG. 9) such that the transfer of the case units carried by the common bot 110 to different output lifts occurs in a manner substantially similar to that described herein). As described above, the controller determines which inbound case unit(s) ICU are to be stored in the picking aisle(s) from which case units 5, 7 (e.g. the outbound case units) are to be picked. The controller sends commands to a bot 110 on a level where case units 5, 7 are located to pick one or more inbound case units ICU as a unit (e.g. pickface) from an interface station TS of a lift module 150A in a manner similar to that described above (FIG. 17, Block 1400A). The bot 110 grips the pickface PF1 (FIG. 17, Block 1420), transports the pickface PF1 to a storage space 130 within the picking aisle 130A2 (FIG. 17, Block 1421) where the outbound case units 5, 7 are located and places the pickface PF1 into a storage space 130S (FIG. 17, Block 1430). It is noted that since the whole pickface is transferred to a common storage space and no case units are left on the bot that the flow, in this example, does not proceed to block 1435 of FIG. 17.

After placing the inbound pickface PF1, the bot 110 continues to travel through aisle 130A2 in a common pass (e.g. a single traversal of the picking aisle in a single direction) to the storage space holding outbound case units 5, 7 (which are arranged on the storage shelves adjacent one another so as to be picked simultaneously as outbound pickface PF2). The bot 110 picks pickface PF2 with the common transfer arm 110PA (FIG. 6) (FIG. 17, Block 1415), grips the pickface PF2 (FIG. 17, Block 1420) and transports the pickface PF2 (FIG. 17, Block 1421) to the outbound lift 150B1. In one aspect the case units 5, 7 of the pickface PF2 are placed at one of the peripheral buffer station BS or the interface station TS as a unit (FIG. 17, Block 1430). In another aspect the case units 5, 7 of the pickface are separated and justified (in a manner similar to that described above) for placement in different locations (FIG. 17, Block 1425). For example, bot 110 places case unit 7 at the peripheral buffer station BS (FIG. 17, Block 1430), returns case unit 5 to the payload area of the bot 110 (FIG. 17, Block 1435), grips the case unit 5 (FIG. 17, Block 1420), transports the case unit 5 to the interface station TS (FIG. 17, Block 1421) and transfers the case unit 5 to the interface station (FIG. 17, Block 1430).

Figure 13:
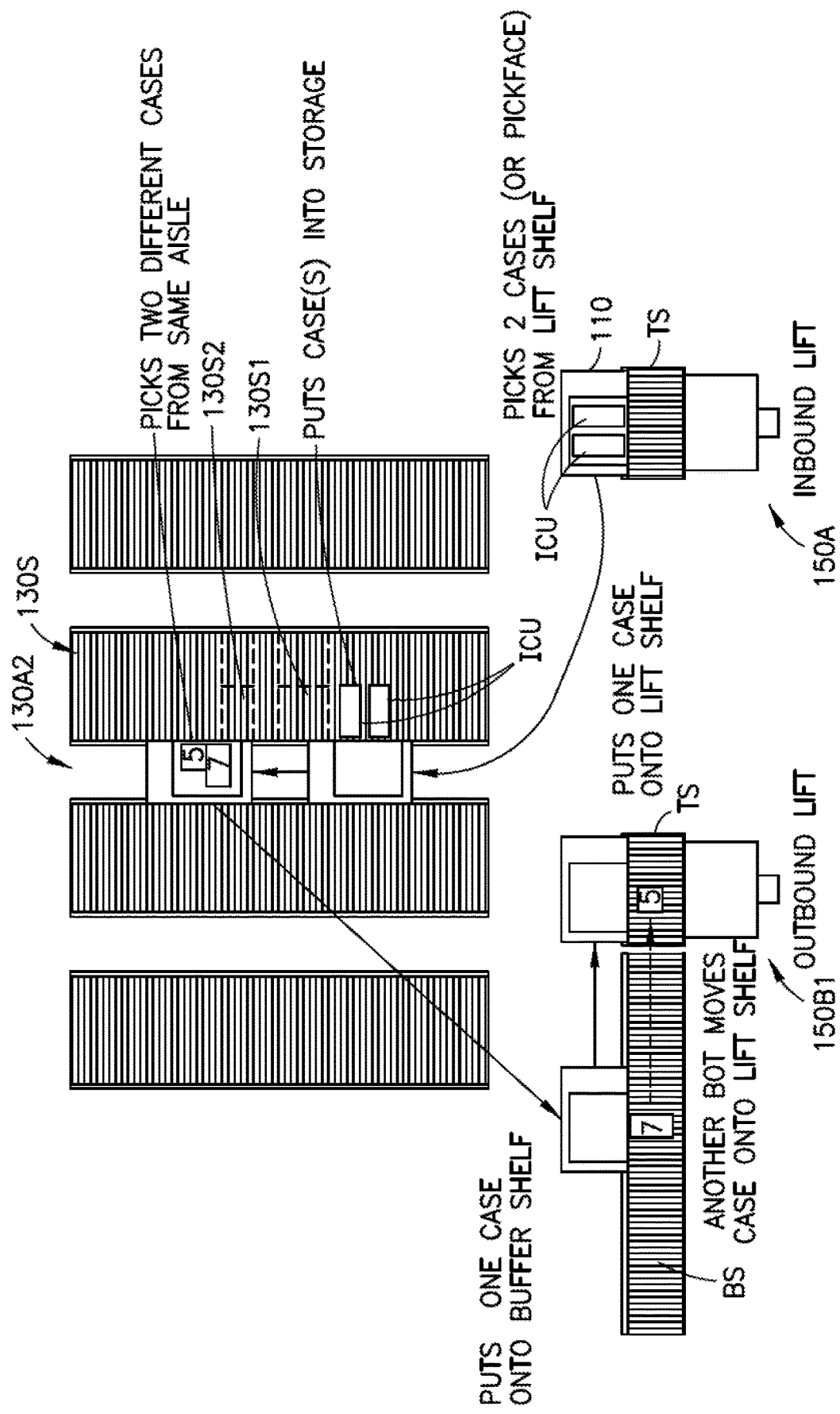

In another aspect, referring to FIG. 13, the outbound case units 5, 7 are picked from different storage locations within a common aisle 130A2 with the common transfer arm 110PA (FIG. 6 of the bot 110. Here, the bot 110 transfers one or more inbound case units ICU to one or more storage locations in the manner described above where at least one of the inbound case units ICU is located in a common picking aisle 130A2 with the outbound case units 5, 7. After placing at least one inbound case unit at a predetermined storage location 130S of aisle 130A2 the bot 110 continues to travel through picking aisle 130A1, in a common pass of the picking aisle 130A2, and picks case unit 5 from storage space 130S1 in the manner described above (FIG. 17, Block 1400). The case unit(s) 5 is justified on the bot 110 towards the rear of the payload section 110PL as described above (FIG. 17, Block 1405). The bot 110 continues to travel through the picking aisle 130A1 in a common pass of the picking aisle and picks case unit 7 from a different storage space 130S2 with the common transfer arm 110PA so that both case unit(s) 7, 5 are located adjacent one another on the common transfer arm 110PA (FIG. 17, Block 1410). As may be realized, in one aspect, the controller 110C is configured to effect picking of the case unit(s) in any suitable order such as, for example, an order that is opposite an order in which the case unit(s) are placed.

In this multi-pick example, the case unit holding location (s) correspond to storage spaces 130S of the picking aisles 130 but in other aspects the case unit holding location(s) include input lift modules 150A1, 150A2 (where a direct transfer between bots and the lift occurs), interface or peripheral buffer stations TS, BS for interfacing with the input lift modules 150A1, 150A2, (where an indirect transfer between the lift modules and the bots occurs) and storage spaces 130S (picking from the interface stations TS and the input lift modules 150A with the bot 110 is noted where case units are needed for a predetermined order out sequence are not located in the storage spaces 130S but are being input into the storage rack array in a just in time manner to be delivered substantially directly to the output lift(s) 150B1, 150B2).

The bot 110 grips both case units 7, 5 within the payload section 110PL in the manner described above and exits the picking aisle 130A1 (FIG. 17, Block 1420). The bot travels along the transfer deck 130B and interfaces with output lift 150B1 (FIG. 17, Block 1421). The bot separates the case units 7, 5 within the payload section 110PL, as described above, so that case unit(s) in any suitable manner such as, for example, so that case unit(s) 7 is justified towards the front of the payload section 110PL and case unit(s) 5 is justified towards the back of the payload section 110PL (FIG. 17, Block 1425). The case unit 7 is transferred to the peripheral buffer station BS (FIG. 17, Block 1430). The bot retracts the transfer arm 110PA to return the case unit(s) 5 to the payload section 110PL (FIG. 17, Block 1435) and grips the case unit 5 (FIG. 17, Block 1420). The case unit(s) 5 is transported to the interface station TS of output lift 150B1 (FIG. 17, Block 1421), justified toward the front of the payload section 110PL (FIG. 17, Block 1425), as described above, and transferred to transfer station TS, as described above (FIG. 17, Block 1430). In other aspects, depending on the predetermined case unit output sequence, the bot 110 places both case unit(s) 7, 5 at a common location/position, such as at one of output lifts 150B1, 150B2. For example, pickface 20 on shelf 7000H (FIG. 9) may include both case units 7, 5 such that the bot 110 places both case units as a multi-case unit pickface at a single position of shelf 7000H. As may be realized, the case unit(s) placed at the buffer station BS are, in one aspect, transferred to the interface station TS by a bot 110 or, in other aspects, by any suitable conveyor that connects the buffer station BS to the interface station TS. In one aspect, where the case unit(s) are transferred from the buffer station BS to the interface station TS by a bot 110 that transfer is an opportunistic transfer such that a bot 110 travelling along the transfer deck, for example, in route for another task (e.g. transferring pickface(s) to storage, sorting pickfaces, transferring pickface(s) from storage, etc.) travelling by the buffer station BS stops to pick the pickface from the buffer station BS and transfer the pickface to the interface station TS while in the process of performing the other task.

Figure 23:
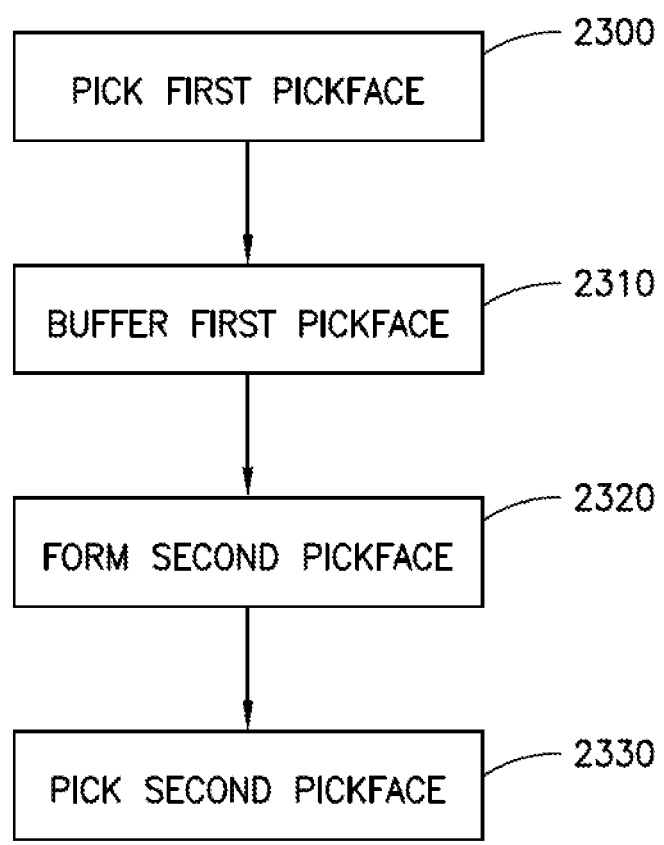
FIG. 23 is an exemplary flow diagram in accordance with aspects of the disclosed embodiment.
Figure 24:
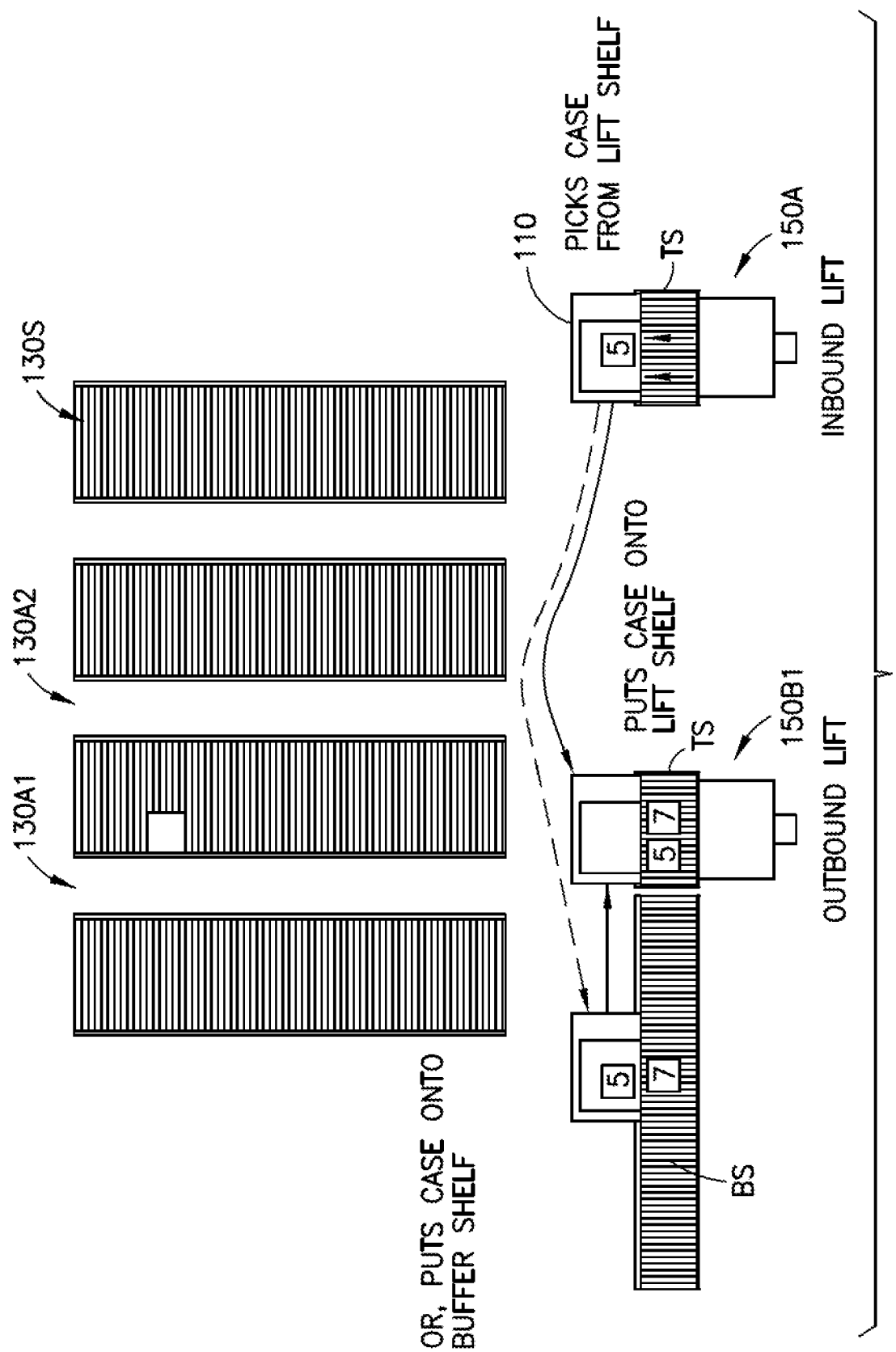
FIG. 24 is a schematic illustration of a portion of the storage and retrieval system in accordance with aspects of the disclosed embodiment.

An example of a bot 110 case unit(s) transfer transaction including a case unit(s) multi-pick and place operation with on the fly sortation of the case units for creating a mixed pallet load MPL (as shown in FIG. 1F) according to a predetermined order out sequence will be described with respect to FIGS. 9 and 24 in accordance with an aspects of the disclosed embodiment. The transfer of pickfaces with respect to FIGS. 9 and 24 is substantially similar to that described above with respect to FIGS. 11-13, however, in this aspect the storage of the pickfaces is bypassed such that pickfaces are transferred substantially directly between the inbound and outbound lifts 150A, 150B1. In one aspect, a bot picks a first pickface 5 from a first shelf of a first pickface handoff station such as transfer station TS of inbound lift 150A where the inbound lift 150A transfers one or more pickfaces/cases on the pickface handoff station (FIG. 23, Block 2300). The bot 110 traverses the transfer deck 130B and buffers the first pickface 5 (or a portion thereof) on a second shelf of a second pickface handoff station such as, for example, buffer station BS of the transfer station TS at the outbound lift 150B1 (FIG. 23, Block 2310). In other aspects, the first pickface 5 (or a portion thereof) is buffered at the transfer station TS of the outbound lift 150B1 rather than at the buffer station BS. The bot 110 forms a second pickface 5, 7 at the second shelf, the second pickface being different than the first pickface 5 and comprising more than one case in ordered sequence corresponding to a predetermined case out order sequence of mixed cases where the first pickface 5 and the second pickface 5, 7 have at least one case in common (FIG. 23, Block 2320). In one aspect the lift 150B1 picks the second pickface 5, 7 from the second shelf, such as the buffer station BS or transfer station TS (FIG. 23, Block 2330). In one aspect, the bot 110 forms the second pickface 5, at the second shelf (e.g. the buffer station BS or transfer station TS) on the fly during transport of the first pickface 5 between the first shelf and the second shelf. In one aspect the bot forms the second pickface 5, 7 onboard of the autonomous transport vehicle. In one aspect the bot 110 forms the second pickface 5, 7 at the second shelf or at a buffer portion of the second shelf. In one aspect the bot 110 places at least a portion of the first pickface (such as where pickface 5 includes more than one case) picked from the first shelf on a storage rack of a storage array (such as in storage spaces 130S) before transporting at least the portion of the first pickface to the second shelf. In one aspect the second shelf forms a common pickface transfer interface for the vertically reciprocating lift, the method further comprising picking in common, with the vertically reciprocating lift, the commonly supported pickfaces.

While the bot 10 in FIG. 24 is illustrated picking one case/pickface 5 from the transfer station TS of the inbound lift 150A, in other aspects the bot 110 picks two (or more than two) inbound pickfaces such as cases/pickfaces 5, 7. Here, in one aspect, the bot 110 places one pickface 5 on the outbound buffer station BS (or outbound transfer station TS), then moves to another shelf location (such as another outbound buffer or transfer station BS, TS or an adjacent location on a common buffer or transfer station BS, TS shelf) to place the second pickface 7. In one aspect the lift 150B1 removes the pickface(s) 5, 7 from the buffer or transfer station BS, TS as described herein. In another aspect, the bot 110 places both pickfaces 5, 7 on the outbound buffer or transfer station BS, TS shelf. Here the lift 150B1 picks one of the pickfaces 5, 7 and transports the pickface 5, 7 to the output station 160UT. The lift 150B1 returns to the buffer or transfer station BS, TS shelf and picks the other pickface 5, 7 for transfer to the output station 160UT. In still another aspect, the bot 110 places both pickfaces 5, 7 at the outbound buffer or transfer station BS, TS shelf where the lift 150B1 picks both pickfaces 5, 7 for transfer to the output station 160UT. Here the pickface 5, 7 are singulated or handled together in any suitable for building a mixed pallet as illustrated in FIG. 1F.

Figure 18:
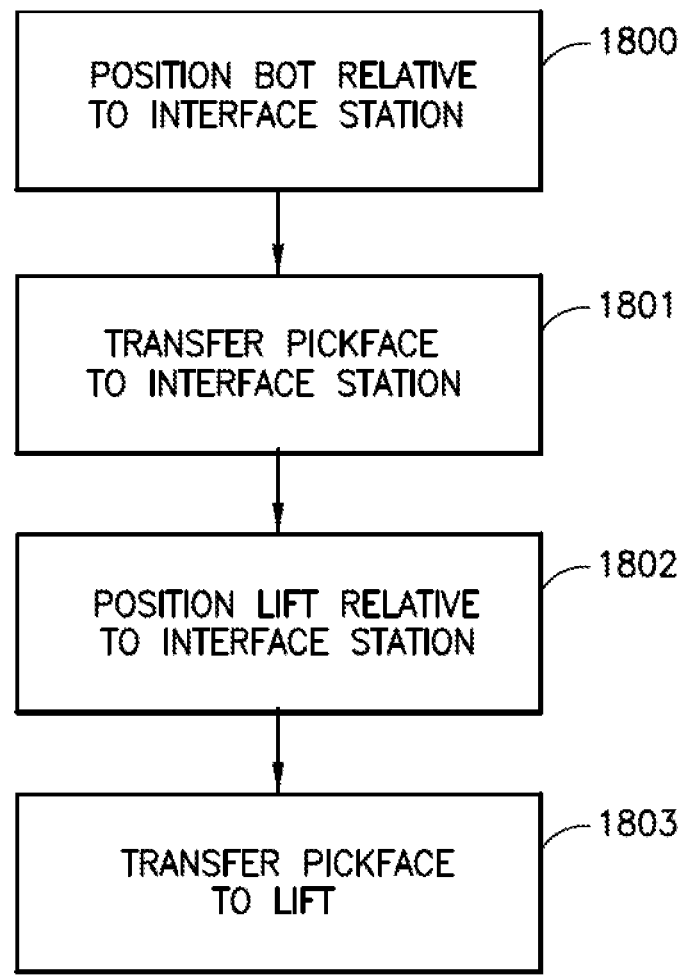

In the examples described herein the transfer of case units between the bots 110 and the lifts 150 occurs passively through the interface stations TS as described above. As an example of the transfer, referring to FIG. 18, the autonomous transport vehicle is positioned relative to the interface station TS in a manner similar to that described above with respect to the slats 1210S and/or a locating features 130F (FIG. 18, Block 1800). The transfer arm 110PA (e.g. end effector) of the bot 110 extends to transfer a pickface to the interface station TS where the fingers 273A-273E of the transfer arm 110PA interface with, for example, the slats 1210S of the interface station TS (FIG. 18, Block 1801). As may be realized, and as noted above, multiple pickfaces may be placed on the interface station TS (e.g. multiple individual pickfaces are simultaneously held on the interface station) for simultaneous of independent transfer to the lift 150. The lift 150 is moved to position the load handling device LHD, LHDA, LHDB adjacent the interface station TS (FIG. 18, Block 1802). The load handling device LHD, LHDA, LHDB is extended to lift the pickface from the interface station and transfer the pickface to the lift 150 where the fingers 4273 of the load handling device LHD, LHDA, LHDB interface with the slats 1210S of the interface station TS in the manner described above with respect to, for example, FIG. 4B (FIG. 18, Block 1803). As may be realized, the interface station TS has no moving parts and the transfer of the pickface(s) between the bots 110 and the lifts 150 through the interface station TS is a passive transfer. As may also be realized, transfer of pickfaces from the lifts 150 to the bots 110 may occur in a manner substantially opposite that described above with respect to FIG. 18.

Figure 19:
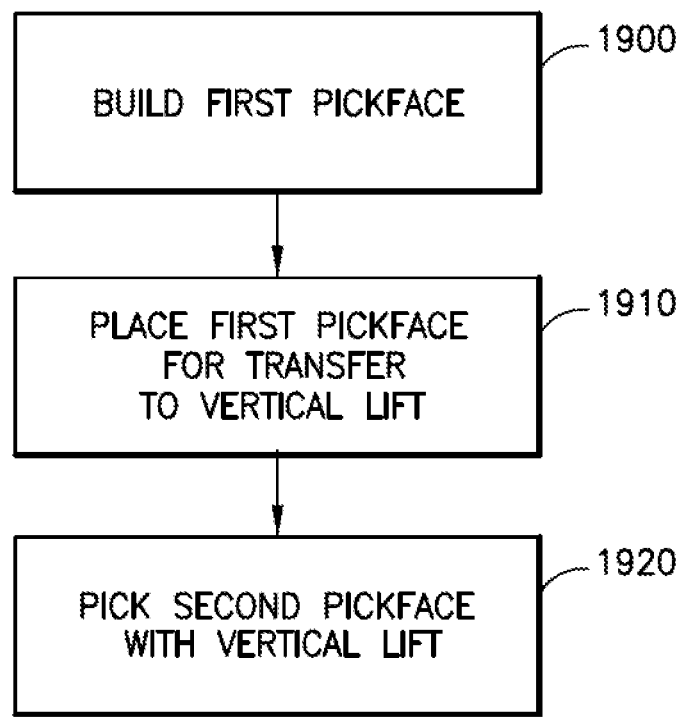

In one aspect, the pickface, built by the bot 110 (e.g. in the manner described above), that is transferred to (e.g. placed to), for example, the interface station TS (and/or buffer station BS) is not the same pickface that is picked from the interface station TS (and/or buffer station BS) by the vertical lift 150. For example, referring to FIG. 9, the bot 110 builds a first pickface from the storage spaces 130S within the rack modules RM (e.g. FIG. 2A) that includes individual pickfaces 7 and 5 (FIG. 19, Block 1900). The bot 110 transfers the first pickface to and places the first pickface on, for example, shelf 7000B of interface station TS for transfer to a vertical lift 150 (FIG. 19, Block 1910). As may be realized, while in this example, the individual pickfaces 5, 7 (e.g. forming the first pickface) are placed on a common shelf 7000B for exemplary purposes only, in other aspects the individual pickfaces 5, 7 are placed on different shelves 7000A-7000F so that the pickface placed on the shelves by the bot 110 is different than the first pickface but includes at least one case unit in common with the first pickface. For example, the first pickface is broken up such that a different pickface including individual pickface 5 is placed on shelf 7000B while another different pickface including individual pickface 7 is placed on, for example, shelf 7000H. A vertical lift, such as lift 150B1 picks a second pickface from one or more shelves 7000A-7000F (e.g. common to both the bot 110 and the vertical lift 150B1) of the transfer stations TS (FIG. 19, Block 1920). Here the second pickface is different than the first pickface but includes at least one of the individual pickfaces 5, 7 so that at least one case unit is common between the first pickface and the second pickface.

Figure 20:
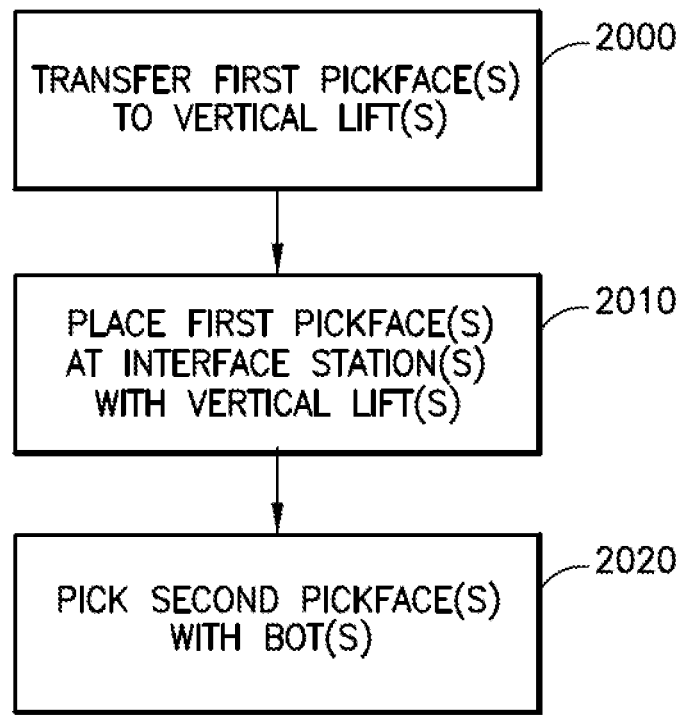

Similarly, in one aspect, the pickface that is transferred to (e.g. placed to), for example, the interface station TS (and/or buffer station BS) by the inbound vertical lift 150 (see vertical lift 150A in FIG. 1) is not the same pickface that is picked from the interface station TS (and/or buffer station BS) by the bot 110. In one aspect, the control server 120 is configured to command the bot 110, and effect with the bot 110 inbound flow (which may also be referred to as warehouse replenishment or inbound stream(s)) case sortation at a handoff station TS (and/or buffer station BS) with the bot 110 forming a pickface, independent of the pick order of cases from an input station by the lift 150. In one aspect, the bot controller 110C is configured to command the bot 110, and effect with the bot 110 inbound flow case sortation at the handoff station TS (and/or buffer station BS) with the bot 110 forming the pickface, independent of the pick order of cases from an input station by the lift 150. In still other aspects, the control server 120 and the bot controller 110C are both configured to command the bot 110, and effect with the bot 110 inbound flow case sortation at the handoff stations TS (and/or buffer station BS) with the bot 110 forming the pickface, independent of the pick order of cases from an input station by the lift 150. Thus, the control server 120 and/or the bot controller 110C is/are configured to set the inbound case flow, at least in part with bot 110 sortation of the cases carried in common by the both 110 and decoupled from the pick order of the cases by the lift 150. This may be referred to for description purposes as inbound flow case sortation with the bot 110 at the handoff station TS (and/or buffer station BS). For example, referring to FIG. 9A, first pickfaces are transferred to one or more vertical lifts 150A1, 150A2 from the input station(s) 160IN by the inbound conveyors 160CB (FIG. 20, Block 2000). In this example, one of the first pickfaces includes a combination of individual pickfaces 5, 7 while the other first pickface includes a combination of individual pickfaces 20, 22. The vertical lift 150A1 places the respective first pickface 5, 7 to shelf 7000B of interface station TS while vertical lift 150A2 places the other respective first pickface 20, 22 to shelf 7000H of another interface station TS on the same storage level 130L (FIG. 20, Block 2010). The bot 110 builds or otherwise picks a second pickface(s) from the interface station(s) TS so that the first pickface(s) placed on the shelve(s) 7000B, 7000H (e.g. common to both the bot 110 and a respective vertical lift 150A) by the vertical lifts 150A1, 150A2 is/are different than the second pickface but the second pickface includes at least one case unit in common with the first pickface (FIG. 20, Block 2020). For example, the first pickface 5, 7 is broken up such that a different pickface including individual pickface 5 (or individual pickface 7) is picked by the bot 110 and/or the other first pickface 20, 22 is broken up such that a different pickface including individual pickface 20 (or individual pickface 22) is picked by the bot 110. Here the second pickface is different than the first pickface but includes at least one of the individual pickfaces of the first pickface so that at least one case unit is common between the first pickface and the second pickface. As may be realized, the second pickface may be broken up by the bot so that a pickface placed on at least one storage shelf with the 110 is different than the second pickface and where at least one case unit is common between the second pickface and the pickface placed on the at least one storage shelf.

The output lifts 150B1, 150B2 transfer the ordered multi-pick(s) placed on the shelves 7000A-7000L by the bots 110 to the output station 160UT also in accordance with the predetermined order out sequence. For example, referring again to FIG. 9, the pickfaces 1-22 are picked by the lifts 150B1, 150B2 in sequenced order so that the pickfaces 1-22 are delivered to the output station 160UT in the predetermined order (indicated by, for example, the number associated with each case unit/pickface illustrated in FIG. 9) needed to form the mixed pallet load MPL (FIG. 1F) and/or to fill the predetermined order sequence of picked items in one or more bag(s), tote(s) or other container(s) TOT at an operator station 160EP (such as to fill e.g., a customer order). As such, each of the interface stations TS of each lift 150B1, 150B2 forms a buffer that holds one or more case unit(s) until the case unit(s) are needed and picked by the respective lift 150B1, 150B2 for forming the mixed pallet load.

Figure 25:
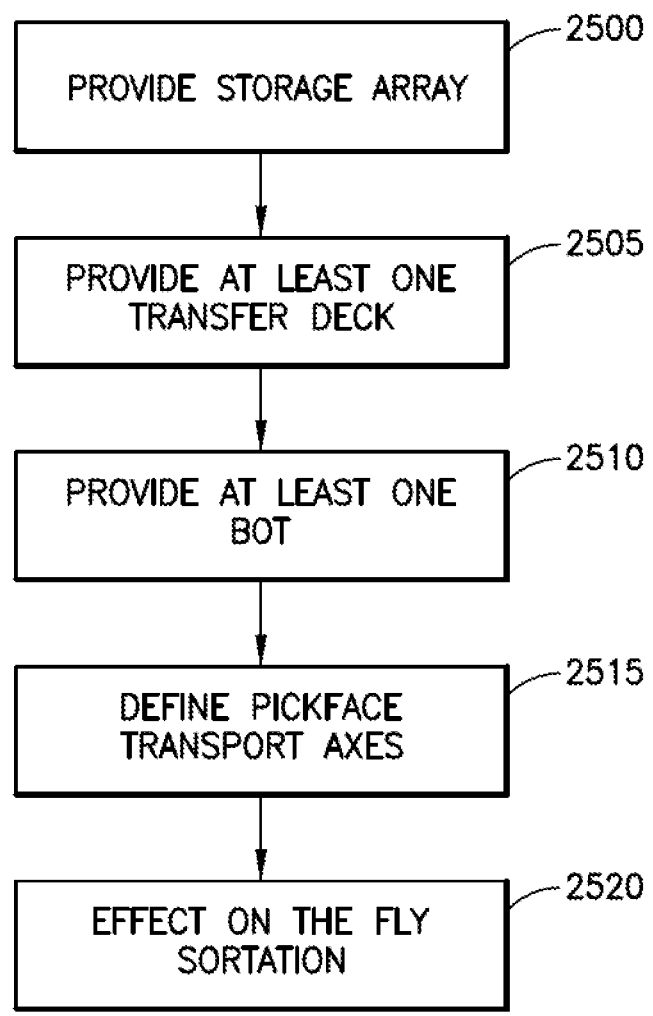
FIG. 25 exemplary flow diagram in accordance with aspects of the disclosed embodiment.

In one aspect, the storage and retrieval system 100 described herein is effected by providing a storage array RMA with rack storage spaces 130S arrayed on racks along aisles 130A (FIG. 25, Block 2500). At least one transfer deck 130B communicably connected with each of the aisles 130A is also provided (FIG. 25, Block 2505). At least one autonomous transport vehicle or bot 110 is provided and is configured for holding at least one pickface and traversing the at least one transfer deck 130B and aisles 130A, and having an extendable effector or transfer arm 110PA for picking and placing the at least one pickface to and from one of the rack storage spaces 130S (FIG. 25, Block 2510). Pickface transport axes X, Y of the storage array are defined with the aisles 130A, the at least one transfer deck 130B, the at least one autonomous transport vehicle 110, traversing thereon, and the extendable effector 110PA, such that pickfaces are transported along the pickface transport axes X, Y between an inbound section of the automated storage and retrieval system 160IN, where pickfaces inbound to the storage array are generated, and a load fill section of the automated storage and retrieval system 160UT, where outbound pickfaces from the storage array are arranged to fill a load in accordance with a predetermined load fill order sequence. On the fly sortation of mixed case pickfaces is effected (FIG. 25, Block 2520) coincident with transport on at least one of the pickface transport axes X, Y with the storage racks and the autonomous transport vehicle 110 in combination, so that two or more of the at least one pickface are picked from one or more of the rack storage spaces 130S and placed at one or more pickface holding locations (such as, for example, transfer or buffer stations TS, BS), different than the one or more of the rack storage spaces 130S, according to the predetermined load fill order sequence. In one aspect the controller 120 (which is operably connected to the at least one autonomous transport vehicle as described above) manages the pickface transport axes X, Y, Z wherein the pickface transport axes includes a plurality of transport axes. As described above, the plurality of pickface transport axes X, Y, Z are oriented in at least two directions angled relative to each other. As also described above, one of the plurality of pickface transport axes Y is defined by extension of the extendable effector 110PA and is in a different direction angled relative to another of the plurality of pickface transport axes X defined by the autonomous transport vehicle 110 traverse along the picking aisle 130A. In one aspect, as described above, on the fly sortation is effected, with the racks and the at least one autonomous transport vehicle in combination, coincident with transport on at least one of each of the plurality of pickface transport axes. In one aspect the lifts 150 define another pickface transport axis Z of the storage array. As described herein on the fly sortation of mixed case pickfaces is effected by the lifts 150 coincident with transport on the other pickface transport axis so that two or more of the pickfaces are picked from one or more deck levels and transported to the load fill section according to the predetermined load fill order sequence.

Figure 21:
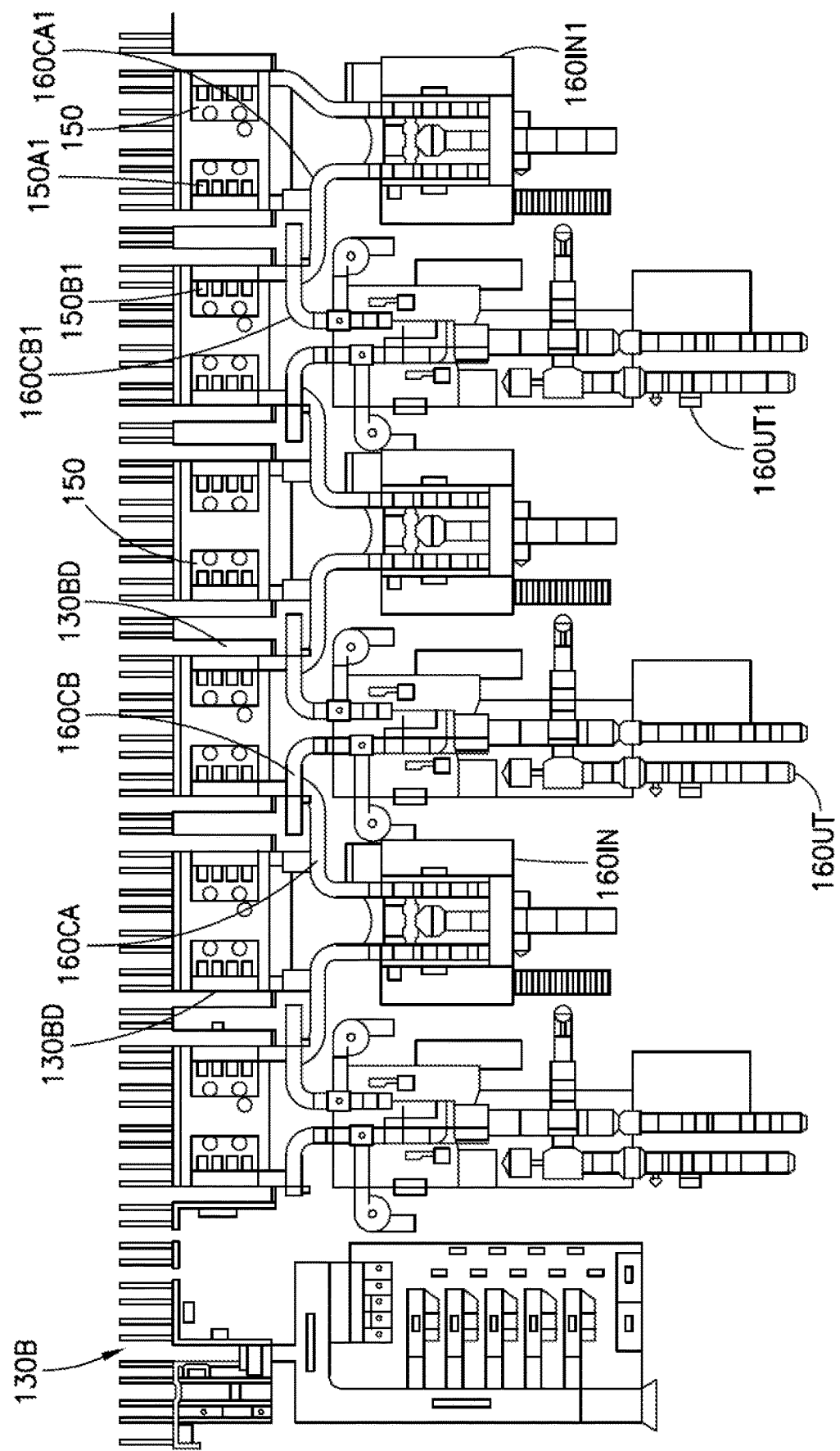
FIGS. 21, 22A and 22B are schematic illustrations of portions of the automated storage and retrieval system in accordance with aspects of the disclosed embodiment.
Figure 22A:
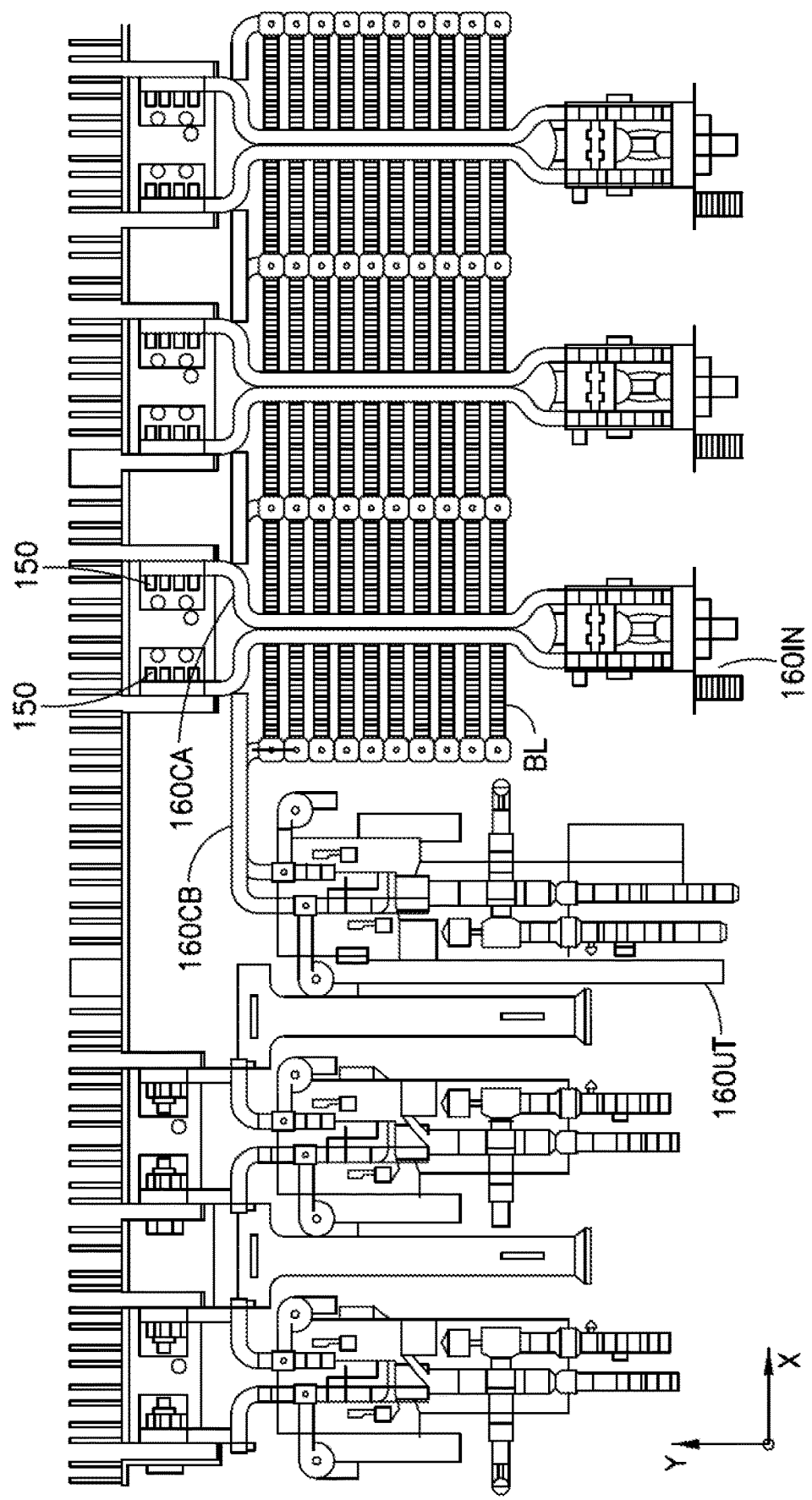
Figure 22B:
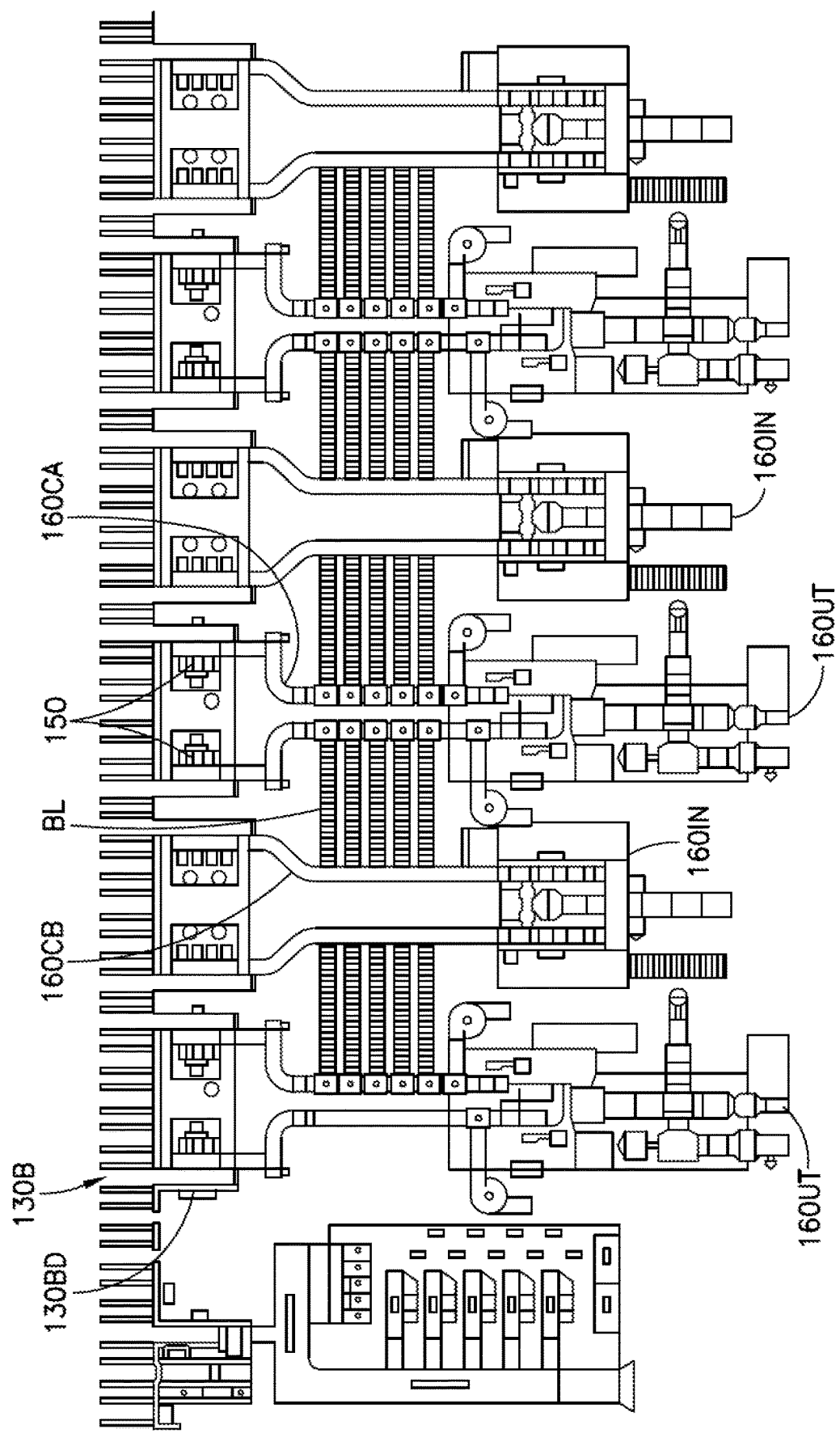

Referring now to FIGS. 21, 22A and 22B, in one aspect the transfer of pickfaces from the input station 160IN to the output station 160UT occurs without pickface transfer by the bots 110. For example, referring to FIG. 21 the conveyors 160CA, 160CB of the input and output stations 160IN, 160UT are arranged so that each lift 150 serves both the input and output stations 160IN, 160UT. For example, conveyor 160CA1 of input station 160IN1 and conveyor 160CB1 of output station 160UT1 are both served by lifts 150A1, 150B1. As may be realized, each conveyor 160CA1, 160CB1 are located at different levels (in a manner similar to that described above with respect to the shelves of the buffer and transfer stations BS, TS) of a common lift 150A1, 150B1 so that pickfaces can be picked from one conveyor 160CA1, 160CB1 by the common lift 150A1, 150B1 at one level and transferred to the other conveyor 160CA1, 160CB1 at another level. Here pickfaces are substantially directly transferred, by the lifts 150A1, 150B1, from one conveyor 160CA1, 160CB1 (e.g. from input station 160IN1 to output station 160UT1) while bypassing the bots 110 and storage structure 130. As may be realized, in one aspect the pickfaces from input station 160IN1 are placed on the shelves buffer or transfer stations BS, TS by the common lift 150A1, 150B1 for sorting the pickfaces, as described above, before transferring the pickfaces to the output conveyor 160CB1. Referring to FIGS. 22A and 22B, in one aspect pickfaces are transferred from the input station 160IN to the output station 160UT, while bypassing the bots 110 and storage structure 130, through buffer lanes BL that communicably connect the input conveyors 160CA to the output conveyors 160CB.

Figure 27:
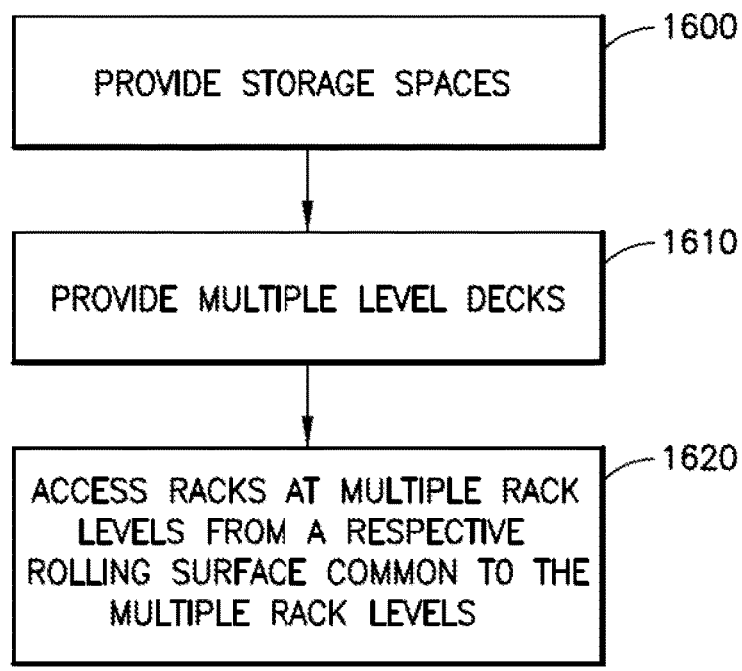
FIG. 27 is an exemplary flow diagram in accordance with aspects of the disclosed embodiment.

Referring to FIG. 27, in accordance with aspects of the disclosed embodiment, storage spaces arrayed on racks along picking aisles are provided (FIG. 27, Block 1600). Multiple level decks are also provided (FIG. 27, Block 1610), where at least one deck level of the multiple level decks communicates with each aisle, where the multiple level decks and aisles define a rolling surface for an autonomous transport vehicle at each level of the multiple level decks. Racks at multiple rack levels are accessed from a respective rolling surface that is common to the multiple rack levels (FIG. 27, Block 1620), where the racks are disposed along at least one aisle at each level of the multiple level decks. In one aspect, a vertical pitch between rack levels varies for a portion of a respective aisle. In one aspect, the vertical pitch between at least two rack levels of the portion of the respective aisle is related to another vertical pitch between at least two other rack levels of another aisle portion of the respective aisle so that the autonomous transport vehicle effects multiple picks in an ordered sequence in a common aisle pass. In one aspect, the vertical pitch between at least two rack levels of the portion of the respective aisle is related to another vertical pitch between at least two other rack levels of another aisle portion of the respective aisle so that the vertical pitch and the other vertical pitch effects substantially filling a vertical space between the multiple deck levels with stored items.

In accordance with one or more aspects of the disclosed embodiment, an automated storage and retrieval system is provided. The automated storage and retrieval system including at least one autonomous transport vehicle, a transfer deck that defines a transport surface for the at least one autonomous transport vehicle, at least one reciprocating lift, a first pickface interface station and a second pickface interface station connected to the transfer deck and spaced apart from each other, each pickface interface station forming a pickface transfer interfacing between the at least one autonomous transport vehicle on the transfer deck and the at least one reciprocating lift at each pickface interface station so that a pickface is transferred between the at least one reciprocating lift and the at least one autonomous transport vehicle at each pickface interface station, wherein the at least one autonomous transport vehicle is configured to pick a first pickface at the first pickface interface station, traverse the transfer deck and buffer the first pickface, or at least a portion thereof, at the second pickface interface station so that the at least a portion of the first pickface is buffered at the second pickface interface station for transport with the outbound pickface transport system in an order sequence of pickfaces according to a predetermined case out order sequence of mixed case pickfaces.

In accordance with one or more aspects of the disclosed embodiment, the at least one autonomous transport vehicle is configured to buffer the first pickface, or at least a portion thereof, at the second pickface interface station so that the second pickface interface station has multiple pickfaces buffered on a common support.

In accordance with one or more aspects of the disclosed embodiment, at least one of the multiple pickfaces at the second pickface interface station is different from the first pickface and includes a case that is from the first pickface.

In accordance with one or more aspects of the disclosed embodiment, the autonomous transport vehicle builds at least one of the multiple pickfaces at the second pickface interface station on the fly during transport of the first pickface between the first pickface interface station and the second pickface interface station.

In accordance with one or more aspects of the disclosed embodiment, the autonomous transport vehicle builds the at least one of the multiple pickfaces onboard of the autonomous transport vehicle.

In accordance with one or more aspects of the disclosed embodiment, the autonomous transport vehicle builds the at least one of the multiple pickfaces at the second pickface interface station or at a buffer portion of the common support of the second pickface interface station buffer.

In accordance with one or more aspects of the disclosed embodiment, the first pickface is at least one of the multiple pickfaces at the second pickface interface station.

In accordance with one or more aspects of the disclosed embodiment, the automated storage and retrieval system comprises autonomous transport vehicle access aisles connected to the deck, and a storage array having storage racks arranged in multilevel shelves and distributed along the autonomous transport vehicle access aisles.

In accordance with one or more aspects of the disclosed embodiment, the autonomous transport vehicle is arranged so that at least another portion of the first pickface picked from the first pickface interface station is placed on a storage rack of the storage array before transport to the second pickface interface station.

In accordance with one or more aspects of the disclosed embodiment, the second pickface interface station forms a common pickface transfer interface for the at least one reciprocating lift so that the commonly supported pickfaces are picked in common with the at least one reciprocating lift.

In accordance with one or more aspects of the disclosed embodiment, the transfer deck is undeterministic and has multiple travel lanes.

In accordance with one or more aspects of the disclosed embodiment, an automated storage and retrieval system is provided. The automated storage and retrieval system including at least one autonomous transport vehicle, a transfer deck that defines a transport surface for the at least one autonomous transport vehicle, at least one inbound pickface transport system disposed between an unload cell and a load fill section, at least one outbound pickface transport system disposed between the unload cell and the load fill section, a first pickface interface station, and a second pickface interface station connected to the transfer deck and spaced apart from each other, each pickface interface station forming a pickface transfer interfacing between the at least one autonomous transport vehicle on the transfer deck and a respective one of the inbound pickface transport system and the outbound pickface transport system at each pickface interface station so that a pickface is transferred between the respective one of the inbound pickface transport system and the outbound pickface transport system and the at least one autonomous transport vehicle at each pickface interface station, wherein the at least one autonomous transport vehicle is configured to pick a first pickface at the first pickface interface station, traverse the deck and buffer the first pickface, or at least a portion thereof, at the second pickface interface station so that the second pickface interface station has multiple pickfaces buffered on a common support in an order sequence of pickfaces according to a predetermined case out order sequence of mixed case pickfaces.

In accordance with one or more aspects of the disclosed embodiment, at least one of the multiple pickfaces at the second pickface interface station is different from the first pickface and includes a case that is from the first pickface.

In accordance with one or more aspects of the disclosed embodiment, the autonomous transport vehicle builds at least one of the multiple pickfaces at the second pickface interface station on the fly during transport of the first pickface between the first pickface interface station and the second pickface interface station.

In accordance with one or more aspects of the disclosed embodiment, the autonomous transport vehicle builds the at least one of the multiple pickfaces onboard of the autonomous transport vehicle.

In accordance with one or more aspects of the disclosed embodiment, the autonomous transport vehicle builds the at least one of the multiple pickfaces at the second pickface interface station or at a buffer portion of the common support of the second pickface interface station buffer.

In accordance with one or more aspects of the disclosed embodiment, the first pickface is at least one of the multiple pickfaces at the second pickface interface station.

In accordance with one or more aspects of the disclosed embodiment, the automated storage and retrieval system comprises autonomous transport vehicle access aisles connected to the deck, and a storage array having storage racks arranged in multilevel shelves and distributed along the autonomous transport vehicle access aisles.

In accordance with one or more aspects of the disclosed embodiment, the autonomous transport vehicle is arranged so that at least another portion of the first pickface picked from the first pickface interface station is placed on a storage rack of the storage array before transport to the second pickface interface station.

In accordance with one or more aspects of the disclosed embodiment, the second pickface interface station forms a common pickface transfer interface for the respective one of the inbound pickface transport system and the outbound pickface transport system so that the commonly supported pickfaces are picked in common with the respective one of the inbound pickface transport system and the outbound pickface transport system.

In accordance with one or more aspects of the disclosed embodiment, the transfer deck is undeterministic and has multiple travel lanes.

In accordance with one or more aspects of the disclosed embodiment, a method for automated storage and retrieval is provided. The method including picking, with an autonomous transport vehicle, a first pickface from a first shelf of a first pickface handoff station, buffering, with the autonomous transport vehicle, the first pickface on a second shelf of a second pickface handoff station, forming a second pickface at the second shelf, the second pickface being different than the first pickface and comprising more than one case in ordered sequence corresponding to a predetermined case out order sequence of mixed cases where the first pickface and the second pickface have at least one case in common, and picking, with a reciprocating lift, the second pickface from the second shelf.

In accordance with one or more aspects of the disclosed embodiment, the method comprises forming, with the autonomous transport vehicle, the second pickface at the second shelf on the fly during transport of the first pickface between the first shelf and the second shelf.

In accordance with one or more aspects of the disclosed embodiment, the method comprises forming, with the autonomous transport vehicle, the second pickface onboard of the autonomous transport vehicle.

In accordance with one or more aspects of the disclosed embodiment, the method comprises forming, with the autonomous transport vehicle, the second pickface at the second shelf or at a buffer portion of the second shelf.

In accordance with one or more aspects of the disclosed embodiment, the method comprises placing, with the autonomous transport vehicle, at least a portion of the first pickface picked from the first shelf on a storage rack of a storage array before transporting at least the portion of the first pickface to the second shelf.

In accordance with one or more aspects of the disclosed embodiment, the second shelf forms a common pickface transfer interface for the reciprocating lift, the method further comprising picking in common, with the reciprocating lift, the commonly supported pickfaces.

In accordance with one or more aspects of the disclosed embodiment, an automated storage and retrieval system is provided. The automated storage and retrieval system including a storage array with rack storage spaces arrayed on racks along aisles, at least one transfer deck communicably connected with each of the aisles, at least one autonomous transport vehicle configured for holding at least one pickface and traversing the at least one transfer deck and aisles, and having an extendable effector for picking and placing the at least one pickface to and from one of the rack storage spaces, wherein the aisles, the at least one transfer deck, the at least one autonomous transport vehicle, traversing thereon, and the extendable effector define pickface transport axes of the storage array along which pickfaces are transported between an inbound section of the automated storage and retrieval system, where pickfaces inbound to the storage array are generated, and a load fill section of the automated storage and retrieval system, where outbound pickfaces from the storage array are arranged to fill a load in accordance with a predetermined load fill order sequence, and wherein the racks and the autonomous transport vehicle are arranged so that in combination the racks and the autonomous transport vehicle effect on the fly sortation of mixed case pickfaces coincident with transport on at least one of the pickface transport axes so that two or more of the at least one pickface are picked from one or more of the rack storage spaces and placed at one or more pickface holding locations, different than the one or more of the rack storage spaces, according to the predetermined load fill order sequence.

In accordance with one or more aspects of the disclosed embodiment, the automated storage and retrieval system comprises a controller operably connected to the at least one autonomous transport vehicle and arranged to manage the pickface transport axes wherein the pickface transport axes comprises a plurality of transport axes.

In accordance with one or more aspects of the disclosed embodiment, the plurality of pickface transport axes are oriented in at least two directions angled relative to each other.

In accordance with one or more aspects of the disclosed embodiment, one of the plurality of pickface transport axes defined by extension of the extendable effector is in a different direction angled relative to another of the plurality of pickface transport axes defined by the autonomous transport vehicle traverse along the aisle.

In accordance with one or more aspects of the disclosed embodiment, the racks and the at least one autonomous transport vehicle in combination effect on the fly sortation coincident with transport on at least one of each of the plurality of pickface transport axes.

In accordance with one or more aspects of the disclosed embodiment, the at least one transfer deck comprises more than one transfer deck arranged at different deck levels.

In accordance with one or more aspects of the disclosed embodiment, the automated storage and retrieval system comprises a lift communicably connected to each of the decks at the different deck levels, the lift being arranged to transport the pickfaces between the different deck levels and defining another pickface transport axis of the storage array.

In accordance with one or more aspects of the disclosed embodiment, the lift is arranged to effect on the fly sortation of mixed case pickfaces coincident with transport on the other pickface transport axis so that two or more of the pickfaces are picked from one or more deck levels and transported to the load fill section according to the predetermined load fill order sequence.

In accordance with one or more aspects of the disclosed embodiment, on the fly sortation is effected coincident with transport on at least one of each of the plurality of pickface transport axes and each of the other transport axis of the lift.

In accordance with one or more aspects of the disclosed embodiment, an automated storage and retrieval system is provided. The automated storage and retrieval system including a storage array with rack storage spaces arrayed on racks along aisles, at least one transfer deck communicably connected with each of the aisles, at least one autonomous transport vehicle configured for holding at least one pickface and traversing the at least one transfer deck and aisles, and having an extendable effector for picking and placing the at least one pickface to and from one of the rack storage spaces, at least one lift communicably connected to each transfer deck, the lift being arranged to transport pickfaces to and from the at least one transfer deck, and wherein the aisles, the at least one transfer deck, the at least one autonomous transport vehicle, traversing thereon, the extendable effector and the at least one lift define pickface transport axes of the storage array along which pickfaces are transported between an inbound section of the automated storage and retrieval system, where pickfaces inbound to the storage array are generated, and a load fill section of the automated storage and retrieval system, where outbound pickfaces from the storage array are arranged to fill a load in accordance with a predetermined load fill order sequence, the racks and the autonomous transport vehicle are arranged so that in combination the racks and the autonomous transport vehicle effect on the fly sortation of mixed case pickfaces on at least one of the pickface transport axes so that two or more of the at least one pickface are picked from one or more of the rack storage spaces and placed at one or more pickface holding locations, different than the one or more of the rack storage spaces, according to the predetermined load fill order sequence, and the at least one lift is arranged to effect on the fly sortation of the mixed case pickfaces on another of the at least one pickface transport axes so that two or more of the pickfaces are picked from different ones of the at least one transfer deck and transported to the load fill section according to the predetermined load fill order sequence where on the fly sortation is effected coincident with transport on at least one of each of the pickface transport axes.

In accordance with one or more aspects of the disclosed embodiment, the automated storage and retrieval system comprises a controller operably connected to the at least one autonomous transport vehicle and the at least one lift and arranged to manage the pickface transport axes.

In accordance with one or more aspects of the disclosed embodiment, the pickface transport axes are oriented in at least two directions angled relative to each other.

In accordance with one or more aspects of the disclosed embodiment, one of the pickface transport axes defined by extension of the extendable effector is in a different direction angled relative to another of the pickface transport axes defined by the autonomous transport vehicle traverse along the aisle.

In accordance with one or more aspects of the disclosed embodiment, the racks and the at least one autonomous transport vehicle in combination effect on the fly sortation coincident with transport on at least one of the pickface transport axes.

In accordance with one or more aspects of the disclosed embodiment, the at least one transfer deck comprises more than one transfer deck arranged at different deck levels and the at least one lift is configured to transport pickfaces between the different deck levels.

In accordance with one or more aspects of the disclosed embodiment, a method for automated storage and retrieval is provided. The method including providing a storage array with rack storage spaces arrayed on racks along aisles, providing at least one transfer deck communicably connected with each of the aisles, providing at least one autonomous transport vehicle configured for holding at least one pickface and traversing the at least one transfer deck and aisles, and having an extendable effector for picking and placing the at least one pickface to and from one of the rack storage spaces, defining, with the aisles, the at least one transfer deck, the at least one autonomous transport vehicle, traversing thereon, and the extendable effector, pickface transport axes of the storage array, such that pickfaces are transported along the pickface transport axes between an inbound section of the automated storage and retrieval system, where pickfaces inbound to the storage array are generated, and a load fill section of the automated storage and retrieval system, where outbound pickfaces from the storage array are arranged to fill a load in accordance with a predetermined load fill order sequence, and effecting on the fly sortation of mixed case pickfaces coincident with transport on at least one of the pickface transport axes, with the racks and the autonomous transport vehicle in combination, so that two or more of the at least one pickface are picked from one or more of the rack storage spaces and placed at one or more pickface holding locations, different than the one or more of the rack storage spaces, according to the predetermined load fill order sequence.

In accordance with one or more aspects of the disclosed embodiment, the method comprises managing, with a controller operably connected to the at least one autonomous transport vehicle, the pickface transport axes wherein the pickface transport axes includes a plurality of transport axes.

In accordance with one or more aspects of the disclosed embodiment, the plurality of pickface transport axes are oriented in at least two directions angled relative to each other.

In accordance with one or more aspects of the disclosed embodiment, one of the plurality of pickface transport axes defined by extension of the extendable effector is in a different direction angled relative to another of the plurality of pickface transport axes defined by the autonomous transport vehicle traverse along the aisle.

In accordance with one or more aspects of the disclosed embodiment, the method comprises effecting, with the racks and the at least one autonomous transport vehicle in combination, on the fly sortation coincident with transport on at least one of each of the plurality of pickface transport axes.

In accordance with one or more aspects of the disclosed embodiment, the method comprises defining another pickface transport axis of the storage array with a lift that is communicably connected to each of the at least one transfer deck disposed at different deck levels and transports the pickfaces between the different deck levels.

In accordance with one or more aspects of the disclosed embodiment, the method comprises effecting, with the lift, on the fly sortation of mixed case pickfaces coincident with transport on the other pickface transport axis so that two or more of the pickfaces are picked from one or more deck levels and transported to the load fill section according to the predetermined load fill order sequence.

In accordance with one or more aspects of the disclosed embodiment, the method comprises effecting on the fly sortation coincident with transport on at least one of each of the plurality of pickface transport axes and each of the other transport axis of the lift.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. An automated storage and retrieval system comprising:
   at least one autonomous transport vehicle;
   an elevated transfer deck that defines a transport surface for the at least one autonomous transport vehicle at an elevated level from an output conveyor at a lower level;
   a first pickface interface station and a second pickface interface station connected to the transfer deck and spaced apart from each other, each pickface interface station forming a pickface transfer interfacing between the at least one autonomous transport vehicle on the transfer deck and a lowering transfer at each of the second pickface interface station so that a pickface is transferred via the lowering transfer from the at least one autonomous transport vehicle at each of the second pickface interface station;
   wherein the at least one autonomous transport vehicle is configured to engage a first pickface at the first pickface interface station, traverse the transfer deck and transfer via the lowering transfer the first pickface, or at least a portion thereof, at the second pickface interface station so that the second pickface interface station has multiple pickfaces transferred down in an order sequence of pickfaces that defines a successive structured sequence, of ordered multiple pickfaces, dependent from and embodying a predetermined pickface out order sequence of mixed goods pickfaces having a predetermined successive structured sequence of ordered mixed goods pickfaces.

2. The automated storage and retrieval system of claim 1, wherein the autonomous transport vehicle effects ordering of the at least one of the multiple pickfaces with the lowering transfer at the second pickface interface station so as to form the predetermined pickface out order sequence with the predetermined successive structured sequence at the output conveyor.

3. The automated storage and retrieval system of claim 1, wherein the first pickface is at least one of the multiple pickfaces of mixed orders at the second pickface interface station.

4. The automated storage and retrieval system of claim 1, further comprising:
   autonomous transport vehicle access aisles connected to the deck; and
   a storage array having storage racks arranged in multi-level shelves and distributed along the autonomous transport vehicle access aisles.

5. The automated storage and retrieval system of claim 4, wherein the autonomous transport vehicle is arranged so that at least another portion of the first pickface engaged at the first pickface interface station is placed on a storage rack of the storage array before transport to the second pickface interface station.

6. The automated storage and retrieval system of claim 1, wherein the lowering transfer is a reciprocating lift and the second pickface interface station forms a common pickface transfer interface for the at least one reciprocating lift so that commonly supported pickfaces at the second pickface interface station are transferred in common with the at least one reciprocating lift.

7. The automated storage and retrieval system of claim 1, wherein the transfer deck is undeterministic and has multiple travel lanes.

8. An automated storage and retrieval system comprising:
   at least one autonomous transport vehicle;
   an elevated transfer deck that defines a transport surface for the at least one autonomous transport vehicle;
   at least one inbound pickface transport system disposed between an unload cell and a load fill section;
   at least one outbound pickface transport system disposed between the unload cell and the load fill section, wherein the elevated transfer deck is at an elevated level relative to the outbound pickface transport system;

a first pickface interface station, and a second pickface interface station connected to the transfer deck and spaced apart from each other, each pickface interface station forming a pickface transfer interfacing between the at least one autonomous transport vehicle on the transfer deck and a lowering transfer at each of the second pickface interface station so that a pickface is transferred via the lowering transfer from the at least one autonomous transport vehicle at each of the second pickface interface station;

wherein the at least one autonomous transport vehicle is configured to engage a first pickface at the first pickface interface station, traverse the deck and transfer via the lowering transfer the first pickface, or at least a portion thereof, at the second pickface interface station so that so that the at least a portion of the first pickface is transferred down in an order sequence of pickfaces that defines a successive structured sequence, of ordered multiple pickfaces, dependent from and embodying a predetermined pickface out order sequence of mixed goods pickfaces having a predetermined successive structured sequence of ordered mixed goods pickfaces.

9. The automated storage and retrieval system of claim 8, wherein the autonomous transport vehicle effects ordering of the at least one of the multiple pickfaces with the lowering conveyor at the second pickface interface station so as to form the predetermined pickface out order sequence with the predetermined successive structured sequence at the output conveyor.

10. The automated storage and retrieval system of claim 8, wherein the first pickface is at least one of the multiple pickfaces of mixed loads at the second pickface interface station.

11. The automated storage and retrieval system of claim 8, further comprising:
autonomous transport vehicle access aisles connected to the deck; and
a storage array having storage racks arranged in multi-level shelves and distributed along the autonomous transport vehicle access aisles.

12. The automated storage and retrieval system of claim 11, wherein the autonomous transport vehicle is arranged so that at least another portion of the first pickface engaged at the first pickface interface station is placed on a storage rack of the storage array before transport to the second pickface interface station.

13. The automated storage and retrieval system of claim 8, wherein the lowering transfer is a reciprocating lift and the second pickface interface station forms a common pickface transfer interface for the respective one of the inbound pickface transport system and the outbound pickface transport system so that commonly supported pickfaces at the second pickface interface station are transferred in common with the respective one of the inbound pickface transport system and the outbound pickface transport system.

14. The automated storage and retrieval system of claim 8, wherein the transfer deck is undeterministic and has multiple travel lanes.

15. A method comprising:
engaging, with an autonomous transport vehicle, a first pickface from a first shelf of a first pickface handoff station;
transferring, with a lowering transfer, the first pickface on a second shelf of a second pickface handoff station; and
forming a second pickface at the second shelf, the second pickface being different than the first pickface and comprising more than one pickfaces transferred down in ordered sequence of pickfaces that defines a successive structured sequence, of ordered multiple pickfaces, dependent from and embodying a predetermined pickface out order sequence of mixed goods having a predetermined successive structured sequence of ordered mixed goods where the first pickface and the second pickface have at least one good in common.

16. The method of claim 15, further comprising effecting ordering, with the autonomous transport vehicle, of the second pickface at the second shelf so as to form the predetermined pickface out order sequence with the predetermined successive structured sequence at the output conveyor.

17. The method of claim 15, further comprising placing, with the autonomous transport vehicle, at least a portion of the first pickface engaged at the first shelf on a storage rack of a storage array before transporting at least the portion of the first pickface to the second shelf.

18. The method of claim 15, wherein the lowering transfer is a reciprocating lift and the second shelf forms a common pickface transfer interface for the reciprocating lift, the method further comprising transferring in common, with the reciprocating lift, a commonly supported pickfaces at the second shelf.

\* \* \* \* \*